United States Patent
Ren et al.

(10) Patent No.: US 12,243,144 B2
(45) Date of Patent: Mar. 4, 2025

(54) DISPLAY METHOD AND ELECTRONIC DEVICE FOR PLAYING TRANSITION ANIMATIONS

(71) Applicant: Honor Device Co., Ltd., Shenzhen (CN)

(72) Inventors: Jie Ren, Shenzhen (CN); Liwei Huang, Shenzhen (CN); Kai Qian, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/908,727

(22) PCT Filed: Mar. 17, 2022

(86) PCT No.: PCT/CN2022/081452
§ 371 (c)(1),
(2) Date: Sep. 1, 2022

(87) PCT Pub. No.: WO2022/237317
PCT Pub. Date: Nov. 17, 2022

(65) Prior Publication Data
US 2024/0193842 A1    Jun. 13, 2024

(30) Foreign Application Priority Data
May 12, 2021  (CN) .................... 202110517531.8

(51) Int. Cl.
*G06T 7/00*   (2017.01)
*G06T 13/80*  (2011.01)

(52) U.S. Cl.
CPC ............ *G06T 13/80* (2013.01); *G06T 7/0002* (2013.01); *G06T 2200/24* (2013.01); *G06T 2207/10016* (2013.01); *G06T 2207/30168* (2013.01)

(58) Field of Classification Search
CPC ... G06T 13/80; G06T 7/0002; G06T 2200/24; G06T 2207/10016; G06T 2207/30168; G06F 3/0481; G06F 3/04845; G06F 3/1407; G09G 2340/045; G09G 2340/125; G09G 2354/00; G09G 2358/00; G09G 5/377;
(Continued)

(56) References Cited

U.S. PATENT DOCUMENTS

2015/0205498 A1    7/2015  Levi
2023/0326393 A1*  10/2023  Huang .................... G09G 3/293
                                                              345/55

FOREIGN PATENT DOCUMENTS

CN    109743464 A    5/2019
CN    110162343 A    8/2019
(Continued)

OTHER PUBLICATIONS

"Create Your Own Videos Wallpapers for Your iPhone" Published on Aug. 26, 2020, by HotShotTek https://www.youtube.com/watch?v=N-95AY2Q1n4.*
(Continued)

*Primary Examiner* — Rinna Yi
(74) *Attorney, Agent, or Firm* — Slater Matsil, LLP

(57) ABSTRACT

This application provides a display method and an electronic device. The method includes: The electronic device may generate a transition animation of the electronic device based on a user selection and a video stored in the electronic device.

20 Claims, 40 Drawing Sheets

(58) Field of Classification Search
CPC ............. G09G 5/373; G09G 2330/022; G09G 2340/0414; G09G 2340/0421; G09G 2340/0471
See application file for complete search history.

(56) References Cited

FOREIGN PATENT DOCUMENTS

| | | |
|---|---|---|
| CN | 111580904 A | 8/2020 |
| CN | 112363785 A | 2/2021 |

OTHER PUBLICATIONS

Lang, B., "How to Set a Video as the Wallpaper on Your Android's Home Screen & Lock Screen", https://smartphones.gadgethacks.com/how-to/set-video-as-wallpaper-your-androids-home-screen-lock-screen-0182249/, Jan. 20, 2019, 12 Pages.

* cited by examiner

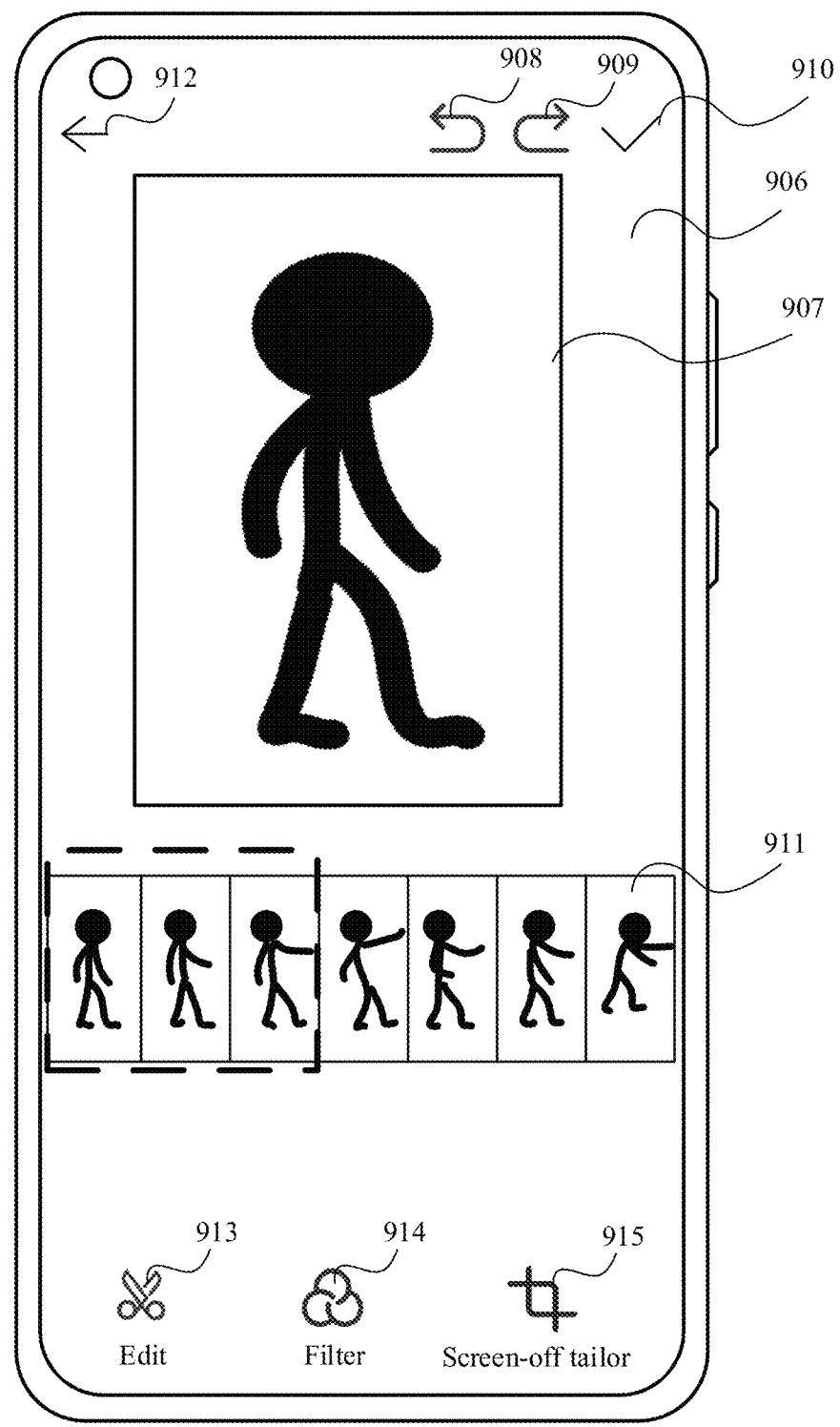
FIG. 9d(1)

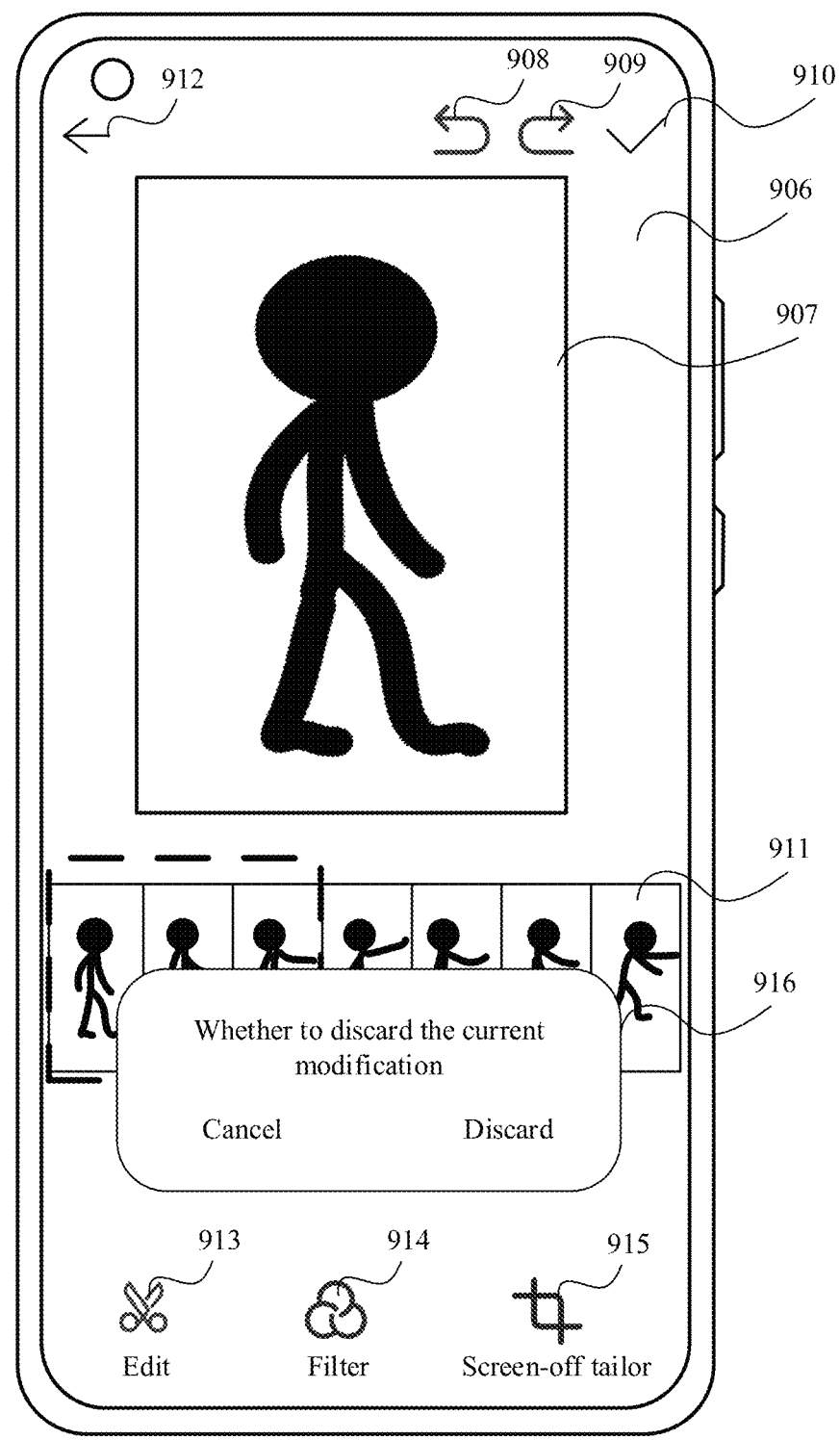
FIG. 9d(2)

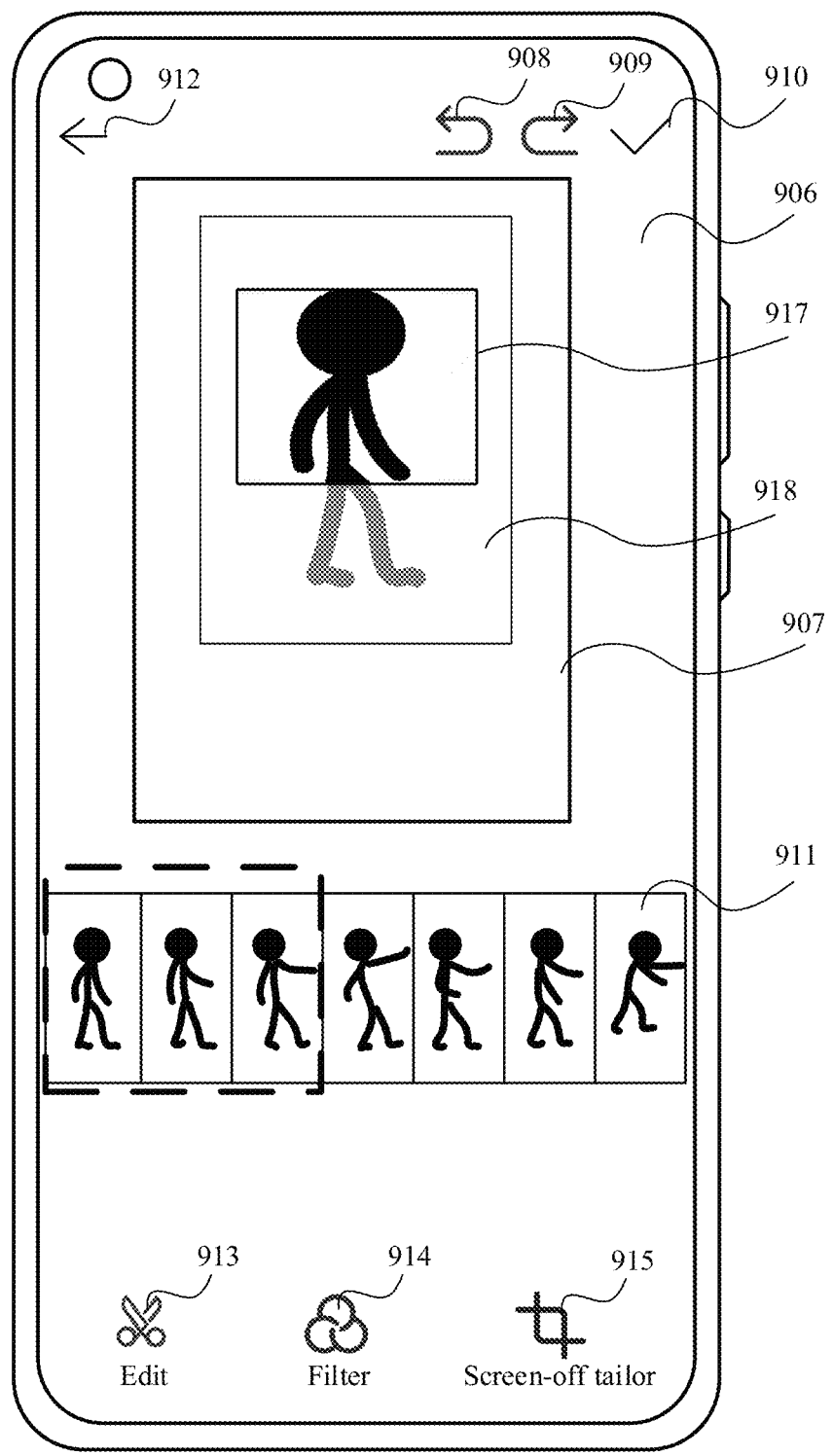
FIG. 9e(1)

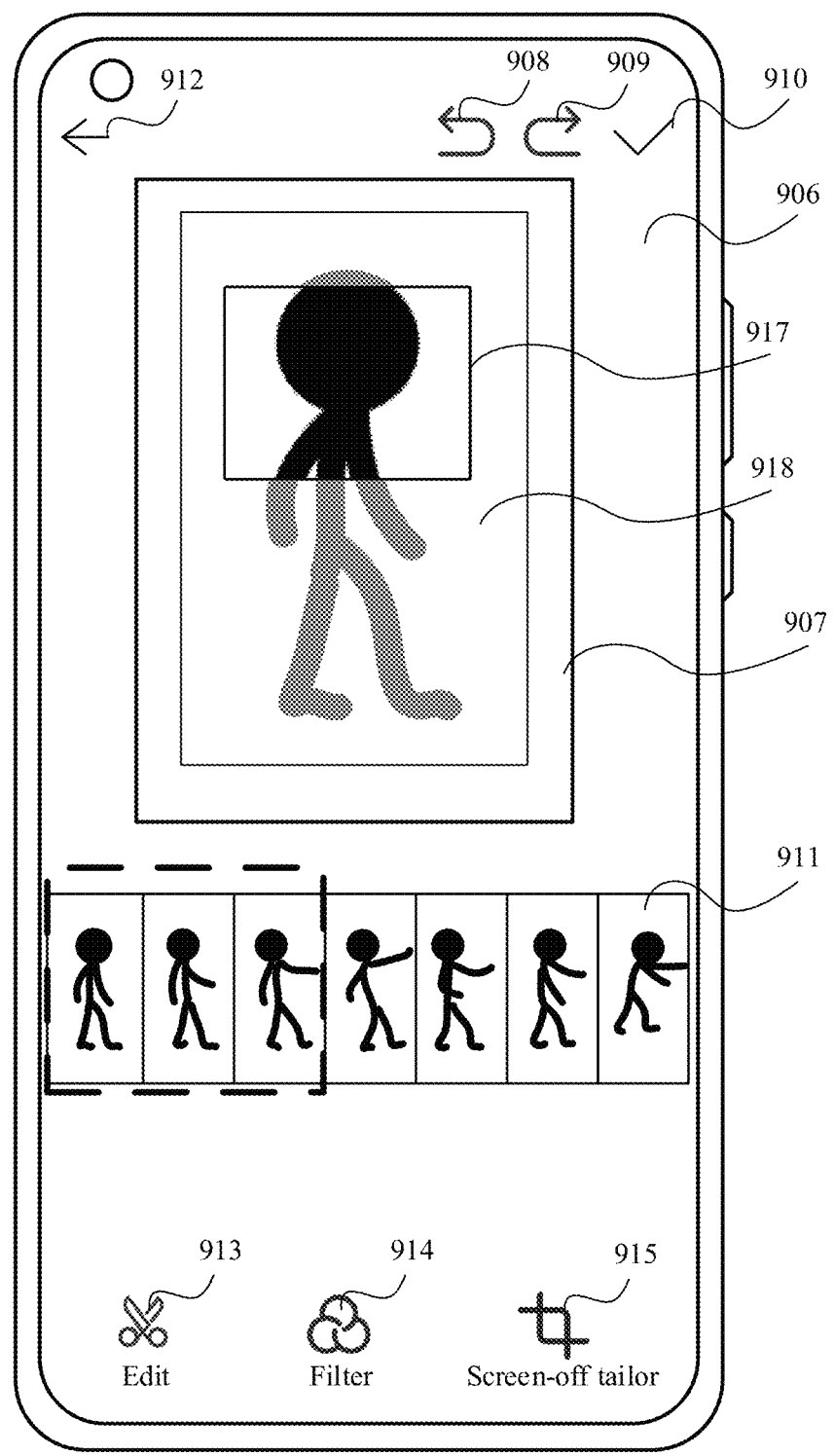
FIG. 9e(2)

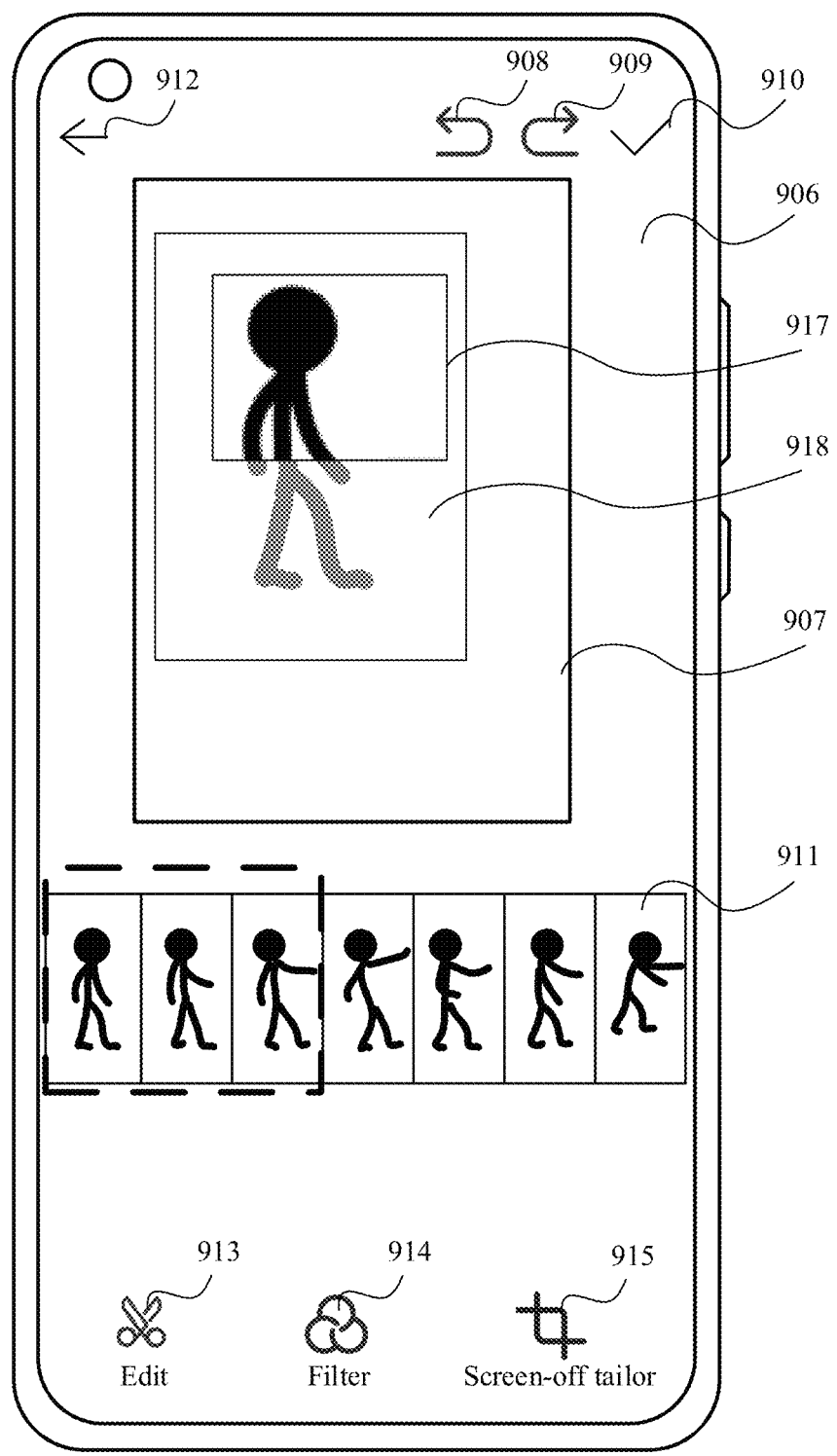
FIG. 9e(3)

DISPLAY METHOD AND ELECTRONIC DEVICE FOR PLAYING TRANSITION ANIMATIONS

CROSS-REFERENCE TO RELATED APPLICATIONS

This application is a national stage of International Application No. PCT/CN2022/081452 filed on Mar. 17, 2022, which claims priority to Chinese Patent Application No. 202110517531.8, filed with China National Intellectual Property Administration on May 12, 2021. The disclosures of the aforementioned applications are hereby incorporated by reference in its entirety.

TECHNICAL FIELD

This application relates to the field of terminal devices, and in particular, to a display method and an electronic device.

BACKGROUND

A long-take animation transition effect may also be referred to as a transition animation, and the transition animation may be understood as an animation effect displayed during switching between different modes of a terminal, thereby improving visual experience when a user uses a mobile phone. However, the transition animation in the terminal is usually preset by a system, and consequently cannot meet a personalized requirement of the user on the transition animation.

SUMMARY

To resolve the foregoing technical problem, this application provides a display method and an electronic device. In this method, the electronic device sets a specified video in the electronic device as a transition animation, so as to improve fluency of switching between different modes and meet a personalized requirement of a user on a transition animation, thereby improving user experience.

According to a first aspect, this application provides an electronic device. The electronic device includes a memory and a processor. The processor is coupled to the memory. The memory stores program instructions, and when the program instructions are executed by the processor, the electronic device is enabled to perform the following steps: displaying a screen-off interface on a display of the electronic device in response to a received first user operation, and playing each image frame of a first transition animation on the screen-off interface; switching the screen-off interface on the display of the electronic device to a lock screen interface in response to a received second user operation, and playing each image frame of a second transition animation on the lock screen interface; and switching the lock screen interface on the display of the electronic device to a desktop in response to a received third user operation, and playing each image frame of a third transition animation on the desktop. The first transition animation, the second transition animation, and the third transition animation are generated based on a first video stored in the electronic device. The last image frame of the first transition animation is the 1st image frame of the second transition animation, and the last image frame of the second transition animation is the 1st image frame of the third transition animation. In this way, the electronic device may use a video stored in the electronic device as a transition animation of a screen-off mode, a transition animation of a lock screen mode, and a transition animation of a desktop mode. Therefore, a user-defined transition animation setting solution is provided, so that a user can freely select an animation effect of a transition animation according to a requirement, to meet a personalized requirement of the user on the transition animation.

For example, when the electronic device receives an operation that the user taps a power button, or when the electronic device detects that the user does not use a mobile phone for a long time, the electronic device may switch from the desktop mode or the lock screen mode to the screen-off mode. For example, the electronic device may display other text information such as a time or a date while playing the transition animation of the screen-off mode on the display.

For example, when the electronic device receives an operation that the user taps the power button, the electronic device may switch from the screen-off mode to the lock screen mode. For example, the text information displayed in the screen-off mode may disappear in a fade-out manner or a fly-out manner while the electronic device displays the transition animation of the lock screen mode on the display. In addition, in a process of displaying the transition animation of the lock screen mode on the display, text information in the lock screen mode such as a time or a date may be displayed on the display. Optionally, a position of displaying the text information in the lock screen mode may be different from a position of displaying the text information in the screen-off mode.

For example, when the electronic device receives a user sliding unlock operation or a face unlock operation, the electronic device switches from the lock screen mode to the desktop mode. For example, the text information displayed in the screen-off mode may disappear in a fade-out manner or a fly-out manner while the electronic device plays the transition animation of the desktop mode on the display. In addition, in a process of displaying the transition animation of the desktop mode on the display, space of the desktop may be displayed on the display, for example, an application icon control.

For example, a length of a video selected by the user is greater than or equal to a specified threshold. Optionally, the specified threshold may be 3 s.

According to the first aspect, when the program instructions are executed by the processor, the electronic device is enabled to perform the following steps: in response to a received fourth user operation, selecting the first video from a plurality of videos stored in the electronic device; dividing the first video into a first sub-video, a second sub-video, and a third sub-video, where the last image frame of the first sub-video is the 1st image frame of the second sub-video, and the last image frame of the second sub-video is the 1st image frame of the third sub-video; and setting the first sub-video as the first transition animation, setting the second sub-video as the second transition animation, and setting the third sub-video as the third transition animation. In this way, the electronic device may provide a "one-tap tailor" mode. To be specific, the electronic device may automatically tailor, in a preset manner, a video selected by the user, to divide the video into three video segments that are applied to transition animations of different modes.

For example, a quantity of image frames included in the first video depends on a length of the video and a frame rate of the video. For example, if a frame rate of the video is 60 fps and a length is 3 s, the video includes 180 image frames.

According to the first aspect or any implementation of the first aspect, the first video includes N image frames, and N is an integer greater than 3; and when the program instructions are executed by the processor, the electronic device is enabled to perform the following steps: dividing the N image frames of the first video into a first image group, a second image group, and a third image group in an image frame playing sequence; and selecting a first image frame from the first image group, selecting a second image frame from the second image group, and selecting a third image frame from the third image group. An image frame between the 1st image frame in the N image frames and the first image frame is the first sub-video, an image frame between the first image frame and the second image frame is the second sub-video, and a video between the second image frame and the third image frame is the third sub-video. In this way, the electronic device may select an image frame from each image group as a key frame of a corresponding mode according to a specified condition. The key frame is the last image frame played by a transition animation of the mode.

For example, the electronic device may divide a video into three image groups on average based on a length of the video or a quantity of image frames of the video. Play lengths of the three image groups are equal or approximately equal.

According to the first aspect or any implementation of the first aspect, when the program instructions are executed by the processor, the electronic device is enabled to perform the following steps: obtaining a quality parameter of each image frame in the N image frames, where the quality parameter includes at least one of the following: clarity, exposure, brightness, contrast, and saturation; selecting the first image frame from the first image group based on a quality parameter of each image frame in the first image group; selecting the second image frame from the second image group based on a quality parameter of each image frame in the second image group; and selecting the third image frame from the third image group based on a quality parameter of each image frame in the third image group. In this way, the electronic device may select an image frame from each image group as a key frame of a corresponding mode according to a specified condition. The key frame is the last image frame played by a transition animation of the mode.

According to the first aspect or any implementation of the first aspect, the first video includes N image frames, and N is an integer greater than 3; and when the program instructions are executed by the processor, the electronic device is enabled to perform the following steps: dividing the N image frames of the first video into a first image group, a second image group, and a third image group in an image frame playing sequence; selecting a first image frame from the first image group in response to a received fifth user operation; selecting a second image frame from the second image group in response to a received sixth user operation; and selecting a third image frame from the third image group in response to a received seventh user operation. An image frame between the 1st image frame in the N image frames and the first image frame is the first sub-video, an image frame between the first image frame and the second image frame is the second sub-video, and a video between the second image frame and the third image frame is the third sub-video. In this way, the electronic device may further provide a manual selection manner, and may select, according to a user requirement in response to a user operation, a video segment played by a transition animation corresponding to each mode.

According to the first aspect or any implementation of the first aspect, when the program instructions are executed by the processor, the electronic device is enabled to perform the following step: when the last image frame of the first transition animation is played on the screen-off interface, statically displaying the last image frame of the first transition animation on the screen-off interface. The last image frame of the first transition animation is the first image frame. In this way, when the electronic device switches from the desktop mode or the lock screen mode to the screen-off mode, because the transition animations are captured from one video, images displayed during switching from the desktop mode to the screen-off mode or switching from the lock screen mode to the screen-off mode can keep consistent. Herein, "consistent" does not mean that the images are the same, but means that the images displayed on the display are uniform and coherent. For example, during switching from the desktop mode to the screen-off mode, if a wallpaper of the desktop mode displays an image of a first object (or a person), the transition animation of the screen-off mode similarly plays a dynamic image of the first object (or the person).

According to the first aspect or any implementation of the first aspect, when the program instructions are executed by the processor, the electronic device is enabled to perform the following steps: tailoring each image frame in the first sub-video based on a specified first size; adjusting, based on a specified second size, a size of each image frame obtained after the tailoring in the first sub-video; and playing, on the screen-off interface, each image frame obtained after the tailoring and the size adjustment in the first sub-video. In this way, the electronic device may provide a manner of displaying the transition animation of the screen-off mode. For example, as shown in FIG. 7 in this application, after performing tailoring and size adjustment on each image frame in the first sub-video, the electronic device may display, on the display, each image frame obtained after the tailoring and the size adjustment.

According to the first aspect or any implementation of the first aspect, the screen-off interface further includes one or more pieces of screen-off text information; and all parts other than the screen-off text information and the played first sub-video on the screen-off interface are black screens.

For example, the screen-off text information may be optionally a time or a date.

According to the first aspect or any implementation of the first aspect, when the program instructions are executed by the processor, the electronic device is enabled to perform the following step: when the last image frame of the second transition animation is played on the lock screen interface, statically displaying the last image frame of the second transition animation on the lock screen interface. The last image frame of the second transition animation is the second image frame. In this way, after the electronic device plays an image frame of the second sub-video, the second image frame may be fixed. In addition, if the electronic device switches from the screen-off mode to the lock screen mode, the display of the electronic device may start to play from a fixed image frame of the screen-off mode, that is, the first image frame, until the second image frame. This improves transition animation coherence during mode switching.

According to the first aspect or any implementation of the first aspect, in a process of playing the second transition animation on the lock screen interface, one or more pieces of lock screen text information are displayed on the lock screen interface.

According to the first aspect or any implementation of the first aspect, a size of each image frame of the second transition animation played on the lock screen interface is the same as a size of the lock screen interface.

According to the first aspect or any implementation of the first aspect, when the program instructions are executed by the processor, the electronic device is enabled to perform the following step: when the last image frame of the third transition animation is played on the desktop, statically displaying the last image frame of the third transition animation on the desktop. The last image frame of the third transition animation is the third image frame. In this way, after the electronic device plays an image frame of the third sub-video, the third image frame may be fixed. In addition, if the electronic device switches from the lock screen mode to the desktop mode, the display of the electronic device may start to play from a fixed image frame of the lock screen mode, that is, the second image frame, until the third image frame. This improves transition animation coherence during mode switching.

According to the first aspect or any implementation of the first aspect, in a process of playing the third transition animation on the desktop, a plurality of controls are displayed on the desktop, and the plurality of controls include at least one of the following: an application icon control, a network control, and a power control.

For example, the user may trigger the application icon control to enter a corresponding application interface.

According to the first aspect or any implementation of the first aspect, a size of each image frame of the third transition animation played on the desktop is the same as a size of the desktop. In this way, in this application, a desktop display manner can be enriched, and a visual effect of desktop display can be improved.

According to a second aspect, this application provides a display method. The method includes: An electronic device displays a screen-off interface on a display of the electronic device in response to a received first user operation, and plays each image frame of a first transition animation on the screen-off interface. The electronic device switches the screen-off interface on the display of the electronic device to a lock screen interface in response to a received second user operation, and plays each image frame of a second transition animation on the lock screen interface. The electronic device switches the lock screen interface on the display of the electronic device to a desktop in response to a received third user operation, and plays each image frame of a third transition animation on the desktop. The first transition animation, the second transition animation, and the third transition animation are generated based on a first video stored in the electronic device. The last image frame of the first transition animation is the 1st image frame of the second transition animation, and the last image frame of the second transition animation is the 1st image frame of the third transition animation.

According to the second aspect, before the electronic device displays the screen-off interface on the display of the electronic device in response to the received first user operation, the method includes: In response to a received fourth user operation, the electronic device selects the first video from a plurality of videos stored in the electronic device. The electronic device divides the first video into a first sub-video, a second sub-video, and a third sub-video. The last image frame of the first sub-video is the 1st image frame of the second sub-video, and the last image frame of the second sub-video is the 1st image frame of the third sub-video. The electronic device sets the first sub-video as the first transition animation, sets the second sub-video as the second transition animation, and sets the third sub-video as the third transition animation.

According to the second aspect or any implementation of the second aspect, the first video includes N image frames, and N is an integer greater than 3; and that the electronic device divides the first video into a first sub-video, a second sub-video, and a third sub-video includes: The electronic device divides the N image frames of the first video into a first image group, a second image group, and a third image group in an image frame playing sequence; and the electronic device selects a first image frame from the first image group, selects a second image frame from the second image group, and selects a third image frame from the third image group. An image frame between the 1st image frame in the N image frames and the first image frame is the first sub-video, an image frame between the first image frame and the second image frame is the second sub-video, and a video between the second image frame and the third image frame is the third sub-video.

According to the second aspect or any implementation of the second aspect, that the electronic device selects a first image frame from the first image group, selects a second image frame from the second image group, and selects a third image frame from the third image group includes: obtaining a quality parameter of each image frame in the N image frames, where the quality parameter includes at least one of the following: clarity, exposure, brightness, contrast, and saturation; selecting the first image frame from the first image group based on a quality parameter of each image frame in the first image group; selecting the second image frame from the second image group based on a quality parameter of each image frame in the second image group; and selecting the third image frame from the third image group based on a quality parameter of each image frame in the third image group.

According to the second aspect or any implementation of the second aspect, the first video includes N image frames, and N is an integer greater than 3; and that the electronic device divides the first video into a first sub-video, a second sub-video, and a third sub-video includes: dividing the N image frames of the first video into a first image group, a second image group, and a third image group in an image frame playing sequence; selecting a first image frame from the first image group in response to a received fifth user operation; selecting a second image frame from the second image group in response to a received sixth user operation; and selecting a third image frame from the third image group in response to a received seventh user operation. An image frame between the 1st image frame in the N image frames and the first image frame is the first sub-video, an image frame between the first image frame and the second image frame is the second sub-video, and a video between the second image frame and the third image frame is the third sub-video.

According to the second aspect or any implementation of the second aspect, the displaying a screen-off interface on a display of the electronic device includes: when the last image frame of the first transition animation is played on the screen-off interface, statically displaying the last image frame of the first transition animation on the screen-off interface. The last image frame of the first transition animation is the first image frame.

According to the second aspect or any implementation of the second aspect, the displaying a screen-off interface on a display of the electronic device includes: tailoring each image frame in the first sub-video based on a specified first size; adjusting, based on a specified second size, a size of each image frame obtained after tailoring in the first sub-video; and playing, on the screen-off interface, each image frame obtained after tailoring and size adjustment in the first sub-video.

According to the second aspect or any implementation of the second aspect, the screen-off interface further includes one or more pieces of screen-off text information; and all parts other than the screen-off text information and the played first sub-video on the screen-off interface are black screens.

According to the second aspect or any implementation of the second aspect, the switching the screen-off interface on the display of the electronic device to a lock screen interface includes: when the last image frame of the second transition animation is played on the lock screen interface, statically displaying the last image frame of the second transition animation on the lock screen interface. The last image frame of the second transition animation is the second image frame.

According to the second aspect or any implementation of the second aspect, in a process of playing the second transition animation on the lock screen interface, one or more pieces of lock screen text information are displayed on the lock screen interface.

According to the second aspect or any implementation of the second aspect, a size of each image frame of the second transition animation played on the lock screen interface is the same as a size of the lock screen interface.

According to the second aspect or any implementation of the second aspect, the switching the lock screen interface on the display of the electronic device to a desktop includes: when the last image frame of the third transition animation is played on the desktop, statically displaying the last image frame of the third transition animation on the desktop. The last image frame of the third transition animation is the third image frame.

According to the second aspect or any implementation of the second aspect, in a process of playing the third transition animation on the desktop, a plurality of controls are displayed on the desktop, and the plurality of controls include at least one of the following: an application icon control, a network control, and a power control.

According to the second aspect or any implementation of the second aspect, a size of each image frame of the third transition animation played on the desktop is the same as a size of the desktop.

The second aspect and any implementation of the second aspect respectively correspond to the first aspect and any implementation of the first aspect. For a technical effect corresponding to the second aspect and any implementation of the second aspect, refer to the technical effect corresponding to the first aspect and any implementation of the first aspect. Details are not described herein again.

According to a third aspect, this application provides a computer-readable medium, configured to store a computer program. The computer program includes instructions used to perform the method according to the second aspect or any possible implementation of the second aspect.

According to a fourth aspect, this application provides a computer program. The computer program includes instructions used to perform the method according to the second aspect or any possible implementation of the second aspect.

According to a fifth aspect, this application provides a chip. The chip includes a processing circuit and a transceiver pin. The transceiver pin and the processing circuit communicate with each other through an internal connection path, and the processing circuit performs the method according to the second aspect or any possible implementation of the second aspect, so as to control a receiving pin to receive a signal and control a sending pin to send a signal.

BRIEF DESCRIPTION OF THE DRAWINGS

FIG. 9a to FIG. 9e(3) are schematic diagrams of example user interfaces;

DETAILED DESCRIPTION OF ILLUSTRATIVE EMBODIMENTS

The following clearly and completely describes technical solutions in embodiments of this application with reference to the accompanying drawings in embodiments of this application. Apparently, described embodiments are some rather than all of embodiments of this application. According to embodiments of this application, all other embodiments obtained by a person of ordinary skill in the art without creative efforts fall within the protection scope of this application.

In this specification, a term "and/or" is merely an association relationship between associated objects, and indicates that three relationships may exist. For example, A and/or B may indicate three cases: Only A exists, both A and B exist, and only B exists.

Terms "first" and "second" in this specification and the claims of embodiments of this application are used to distinguish between different objects, and are not used to describe a specific sequence of the objects. For example, a first target object and a second target object are used to distinguish between different target objects, and are not used to describe a specific order of the target objects.

In embodiments of this application, a word such as "example" or "for example" is used to indicate an example, an illustration, or a description. Any embodiment or design solution described as "example" or "for example" in embodiments of this application is not to be construed as being more preferred or advantageous than other embodiments or design solutions. Specifically, the word such as "example" or "for example" presents a related concept in a specific manner.

In the descriptions of embodiments of this application, unless otherwise stated, "a plurality of" means two or more.

For example, a plurality of processing units mean two or more processing units, and a plurality of systems mean two or more systems.

Figure 1:
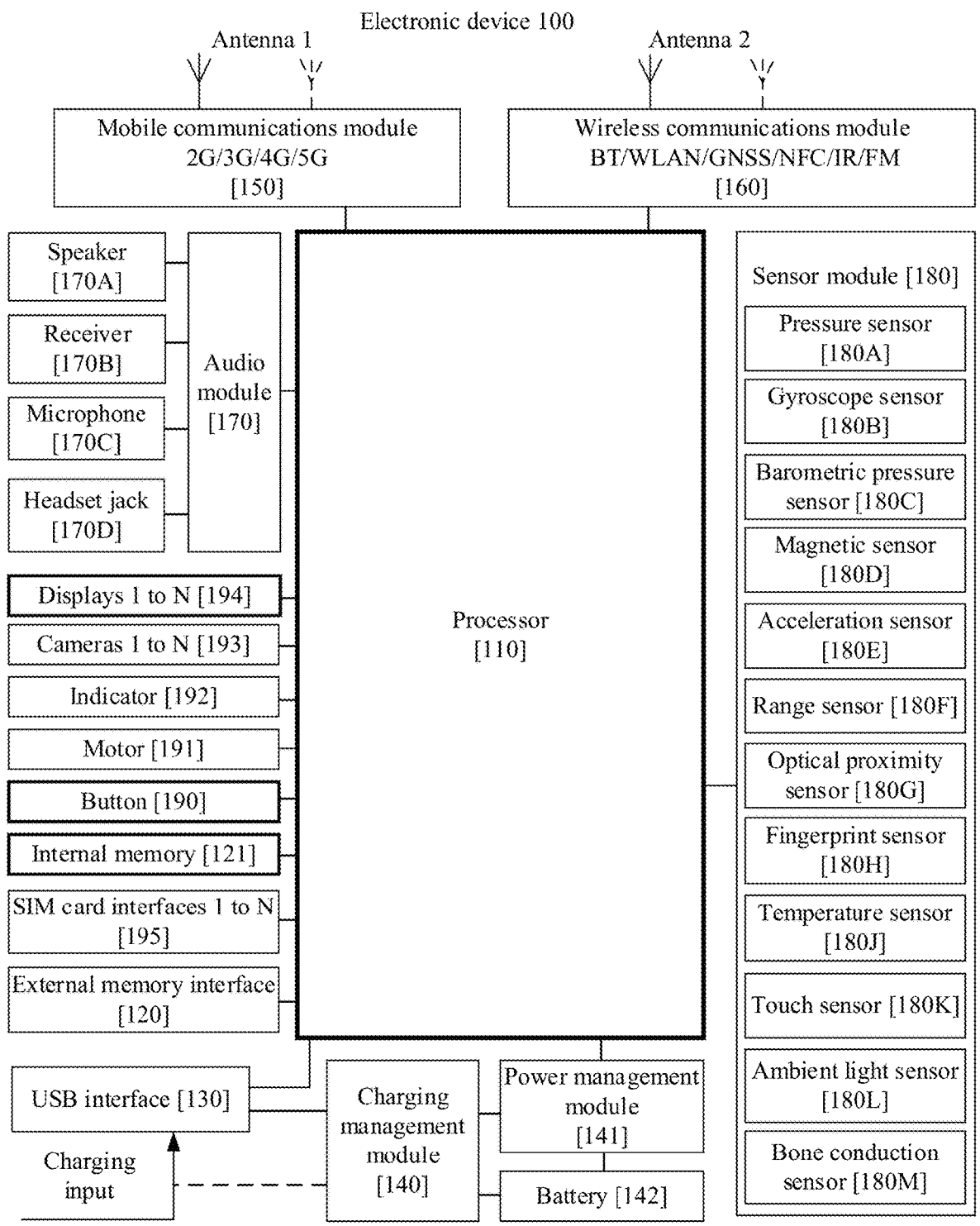
FIG. 1 is a schematic diagram of an example hardware structure of an electronic device.

FIG. 1 is a schematic diagram of a structure of an electronic device 100. It should be understood that the electronic device 100 shown in FIG. 1 is only an example of an electronic device. In addition, the electronic device 100 may have more or fewer components than those shown in the figure, or may combine two or more components, or may have different component configurations. The various components shown in FIG. 1 may be implemented in hardware, software, or a combination of hardware and software including one or more signal processing and/or application-specific integrated circuits.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a neural center and a command center of the electronic device 100. The controller may generate an operation control signal based on instruction operation code and a time sequence signal, to complete control of instruction fetching and instruction execution.

The memory may be further disposed in the processor 110, and is configured to store an instruction and data. In some embodiments, the memory in the processor 110 is a cache. The memory may store an instruction or data that is just used or cyclically used by the processor 110. If the processor 110 needs to use the instruction or data again, the processor may directly invoke the instruction or data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that the interface connection relationship between the modules shown in this embodiment of this application is merely a schematic description, and does not constitute a limitation on the structure of the electronic device 100. In some other embodiments of this application, the electronic device 100 may alternatively use different interface connection manners in the foregoing embodiment, or may use a combination of a plurality of interface connection manners.

The charging management module 140 is configured to receive a charging input from a charger. The charger may be a wireless charger, or may be a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. While charging the battery 142, the charging management module 140 may further supply power to the electronic device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the external memory, the display 194, the camera 193, the wireless communications module 160, and the like. The power management module 141 may be further configured to monitor parameters such as a battery capacity, a battery cycle count, and a battery health state (leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications bands. Different antennas may be further multiplexed to increase antenna utilization. For example, the antenna 1 may be multiplexed as a diversity antenna of a wireless local area network. In some other embodiments, the antenna may be used in combination with a tuning switch.

The mobile communications module 150 may provide a solution, applied to the electronic device 100, to wireless communication including 2G, 3G, 4G, 5G, or the like. The mobile communications module 150 may include at least one filter, a switch, a power amplifier, a low noise amplifier (low noise amplifier, LNA), and the like.

The wireless communications module 160 may provide a solution, applied to the electronic device 100, to wireless communication including a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the to-be-sent signal, and convert the to-be-sent signal into an electromagnetic wave for radiation through the antenna 2.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-oLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The camera 193 is configured to capture a static image or a video. An object generates an optical image through a lens and projects the optical image to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The external memory interface 120 may be configured to connect to an external storage card, such as a micro SD card, to extend a storage capability of the electronic device 100. The external storage card communicates with the processor 110 through the external memory interface 120, to implement a data storage function. For example, files such as music or videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. For example, in this embodiment of this application, the processor 110 may run the instructions stored in the internal memory 121, to generate a transition animation based on a video in the electronic device 100. In addition, the electronic device 100 may play the generated transition animation on the display 194.

The internal memory 121 may include a program storage area and a data storage area. The program storage area may store an operating system, an application required by at least one function (for example, a sound playing function or an image playing function), and the like. The data storage area may store data (such as audio data or an address book) created when the electronic device 100 is used. In addition, the internal memory 121 may include a high-speed random access memory, or may include a nonvolatile memory, such as at least one disk storage device, a flash memory, or a universal flash storage (universal flash storage, UFS).

The electronic device 100 may implement an audio function such as music playing or recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules of the audio module 170 may be disposed in the processor 110.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch position based on a detection signal of the pressure sensor 180A. In some embodiments, touch operations that are performed at a same touch position but have different touch operation intensity may correspond to different operation instructions. For example, when a touch operation whose touch operation intensity is less than a first pressure threshold is performed on a Messages application icon, an instruction for viewing an SMS message is performed. When a touch operation whose touch operation intensity is greater than or equal to the first pressure threshold is performed on the Messages application icon, an instruction for creating a new SMS message is performed.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. For example, in this embodiment of this application, the fingerprint sensor 180H may collect a fingerprint obtained when a user touches a touchscreen, and transmit the collected fingerprint to the processor 110. For example, the processor 110 may unlock the electronic device 100 based on fingerprint information that is input by the fingerprint sensor 180H.

The touch sensor 180K is also referred to as a "touch panel". The touch sensor 180K may be disposed on the display 194. The touch sensor 180K and the display 194 form a touchscreen, which is also referred to as a "touchscreen". The touch sensor 180K is configured to detect a touch operation performed on or near the touch sensor 180K. The touch sensor may transfer the detected touch operation to the application processor to determine a touch event type. A visual output related to the touch operation may be provided by the display 194. In some other embodiments, the touch sensor 180K may alternatively be disposed on a surface of the electronic device 100 at a position different from that of the display 194.

The button 190 includes a power button, a volume button, and the like. The button 190 may be a mechanical button, or may be a touch button. The electronic device 100 may receive a key input, and generate a key signal input related to a user setting and function control of the electronic device 100. For example, in this embodiment of this application, if the electronic device 100 is in a lock screen mode or a desktop mode, the electronic device 100 receives an operation that the user taps the power button, the electronic device 100 may enter a screen-off mode, and the electronic device 100 may play a transition animation of the screen-off mode on the display 194.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

A software system of the electronic device 100 may use a layered architecture, an event-driven architecture, a micro-kernel architecture, a micro service architecture, or a cloud architecture. In this embodiment of this application, an Android system of a layered architecture is used as an example to describe a software structure of the electronic device 100.

Figure 2:
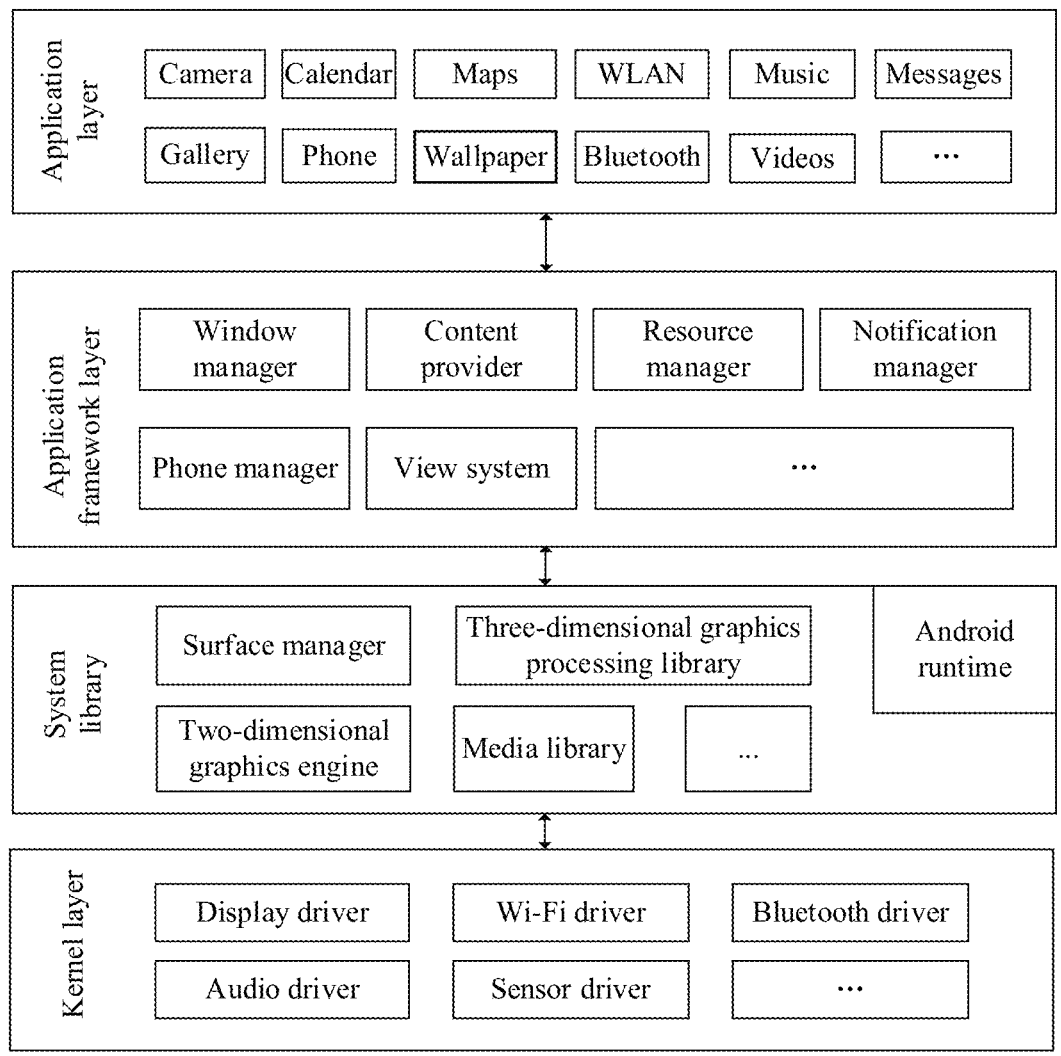
FIG. 2 is a schematic diagram of an example software structure of an electronic device.

FIG. 2 is a block diagram of the software structure of the electronic device 100 according to an embodiment of this application.

In the layered architecture of the electronic device 100, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Maps, Navigation, WLAN, Bluetooth, Music, Videos, Messages, and Wallpaper (also referred to as Desktop & Wallpaper). For example, the wallpaper application may implement a manner of generating and displaying a wallpaper or a transition animation in this embodiment of this application.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a display size, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, an address book, and the like.

The view system includes visual controls such as a control for displaying text and a control for displaying an image. The view system may be configured to construct an application. A display interface may include one or more views. For example, a display interface including an SMS notification icon may include a view for displaying text and a view for displaying an image.

The phone manager is configured to provide a communication function for the electronic device 100, for example, management of a call status (including answering and declining).

The resource manager provides an application with various resources such as a localized character string, an icon, an image, a layout file, and a video file.

The notification manager enables an application to display notification information in a status bar, and may be configured to convey a notification type message. The notification type message may automatically disappear after a short pause without requiring a user interaction. For example, the notification manager is configured to notify download completion, and give a message notification. The notification manager may alternatively be a notification that appears in a top status bar of the system in a form of a graph or a scroll bar text, for example, a notification of an application running on the background, or may be a notification that appears on the screen in a form of a dialog window. For example, text information is displayed in the status bar, an alert sound is made, the electronic device vibrates, or an indicator light blinks.

The Android runtime includes a kernel library and a virtual machine. The Android runtime is responsible for scheduling and management of the Android system.

The kernel library includes two parts: a function that needs to be invoked in Java language, and a kernel library of Android.

The application layer and the application framework layer run on the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It may be understood that components included in the application framework layer and the Android runtime and system library shown in FIG. 2 do not constitute a specific limitation on the electronic device 100. In some other embodiments of this application, the electronic device 100 may include more or fewer components than those shown in the figure, or combine some components, or split some components, or have different component arrangements.

In embodiments of this application, in response to a user instruction, a terminal may set a video stored in the terminal as a transition animation (which may also be referred to as a transition effect or a transition effect), to implement a user-defined transition animation setting, thereby enriching transition animation content and improving user experience.

It should be noted that the transition animation involved in embodiments of this application may be understood as an animation effect used during switching between different modes. The modes in embodiments of this application include but is not limited to a screen-off mode, a lock screen mode, and a desktop mode. For example, in the following embodiment of this application, a transition animation of the screen-off mode is optionally a transition animation played during switching from the desktop mode to the screen-off mode; a transition animation of the lock screen mode is optionally a transition animation played during switching from the screen-off mode to the lock screen mode; and a transition animation of the desktop mode is optionally a transition animation played during switching from the lock screen mode to the desktop mode. Optionally, the desktop mode may also be referred to as an unlock screen mode. This is not limited in this application.

For example, the screen-off mode is optionally a mode that an electronic device enters after a user taps a power button, and the electronic device screens off and displays the transition animation of the screen-off mode on a screen-off display.

For example, the lock screen mode optionally means screen locking of the electronic device. For example, in the screen-off mode, the user performs a touch operation or a button press operation on the mobile phone, to optionally enable the electronic device to enter the lock screen mode. For example, a screen is locked in the lock screen mode, and the user needs to unlock the screen to enter the desktop mode. For example, the lock screen mode may provide some functions that can be used without unlocking, such as a photographing function and a widget. In other words, in the lock screen mode, the user may perform a corresponding operation on the electronic device. In the screen-off mode, when the user triggers the electronic device, the electronic device enters the lock screen mode.

For example, the desktop mode is a mode obtained after the electronic device is unlocked. For example, in the desktop mode, the user may operate the electronic device to use a corresponding function provided by the electronic device. For example, the user may use a chat application or a video application.

It should be noted that mode switching in embodiments of this application, for example, including switching from the screen-off mode to the lock screen mode, switching from the lock screen mode to the desktop, or switching from the desktop (or the lock screen mode) to the screen-off mode, is optionally interface switching. For example, switching from the screen-off mode to the lock screen mode is optionally switching from a screen-off interface displayed on the display of the mobile phone to a lock screen interface. All interfaces (including the screen-off interface, the lock screen interface, and the desktop) in embodiments of this application are interfaces displayed in full screen. To be specific, when the display switches from one interface (for example, the screen-off interface) to another interface (for example, the lock screen interface), the one interface (that is, the screen-off interface) is not displayed, and the another interface (that is, the lock screen interface) is displayed on the display in full screen.

In embodiments of this application, a transition animation setting manner is described in detail from three parts: video segment selection, key frame selection, and a display manner. The following describes the foregoing three parts in detail with reference to a specific embodiment.

1. Video Segment Selection

In this embodiment of this application, a terminal may select, according to a user instruction, a video stored in the terminal as a transition animation. Optionally, the video stored in the terminal may be shot by a camera of the terminal, or may be downloaded. This is not limited in this application.

For example, the terminal may provide two types of setting entrances, so that a user selects a video as a transition animation. One type of setting entry is a gallery entry. The other type of setting entry is a desktop and wallpaper application entry. It should be noted that the setting manner shown in this embodiment of this application is only an example. In another embodiment, the terminal may alternatively provide another setting entry, so that the user sets a specified video as a transition animation.

Figure 3A:
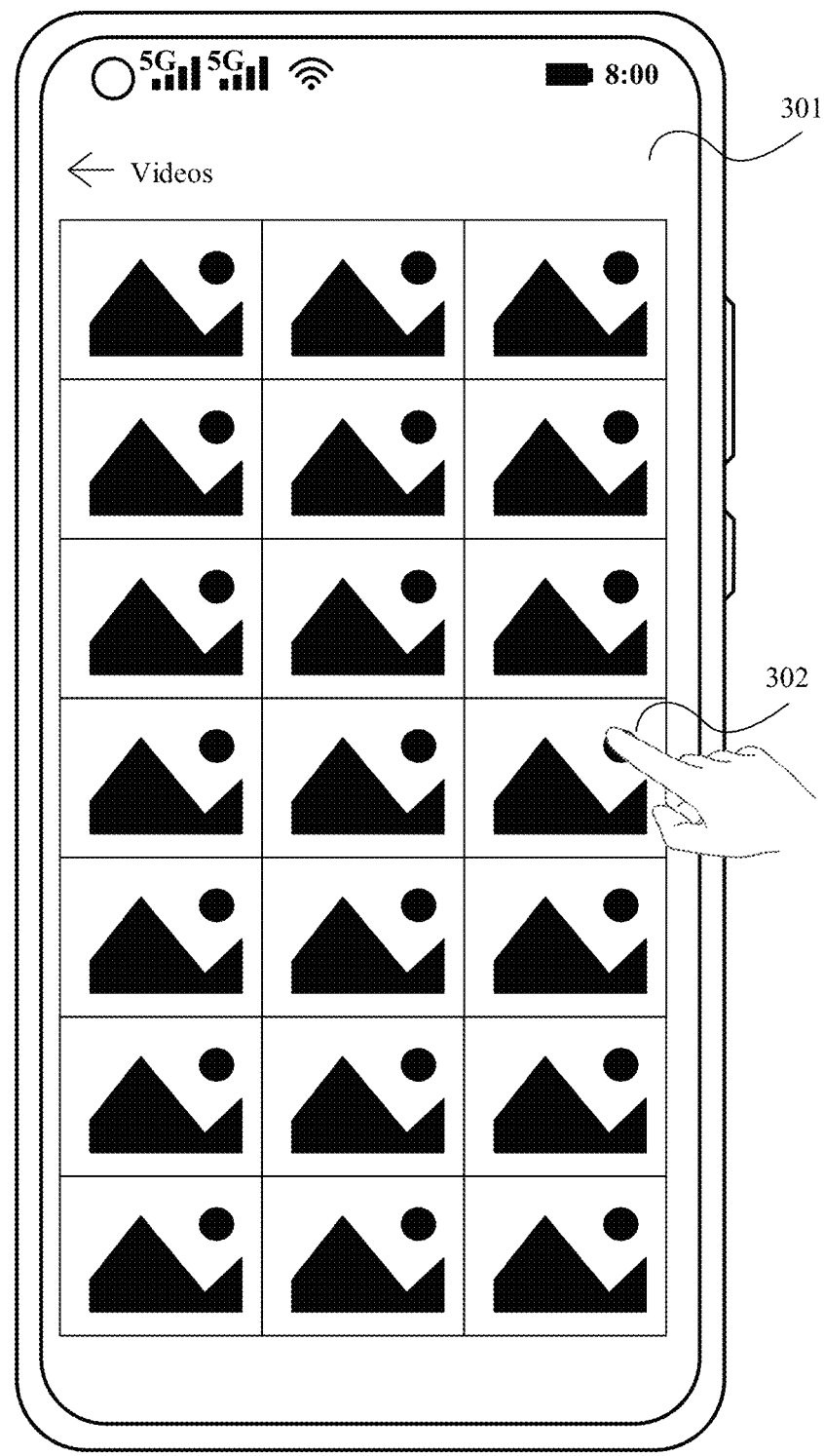
FIG. 3a to FIG. 3d are schematic diagrams of an example manner of setting a gallery entry.

FIG. 3a to FIG. 3d are schematic diagrams of an example manner of setting a gallery entry. As shown in FIG. 3a, for example, the terminal may display a video album interface 301 in response to a received user operation. For example, the video album interface 301 includes one or more video thumbnails. It should be noted that, in this embodiment of this application, a video album interface is used as an example for description. In another embodiment, the user may alternatively select a gallery album or another album including a video. This is not limited in this application.

As shown in FIG. 3a, for example, the user may tap any video on the video album interface 301, for example, a video 302. Optionally, in this embodiment of this application, the terminal may set a video length threshold. For example, when a length of the video selected by the user is less than the video length threshold, the terminal may display a prompt box, and the prompt box may include indication information. The indication information may be used to indicate that the length of the selected video is less than the video length threshold, and prompt the user to reselect another video whose video length is greater than or equal to the video length threshold. For example, in this embodiment of this application, the video length threshold is 3 s (seconds). The video length threshold may be set according to an actual requirement. This is not limited in this application.

Figure 3B:

As shown in FIG. 3b, for example, the terminal displays a video preview interface 303 (which may also be referred to as a video edit interface) in response to the received user operation. For example, the video preview interface 303 includes but is not limited to a video preview window 304, and the video preview window 304 may be configured to display the video selected by the user. The user may watch the selected video by tapping a play option in the video preview window 304.

Figure 3C:
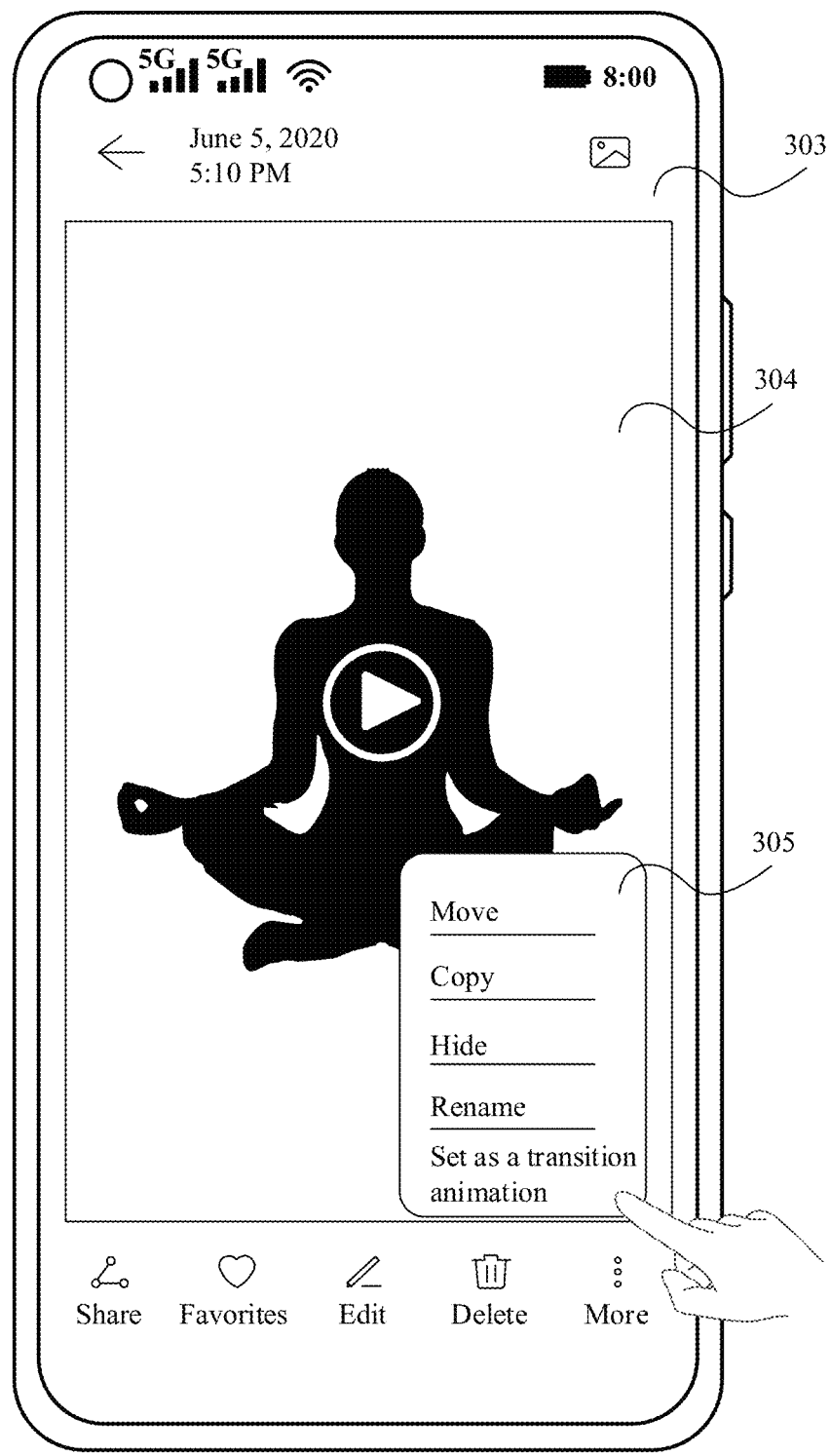

The video preview interface 303 further includes one or more controls, such as a "Share" control, a "Favorites" control, an "Edit" control, a "Delete" control, and a "More" control 305. For example, the user may tap the "More" control 305. As shown in FIG. 3c, the terminal displays a list 305 on the video preview interface 303 in response to the received user operation. For example, the list 305 may include but is not limited to one or more options, such as a "Move" option, a "Copy" option, a "Hide" option, a "Rename" option, and a "Set as transition animation" option.

Figure 3D:
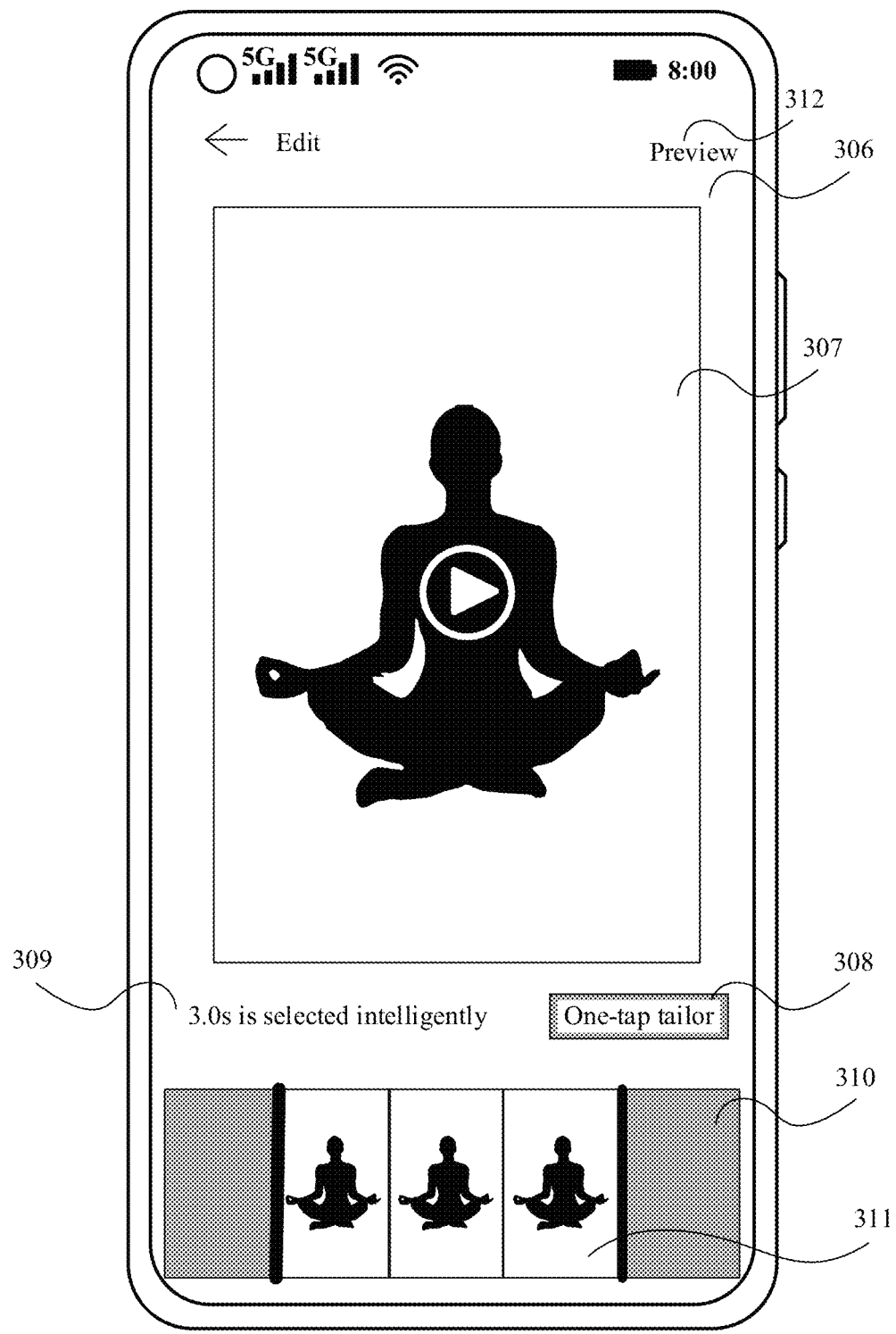

For example, the user may tap the "Set as transition animation" option. As shown in FIG. 3d, for example, the terminal displays a transition animation edit interface 306 in response to the received user operation. For example, the transition animation edit interface 306 includes but is not limited to a video preview window 307, a "One-tap tailor" option 308, video selection length prompt information 309, an image frame display window 310, and a "Preview" option 312.

For example, the image frame display window 310 may be configured to display an image group of the selected video, and the image group includes a plurality of image frames. It should be noted that the image frame in this embodiment of this application may also be referred to as a video frame, a video image, or the like.

In this embodiment of this application, an example in which a length of the selected video is 6 s, and a frame rate (that is, a quantity of included image frames per second) is 60 fps is used for description, to be specific, the selected video includes 360 image frames. In another embodiment, the length of the selected video may be greater than or equal to the video length threshold (refer to the descriptions above). The frame rate may alternatively be another value, for example, 80 fps or 90 fps. This is not limited in this application.

For example, in this embodiment of this application, the image frame display window 310 may display the image frames of the selected video in a folding manner. A specific quantity of displayed image frames depends on a length of the image frame display window 310 and a width of each image frame thumbnail. For example, in this embodiment of this application, the terminal may divide the image frames of the selected video, for example, divide every 10 image frames into one group; and the terminal extracts the first image frame in each group and displays the first image frame in the image frame display window 310. For example, the length of the selected video is 6 s, and the frame rate is 60 fps, to be specific, the video includes 360 image frames. The terminal may divide the 360 images, and extract 36 image frames from the 360 images for display in the image frame display window 310.

For example, the image frame display window 310 includes an image frame selection box 311. For example, the image frame selection box 311 is configured to select a video segment from a selected video as a transition animation.

For example, in this embodiment of this application, the terminal optionally enters a "one-tap tailor" mode by default, to be specific, automatically tailors the video. For example, after entering the transition animation edit interface 306 in response to the received user operation, the terminal may automatically select a video segment from the selected video as a transition animation. Correspondingly, when the "One-tap tailor" option 308 is selected, it indicates that the terminal currently enters the "one-tap tailor" mode. For example, the automatic tailoring manner is optionally as follows: After performing gray processing on all image frames included in a video, the terminal obtains an inter-frame difference value between the image frames. The terminal may select a video segment from the video based on the obtained inter-frame difference value. The foregoing selection manner is only an example. In another embodiment, the terminal may alternatively select a video segment as a transition animation according to another selection rule. This is not limited in this application.

For example, in this embodiment of this application, an example in which a length of a video selected as a transition animation is set to 3 s is used for description. In another embodiment, the length of the selected video may be set according to an actual requirement. This is not limited in this application. For example, in this embodiment of this application, the terminal may select a 3 s video segment from the selected video in the foregoing manner, and display, in the image frame selection box 311, the video segment selected as a transition animation.

Optionally, another image frame that is not selected as a transition animation, that is, an image frame outside the image frame selection block 311, may display a corresponding gray image, so as to indicate that the image frame is not selected, as shown in FIG. 3d. The display manner is only an example. This is not limited in this application.

For example, the video selection length prompt information 309 may be used to indicate a length of a video segment selected as a transition animation. For example, in this embodiment of this application, the length of the video segment selected as a transition animation is 3 s, and the video selection length prompt information 309 may be used to indicate that the length of the video segment selected as a transition animation is 3 s. For example, the video selection length prompt information 309 may be further used to prompt that a video segment selected as a transition animation is automatically tailored. For example, if the prompt information is "3.0 s intelligently selected", it indicates that a video segment selected as a transition animation is automatically tailored, and a length is 3 s.

For example, the video preview window 307 is configured to preview a video segment selected as a transition animation. It may also be understood that the video preview window 307 is configured to preview a video segment selected by the image frame selection box 311. For example, the user may tap a play button in the video preview window 307, and the terminal plays, in the video preview window 307 in response to the received user operation, a video segment selected by the image frame selection box 311.

For example, the "Preview" option 312 is configured to enter a video preview transition animation preview interface. Specific descriptions are provided in detail in the following embodiment.

Figure 4A:
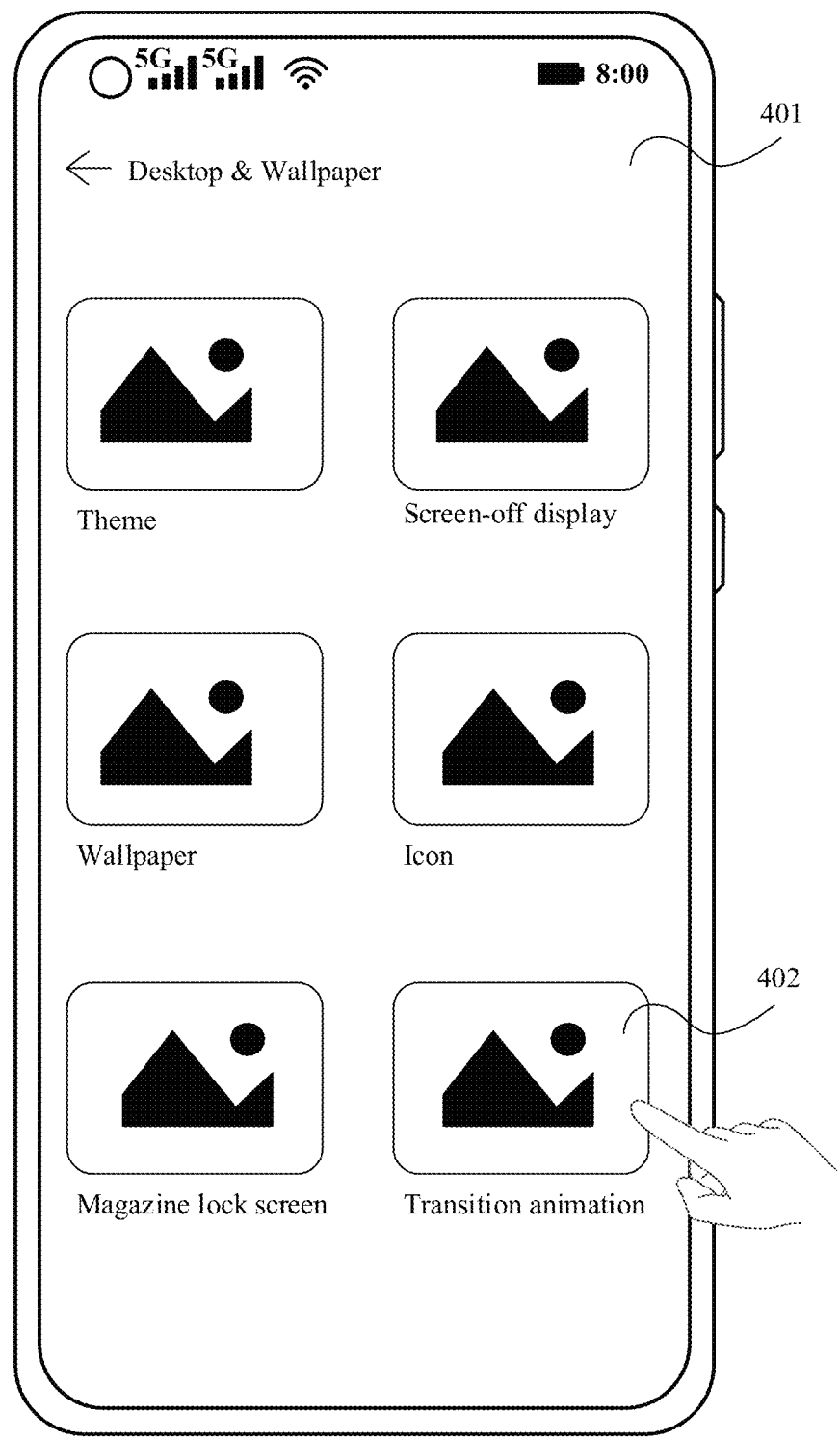
FIG. 4a to FIG. 4c are schematic diagrams of an example manner of setting a desktop and wallpaper application setting entry.
Figure 4B:
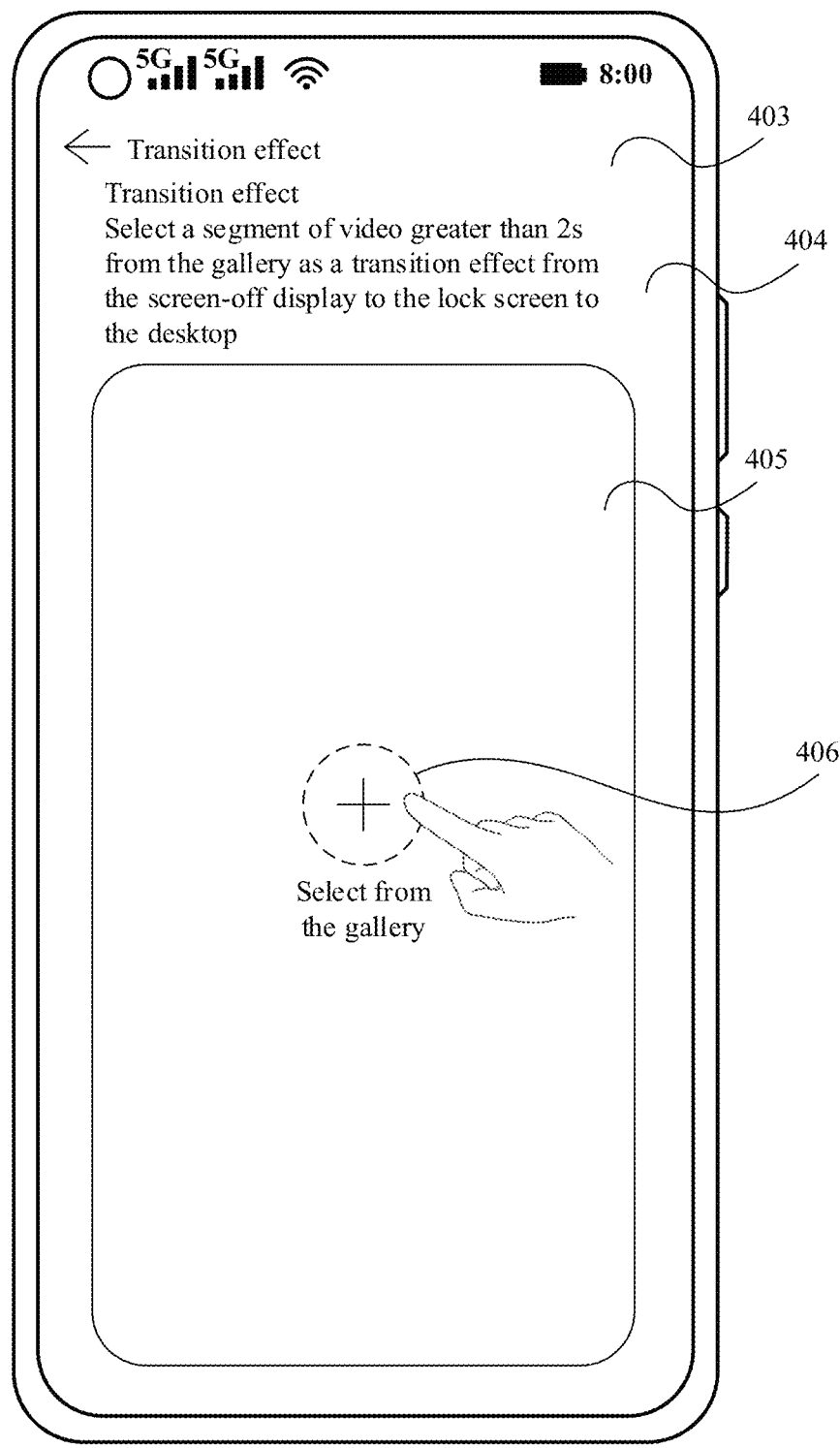
Figure 4C:
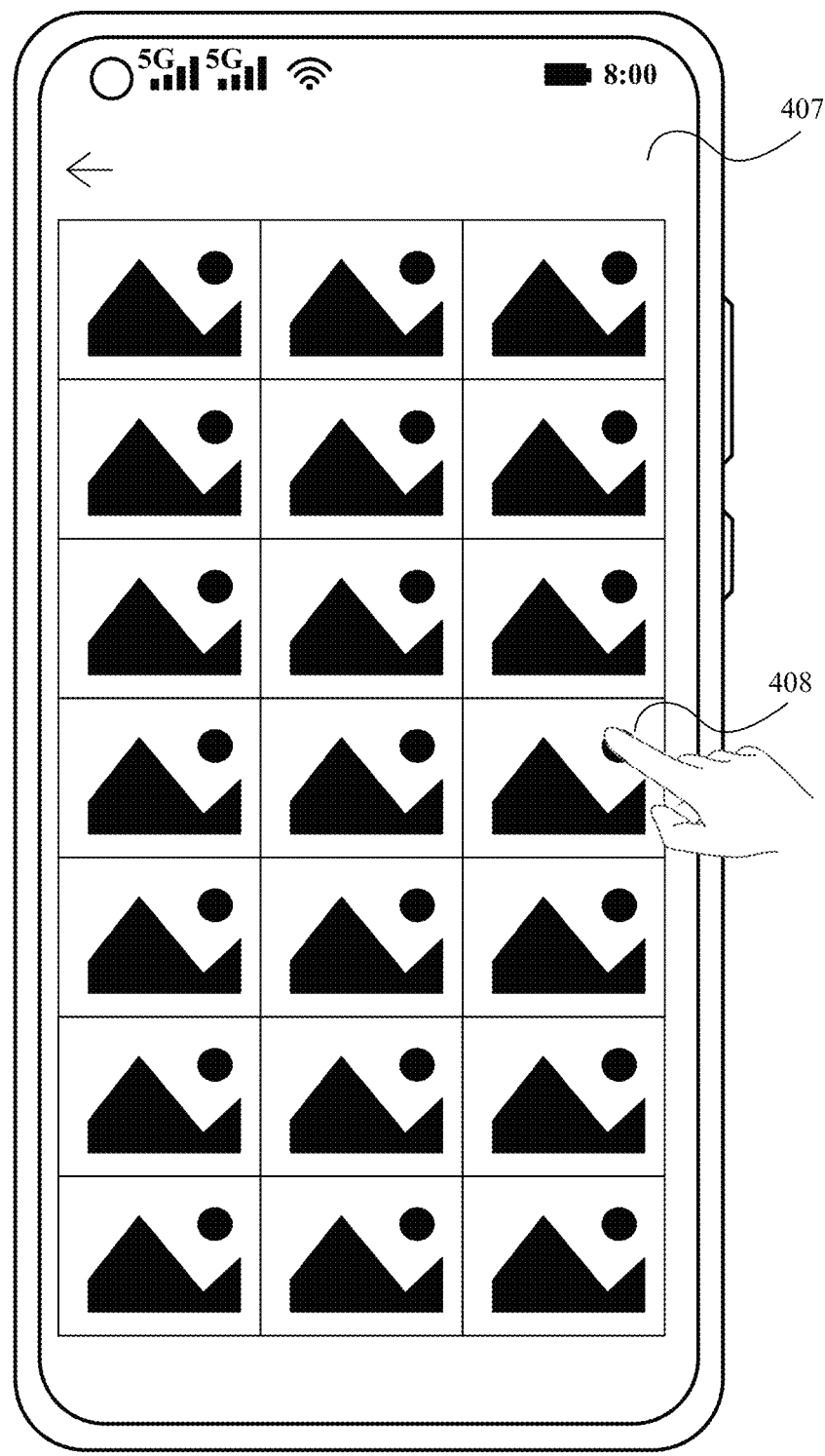

FIG. 4a to FIG. 4c are schematic diagrams of an example manner of setting a desktop and wallpaper application setting entry. As shown in FIG. 4a, for example, a desktop and wallpaper setting interface 401 may include one or more options, such as a "Theme" option, a "Screen-off display" option, a "Wallpaper" option, an "Icon" option, a "Magazine lock screen" option, and a "Transition animation" option 402.

For example, the user may tap the "Transition animation" option 402. As shown in FIG. 4b, the terminal displays a transition animation setting interface 403 in response to the received user operation. For example, the transition animation setting interface 403 includes but is not limited to prompt information 404 and a transition animation display window 405.

For example, the prompt information 404 is used to prompt the user to select a video segment whose length is greater than 2 s from a gallery as transition animation displayed from screen-off mode to a lock screen to a desktop.

For example, the transition animation display window 405 is configured to display a video segment used as a transition animation. In an example, it is assumed that the terminal is provided with a video segment used as a transition animation. Optionally, the transition animation display window 406 may display the 1st image frame of a video segment currently used as a transition animation. Optionally, the transition animation display window 406 may display and play the video segment currently used as a transition animation.

Still refer to FIG. 4b. For example, if the terminal is provided with a video segment used as a transition animation, the user may tap a "Select from Gallery" option 406, to modify the video segment used as a transition animation, in other words, select another video segment as a transition animation.

In another example, if the terminal is not provided with a video segment used as a transition animation, the transition animation display window 406 includes the "Select from Gallery" option 406. The user may tap the "Select from Gallery" option 406 to select a corresponding video segment from the gallery as a transition animation.

As shown in FIG. 4c, for example, the terminal displays a video selection interface 407 in response to the received user operation. For example, the video selection interface 407 is configured to display one or more video thumbnails. Optionally, only a video whose length is greater than or equal to a video length threshold (for example, 3 s) may be displayed on the video selection interface 407, and a video whose length is less than the video length threshold is ignored in the terminal. For example, the user may select any video, such as a video 408. The terminal displays a transition animation edit interface in response to the received user operation. For specific descriptions, refer to FIG. 3d. Details are not described herein again.

For example, as described above, in this embodiment of this application, after entering a transition animation tailor interface, the terminal enters a "one-tap tailor" mode. For example, the "one-tap tailor" mode is optionally that the terminal automatically tailors a video in the foregoing manner. For example, this embodiment of this application further provides a manual tailoring manner, so that the user manually selects a video segment as a transition animation.

Figure 5A:
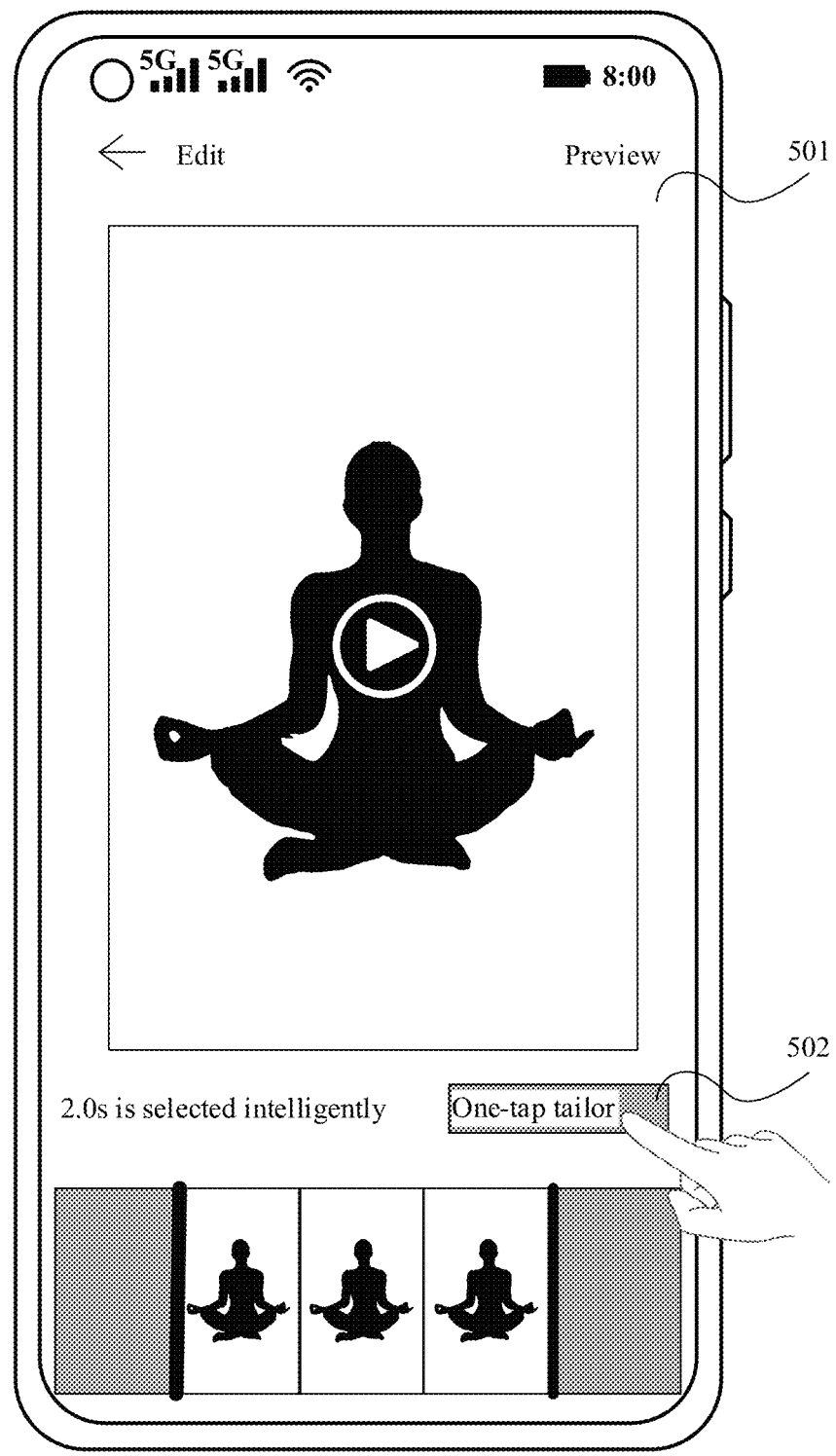
FIG. 5a and FIG. 5b are schematic diagrams of an example of manually selecting a video segment.
Figure 5B:
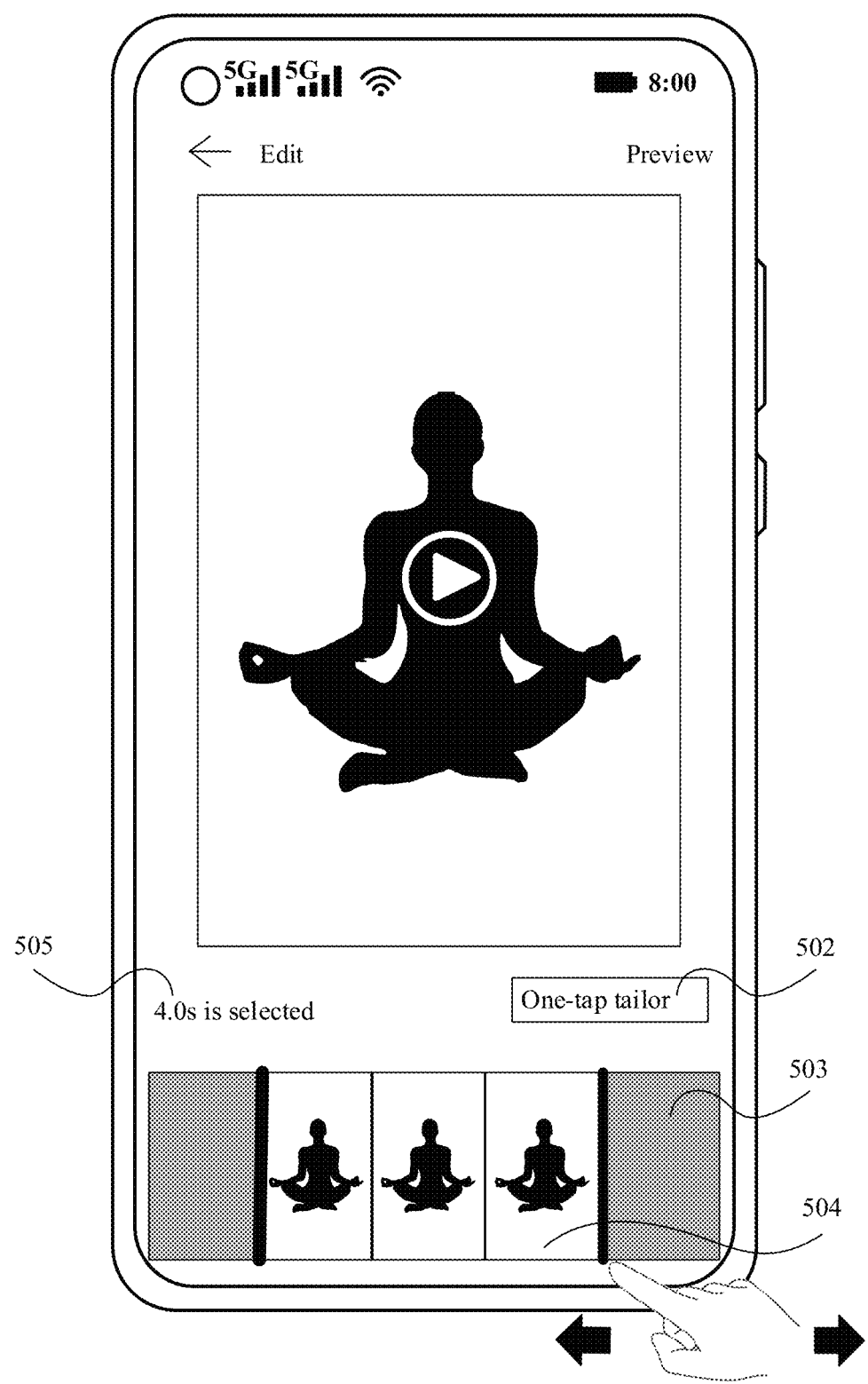

FIG. 5a and FIG. 5b are schematic diagrams of an example of manually selecting a video segment. As shown in FIG. 5a, for example, after the terminal enters a transition animation tailor interface 501 and automatically tailors a video, the user may tap a "One-tap tailor" option 502 to exit a "one-tap tailor" mode. As shown in FIG. 5b, for example, the terminal exits the "one-tap tailor" mode in response to the received user operation. Correspondingly, the user may move an image frame selection box 504 in an image frame display window 503 to select a video segment as a transition animation. For example, the terminal correspondingly moves the image frame selection box 504 in response to the received user operation, and displays, in the image frame selection box 504, an image frame of the video segment selected as a transition animation. It should be noted that the foregoing manner of switching from an automatic tailor mode to a manual tailor mode is only an example. For example, in another embodiment, when the terminal detects that the user touches (for example, taps or drags) the image frame selection box 504, the terminal may exit the "one-tap tailor" mode, and enter a manual selection mode. A specific switching manner may be set according to an actual requirement. This is not limited in this application.

In one example, moving the image frame selection box 504 is optionally moving a right frame of the image frame selection box 504 leftwards or rightwards. For example, the user may drag the right frame of the image frame selection box 504 while keeping a left frame of the image frame selection box 504 motionless. In other words, a start image frame of a video segment manually selected by the user and a start image frame automatically selected by the terminal may be consistent by dragging the right frame of the image frame selection box 504 to change an end image frame.

In another example, moving the image frame selection box 504 is optionally moving a left frame of the image frame selection box 504 leftwards or rightwards. For example, the user may drag the left frame of the image frame selection box 504 while keeping a right frame of the image frame selection box 504 motionless. In other words, an end image frame of a video segment manually selected by the user and an end image frame automatically selected by the terminal may be consistent by dragging the left frame of the image frame selection box 504 to change a start image frame.

In still another example, moving the image frame selection box 504 is optionally moving the image frame selection box 504 leftwards or rightwards. In other words, a length of the image frame selection box 504 remains unchanged. For example, a length of a video segment covered by the length of the image frame selection box 504 is 3 s. The user may change a selected video segment by dragging the image frame selection box 504 while maintaining the length of the video segment for 3 s.

For example, prompt information 505 may be used to prompt a length of a currently selected video segment, for example, prompt the user that a 4 s video segment is currently selected.

For example, if the user taps the "One-tap tailor" option again in the manual selection mode, in response to the received user operation, the terminal enters the "one-tap tailor" mode again, in other words, automatically selects a video segment as a transition animation. This implements switching between an automatic video segment selection manner and a manual video segment selection manner.

Optionally, the foregoing is described by using an example in which the terminal preferentially performs automatic tailoring. In other words, after entering the transition animation edit interface, the terminal automatically selects a video segment as a transition animation. In another embodiment, the terminal may alternatively preferentially perform manual selection. For example, after entering the transition animation edit interface, the terminal does not automatically select a video segment, but selects a corresponding video segment after receiving a user selection operation.

2. Key Frame Selection

For example, in this embodiment of this application, after the terminal selects a video segment as a transition animation based on an automatic mode or a manual mode, the user may tap a "Preview" option, for example, the "Preview" option 312 in FIG. 3d, to enter a transition animation preview interface, and preview a transition animation generated based on the selected video segment.

For example, in response to the received operation that the user taps the "Preview" option 312, the terminal selects a corresponding key frame for each mode based on the selected video segment. It should be noted that the key frame is optionally the last image frame of a transition animation corresponding to each mode (including a screen-off mode, a lock screen mode, and a desktop mode). It may be understood that the transition animation corresponding to each mode is fixed on the key frame when the transition animation is normally played (in other words, is not interrupted).

In this embodiment of this application, there may be two key frame selection manners: automatic selection by the terminal and manual selection by the user. The following describes in detail the automatic selection by the terminal and the manual selection by the user.

(1) Automatic Selection

Figure 6A:
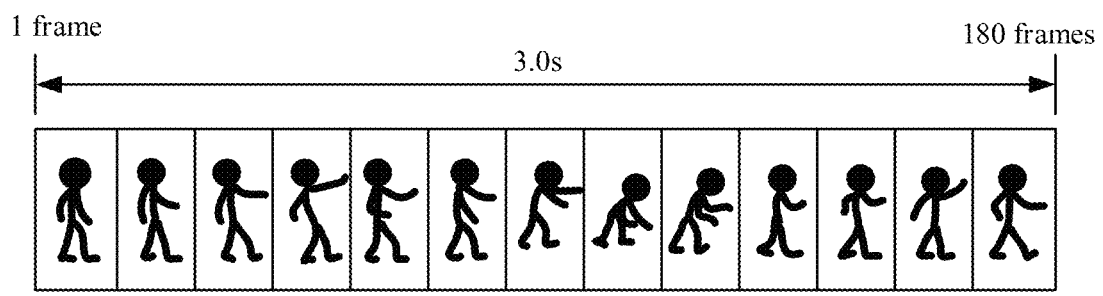
FIG. 6a to FIG. 6f are schematic diagrams of an example manner of automatically selecting a key frame.

FIG. 6a to FIG. 6e are schematic diagrams of an example manner of automatically selecting a key frame. As shown in FIG. 6a, for example, in this embodiment of this application, a length of a video segment used as a transition animation is 3 s, and a frame rate is 60 fps, to be specific, the video segment includes 180 image frames.

Figure 6B:
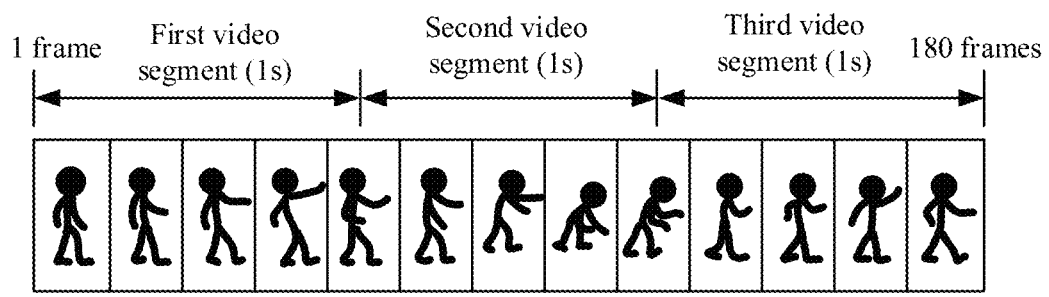

For example, after obtaining a video segment used as a transition animation, the terminal may sequentially divide the video segment into three video sub-segments. For example, as shown in FIG. 6b, the terminal may equally divide a 3 s video segment into three is video sub-segments: a first video segment, a second video segment, and a third video segment. For example, each video sub-segment includes 60 image frames.

For example, the terminal may select one image frame from a specified interval of 60 image frames in the first video segment as a key frame of the screen-off mode; the terminal selects one image frame from a specified interval of 60 image frames in the second video segment as a key frame of the lock screen mode; and the terminal selects one image frame from a specified interval of 60 image frames in the third video segment as a key frame of the desktop mode. Optionally, the "specified interval" may be the last 5 to 10 image frames in the 60 image frames, or may be set according to an actual requirement. It should be noted that, as described above, a key frame is the last image frame of a transition animation played by the terminal in different modes. For example, if the terminal selects the third image frame from the 60 image frames as a key frame, a corresponding transition animation is the first frame to the third frame in the 60 frames, and consequently duration of playing the transition animation is excessively short. Therefore, in this embodiment of this application, the terminal selects a key frame from a specified interval, to prevent corresponding transition animation duration from being excessively short.

Figure 6C:
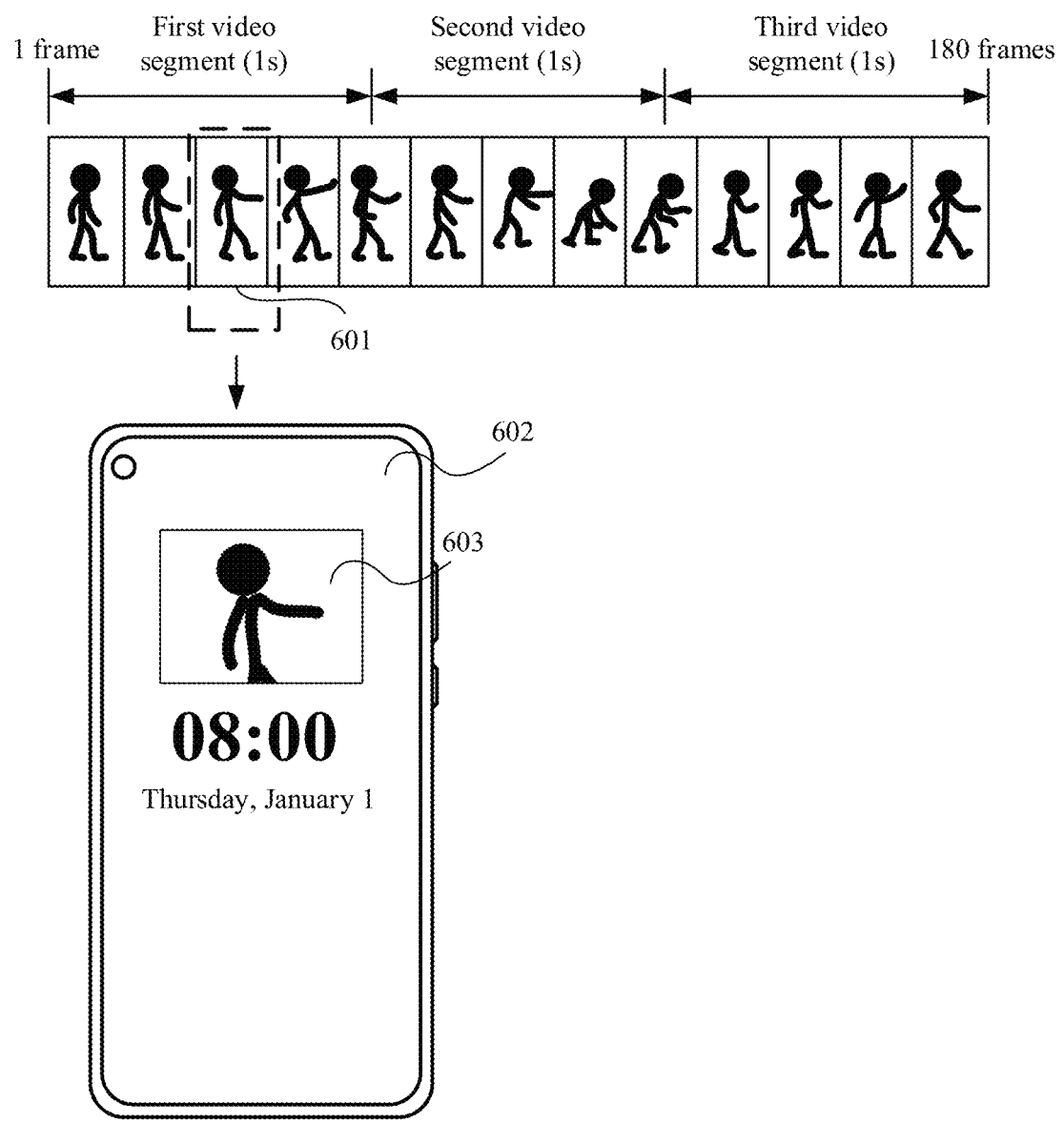

For example, a condition for the terminal to select a key frame may be that the terminal scores an image frame according to a preset scoring standard, and selects a target image frame as a key frame based on a scoring result of each image frame. For example, as shown in FIG. 6c, the terminal may score each of the 60 image frames in the first video segment according to the preset scoring standard, and obtain a scoring result of each image frame. Optionally, the preset scoring standard may include but is not limited to image frame clarity, image frame exposure, image frame brightness, image frame contrast, image frame saturation, and the like. A specific scoring manner and standard may be set according to an actual requirement. This application is merely an example. This is not limited in this application. It should be noted that, if a plurality of image frames have a same scoring result, an image frame arranged first (or last) may be selected as a key frame.

For example, the terminal may select an image frame having a best scoring result such as an image frame 601 from the 60 image frames as the key frame of the screen-off mode. Still refer to FIG. 6c. For example, the image frame 601 is the key frame of the screen-off mode. It may be understood that, in a use process, after the terminal enters the screen-off mode from another mode (for example, the lock screen mode or the desktop mode), a screen-off interface 602 starts to sequentially a play video segment used as a transition animation from the 1st frame of the first video segment until the key frame of the screen-off mode such as the image frame 601. In addition, the transition animation is fixed on the image frame 601.

For example, in this embodiment of this application, the screen-off interface 602 may include but is not limited to a transition animation play window 603 and a time control. It should be noted that sizes and positions of the transition animation play window and the time control shown in FIG. 6c are only appropriate examples. This is not limited in this application.

Figure 7:
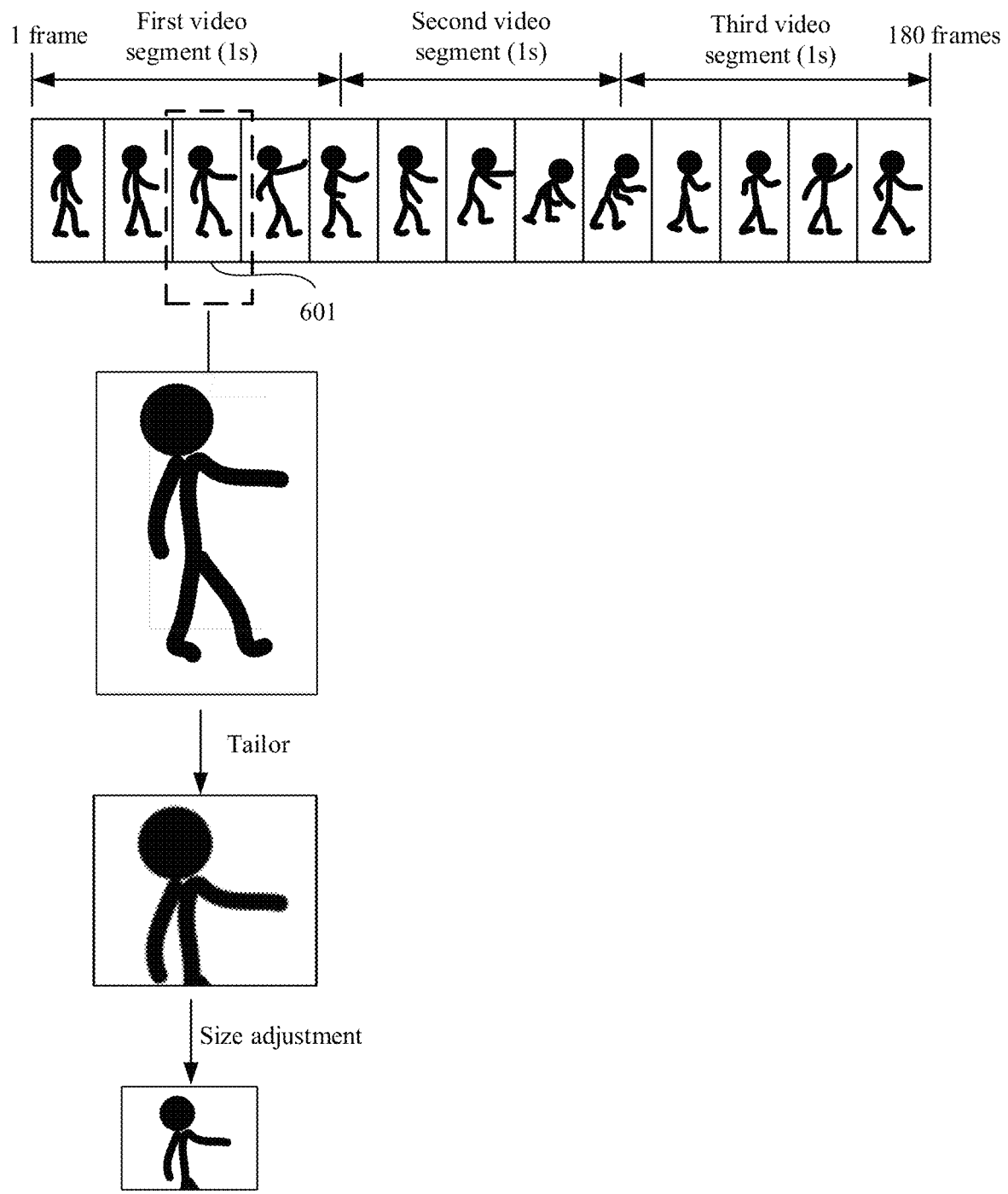
FIG. 7 is a schematic diagram of an example of processing an image frame played in a screen-off mode.

For example, the transition animation play window 603 is configured to play a transition animation corresponding to the screen-off mode. In this embodiment of this application, to adapt to the size of the transition animation play window 603, the terminal may process an image frame played in the screen-off mode, to obtain an image of a corresponding size. The image frame 601 in FIG. 6c is used as an example. As shown in FIG. 7, for example, the terminal performs gray processing on the image frame 601. The terminal selects one or more body parts from the gray-processed image frame 601 based on a specified size (for example, 1440*800, which is not limited in this application). A size of each body part is a specified size. Optionally, a plurality of body parts may partially overlap. The terminal may calculate a difference value of each single pixel in each body part. A difference value of a single pixel is a difference value between the pixel and a surrounding pixel. The terminal may obtain a sum of difference values of pixels in a body part, that is, a difference value of the body part. The terminal may tailor a body part having a largest difference value from the image frame 601. In addition, a size of the body part is adjusted in a specific proportion (for example, is reduced by 50%), to obtain an adjusted body part. The terminal adds a mask of a specific shape to the body part obtained after the size adjustment. For example, the mask of a specific shape may be a rectangular mask, a circular mask, or a triangular mask. This is not limited in this application. A processed image frame is an image displayed in the transition animation play window 603. It should be noted that only an example in which the mask of a specific shape is a rectangular mask is used for description in this embodiment of this application. In another embodiment, if a circular mask is used in a processing process, the transition animation play window is circular.

For example, similar to a manner of selecting the key frame corresponding to the screen-off mode, the terminal may select an image frame having a highest scoring result (for example, an image frame 602 shown in FIG. 6d) from the second video segment as the key frame corresponding to the lock screen mode; and the terminal selects an image frame having a highest scoring result (for example, an image frame 603 shown in FIG. 6e) from the third video segment as the key frame corresponding to the desktop mode. A specific display manner is described in detail in the following embodiment.

It should be noted that, in this embodiment of this application, an example in which the last image frame in the third video segment is the image frame having a highest scoring result in the third video segment is used for description. In another embodiment, if the image frame having a highest scoring result in the third video segment is not the last image frame, as shown in FIG. 6f, for example, the image frame may be an image frame 604 in the third video segment. In this case, the terminal uses the image frame 604 as the last frame of the original video segment, all image frames after the image frame 604 are tailored, and only the image frame 604 and all previous image frames are reserved, for example, the original 180 image frames are changed to 170 image frames.

Figure 8A:
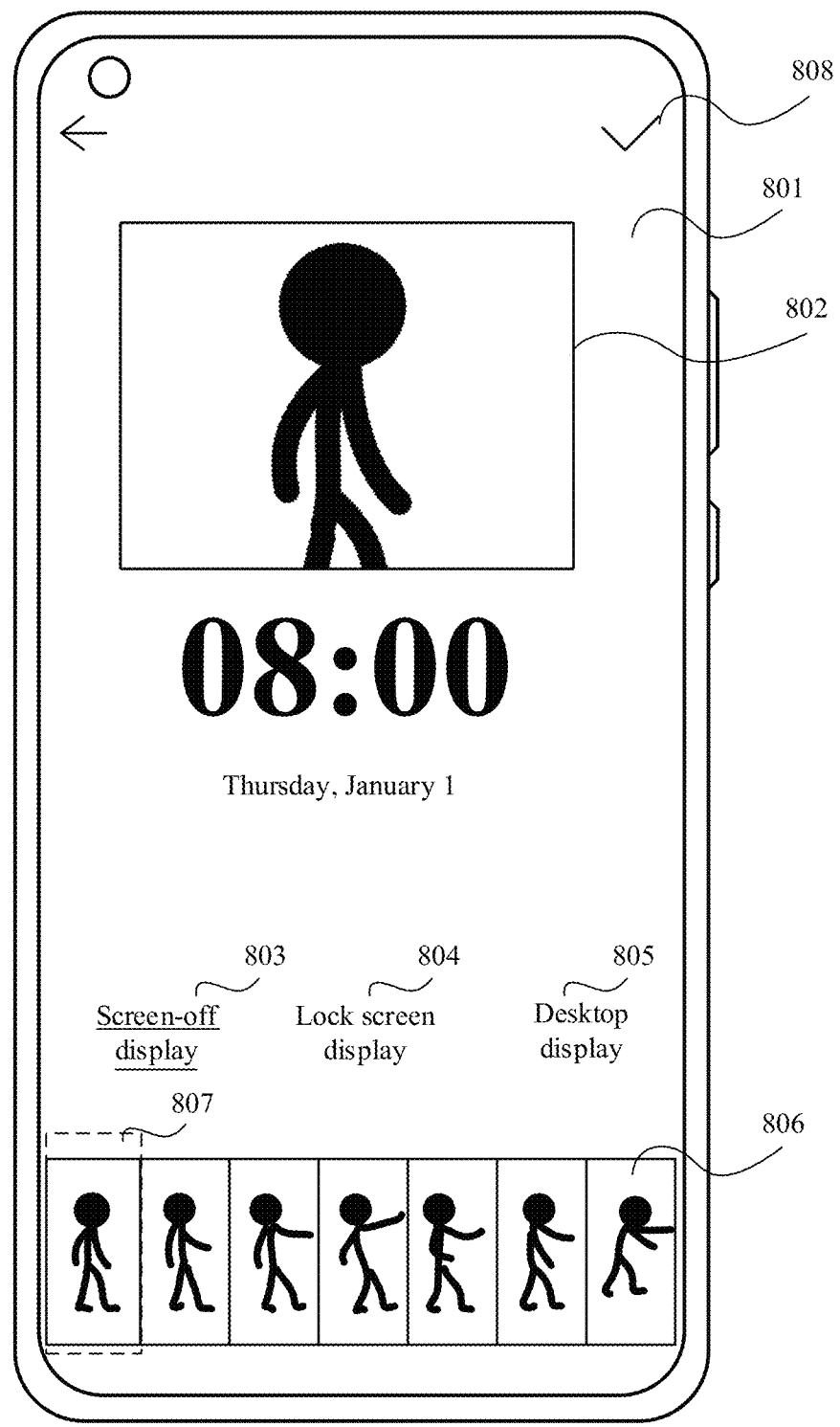
FIG. 8a to FIG. 8f are schematic diagrams of example user interfaces.

For example, in this embodiment of this application, in response to the received operation that the user taps the "Preview" option, the terminal may perform the foregoing process of automatically selecting a key frame, and enter the transition animation preview interface. As shown in FIG. 8a, for example, a transition animation preview interface 801 includes but is not limited to a transition animation preview window 802, a "Screen-off display" option 803, a "Lock screen display" option 804, a "Desktop" display option 805, an image frame display window 806, and an acknowledgment option 808.

For example, as described above, after entering the transition animation preview interface, the terminal may automatically select a key frame, in other words, select a corresponding key frame for each mode (including a screen-off mode, a lock screen mode, and a desktop mode), and generate a corresponding transition animation.

After entering the transition animation preview interface 801, optionally, the terminal automatically plays a transition animation corresponding to the "Screen-off display" option 803 (that is, the screen-off mode). As shown in FIG. 8a, the "Screen-off display" option 803 indicates that the transition animation preview window 802 currently plays the transition animation corresponding to the screen-off mode. Optionally, in this embodiment of this application, as shown in FIG. 8a, when the "Screen-off display" option 803 includes "underline", it indicates that the transition animation preview window 802 currently plays the transition animation corresponding to the screen-off mode. It should be noted that each control included in the transition animation preview interface in this embodiment of this application is only an example. In another embodiment, a preview effect of a generated transition animation may be displayed to the user in another manner. For example, in another embodiment, the terminal may alternatively indicate, in another manner, a mode corresponding to a transition animation played by the transition animation preview window 802. For example, the "Screen-off display" option 803 may be displayed in a larger size or in bold. This is not limited in this application. The following descriptions are similar and are not repeated.

Still refer to FIG. 8a. For example, a video segment corresponding to the transition animation of the screen-off mode is from the first image frame of an original video segment to a key frame of the screen-off mode, for example, the image frame 601 shown in FIG. 6c. The image frame display window 806 includes an image frame of a video segment used as a transition animation.

For example, the image frame display window 806 further includes a play selection box 807, and the play selection box 807 is used to indicate a currently played image frame. For example, after entering the transition animation preview interface 801, the terminal plays, in the transition animation preview window 802, the transition animation corresponding to the screen-off mode. For example, the transition animation preview window 802 may be located in an upper part of the transition animation preview interface, or may be located in another position. This is not limited in this application. It should be noted that, in addition to displaying the transition animation of the screen-off mode, the transition animation preview window 802 further includes another display control such as a time control in the screen-off mode. It may be understood that an image currently displayed in the transition animation preview window 802 is an image actually displayed on the screen of the terminal in the screen-off mode when the user uses the terminal.

Still refer to FIG. 8a. For example, the play selection box 807 is located on a start image frame in the image frames in the image frame display window 806. Correspondingly, the transition animation preview window 802 displays a screen-off transition animation generated based on the image frame on which the play selection box 807 is located.

For example, as described above, the animation corresponding to the screen-off mode is played from a start frame of a video segment used as a transition animation to a key frame of the screen-off mode. For example, the play selection box 807 moves rightwards, and the transition animation preview window 802 correspondingly plays the screen-off transition animation corresponding to the image frame on which the play selection box 807 is located.

Figure 8B:
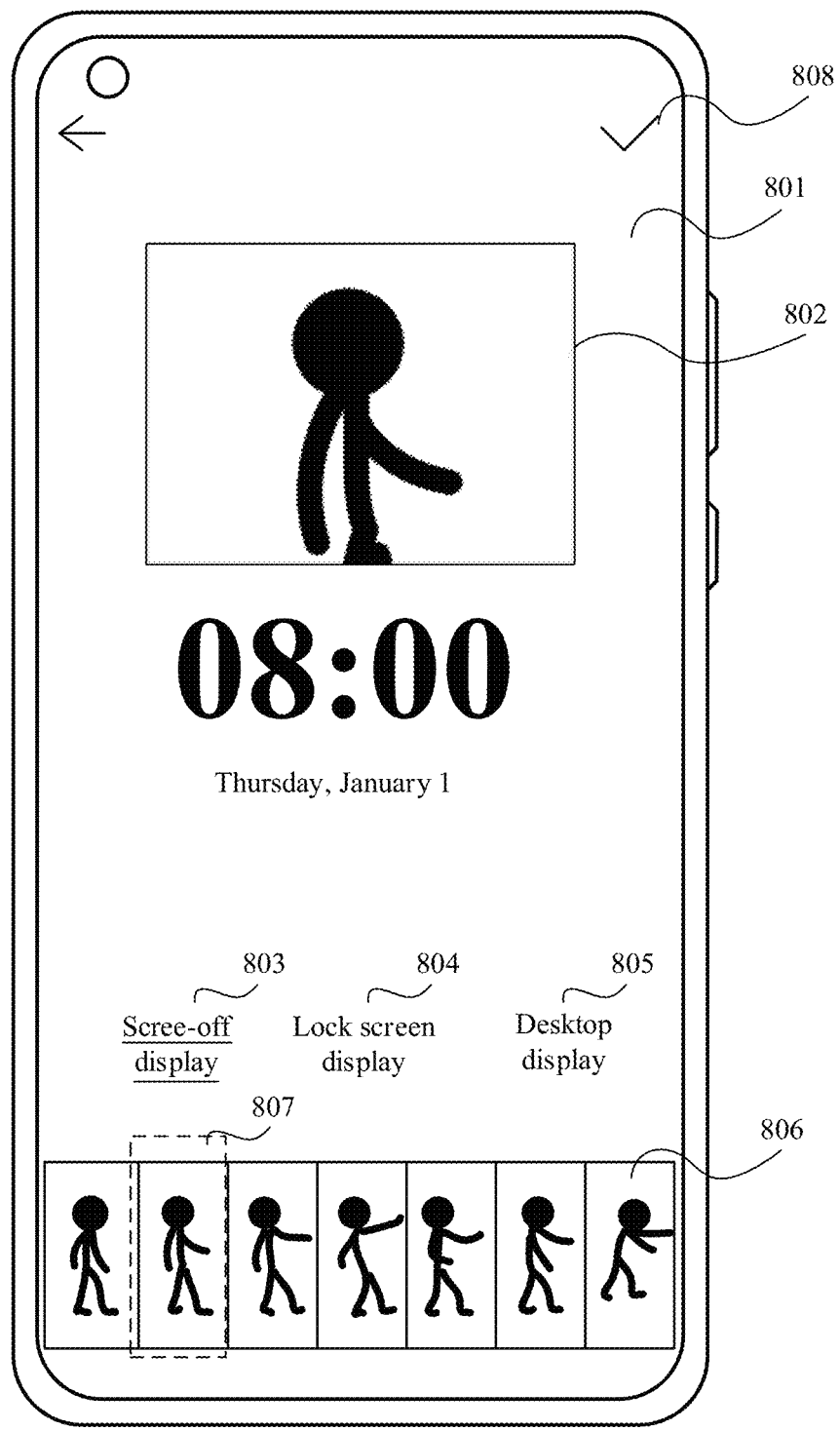

For example, as shown in FIG. 8b, the play selection box 807 is located on the second image frame in the image frame display window 806. Correspondingly, the transition animation preview window 802 displays a screen-off interface generated based on the second image frame, and the screen-off interface includes a second image frame obtained after processing (the processing process includes tailoring and size adjustment. For a detailed process, refer to the foregoing descriptions), a time control, and the like.

It should be noted that, as described above, the image frames in this embodiment of this application may be folded for display. Therefore, when the play selection box 807 is located on the second image frame, the transition animation preview window 802 may display a screen-off interface generated based on an image frame in an image frame group in which the second image frame is located.

For example, the transition animation preview interface 801 continues to play the transition animation corresponding to the screen-off mode until the key frame corresponding to the screen-off mode, such as the image frame 601 shown in FIG. 6c.

Figure 8C:
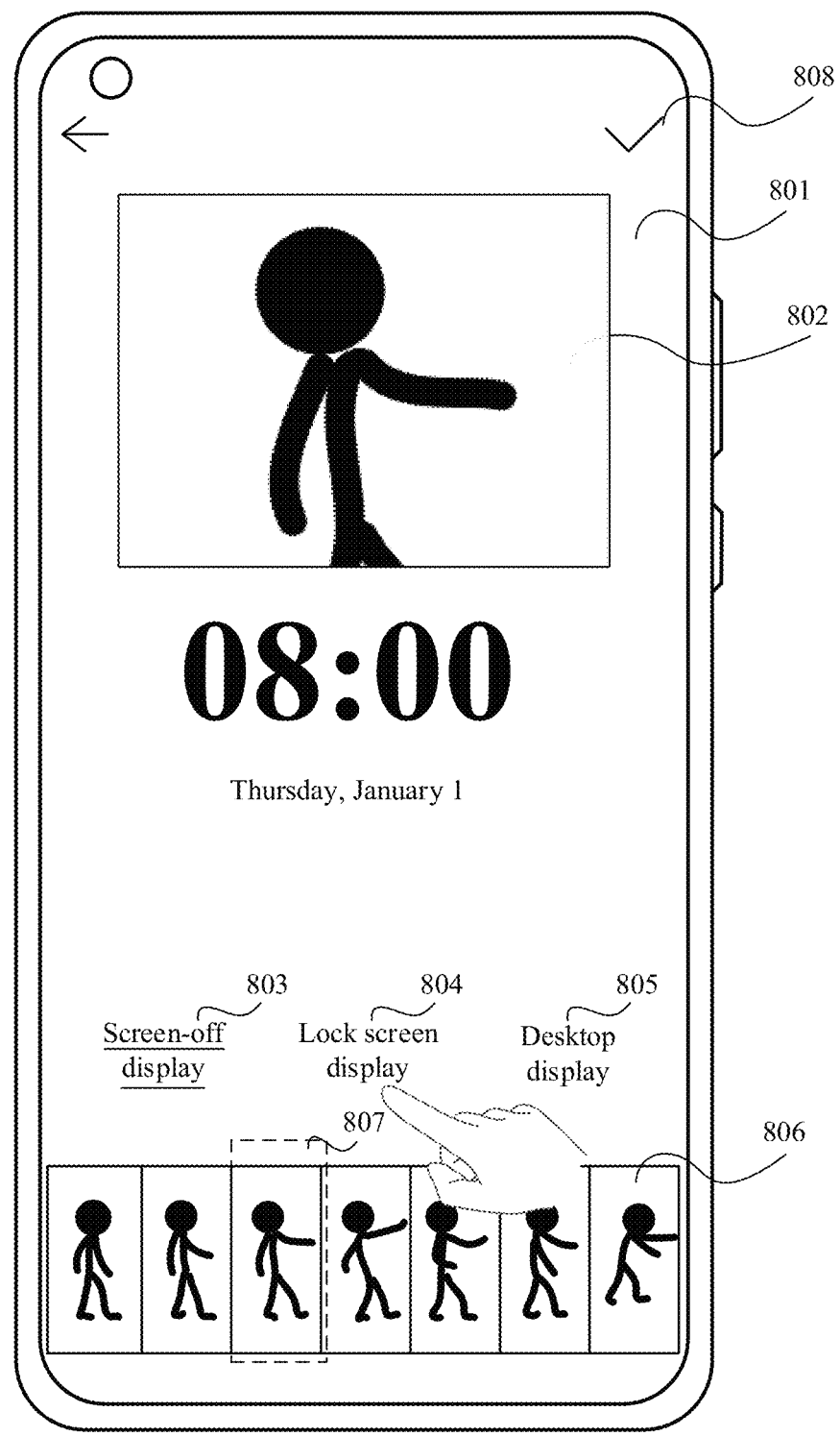

As shown in FIG. 8c, for example, the play selection box 807 is located on the key frame corresponding to the screen-off mode in the image frame display window 806, and play of the transition animation of the screen-off mode is completed. In one example, the transition animation preview interface 801 may remain in a current state to wait for another user operation. In another example, the transition animation preview interface 801 may sequentially play a transition animation corresponding to the "Lock screen display" option 804 (that is, the lock screen mode). In still another example, the transition animation preview interface 801 may cyclically play the transition animation of the screen-off mode. This is not limited in this application.

As shown in FIG. 8c, for example, the user taps the "Lock screen display" option 804, and the terminal plays the transition animation of the lock screen mode (which may also be understood as a transition animation from the screen-off mode to the lock screen mode) in the transition animation preview window 802 in response to the received user operation.

Figure 6D:
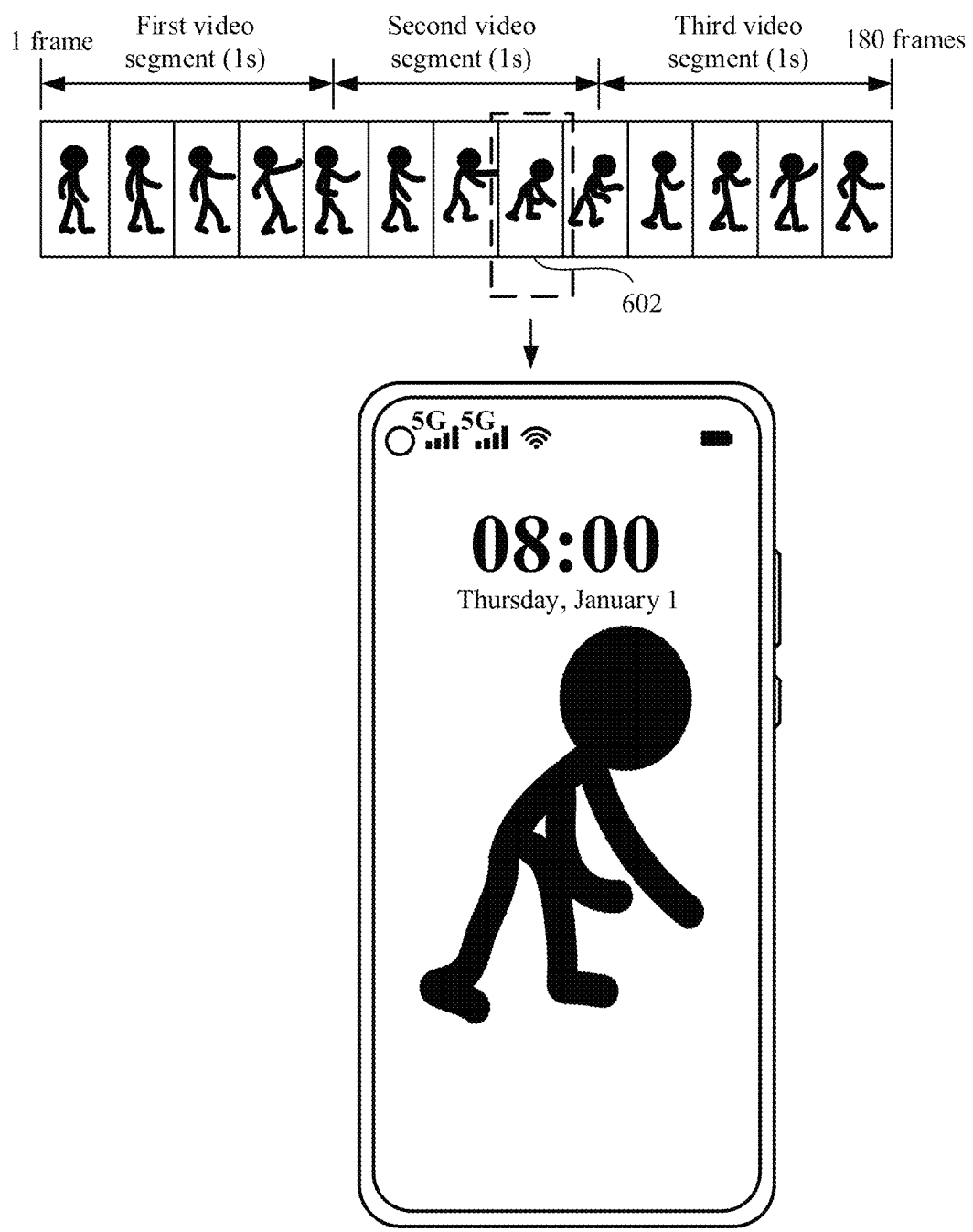
Figure 8D:
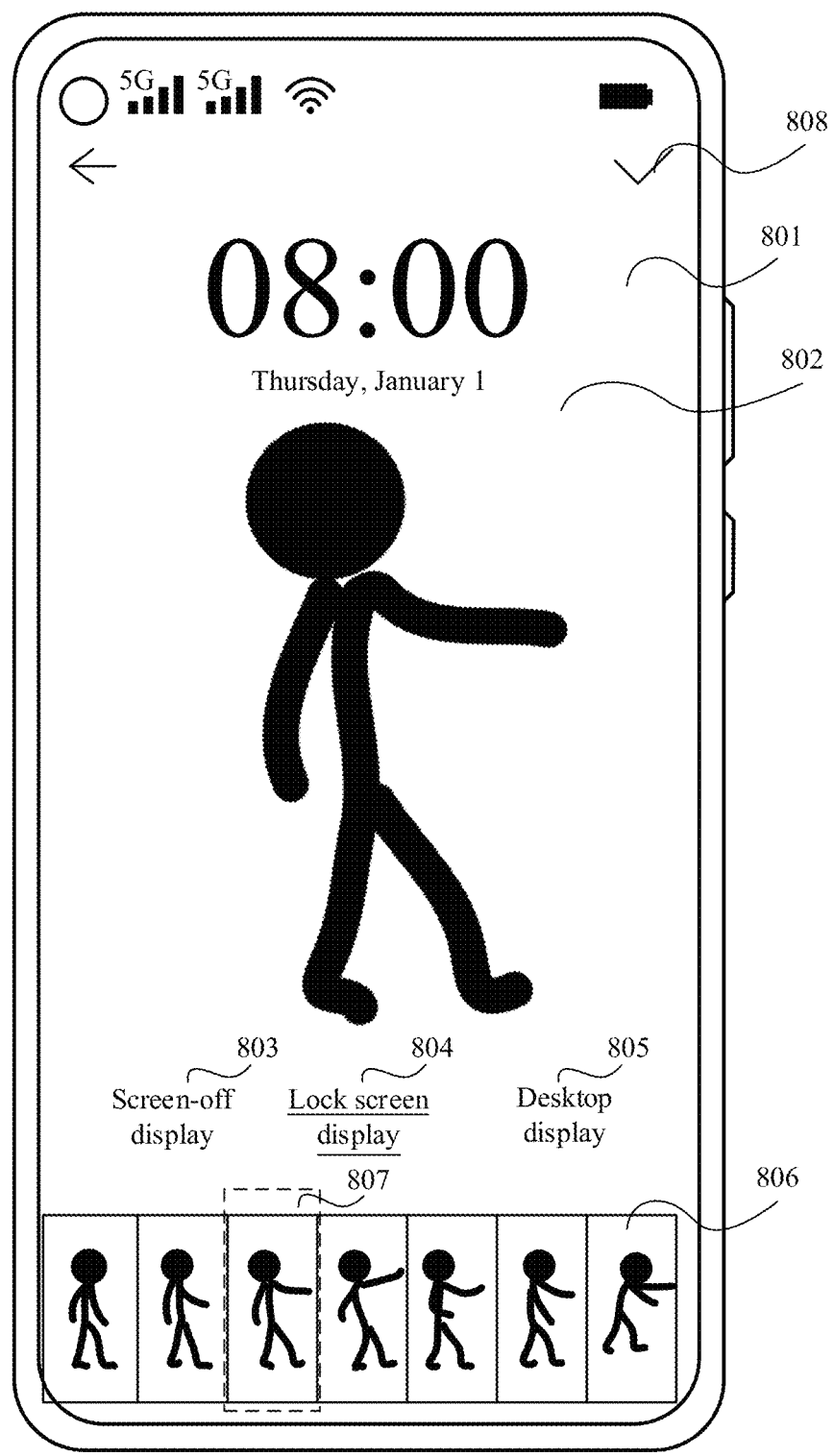

As shown in FIG. 8d, for example, a start image frame of the transition animation of the lock screen mode is the key frame of the screen-off mode, and an end image frame of the transition animation of the lock screen mode is a key frame of the lock screen mode, for example, the image frame 602 in FIG. 6d.

Still refer to FIG. 8d. For example, the play selection box 807 is located on the start image frame of the transition animation of the lock screen mode. Correspondingly, the transition animation preview window 802 displays a lock screen interface generated based on the image frame. For example, the lock screen interface includes but is not limited to an image of the image frame and a time control. Optionally, the image of the image frame may be tiled in the transition animation preview window 802. In other words, when the user uses the terminal, the image of the image frame may be tiled on the lock screen interface. Another control on the lock screen interface such as the time control is displayed above the image frame of the transition animation.

Figure 8E:
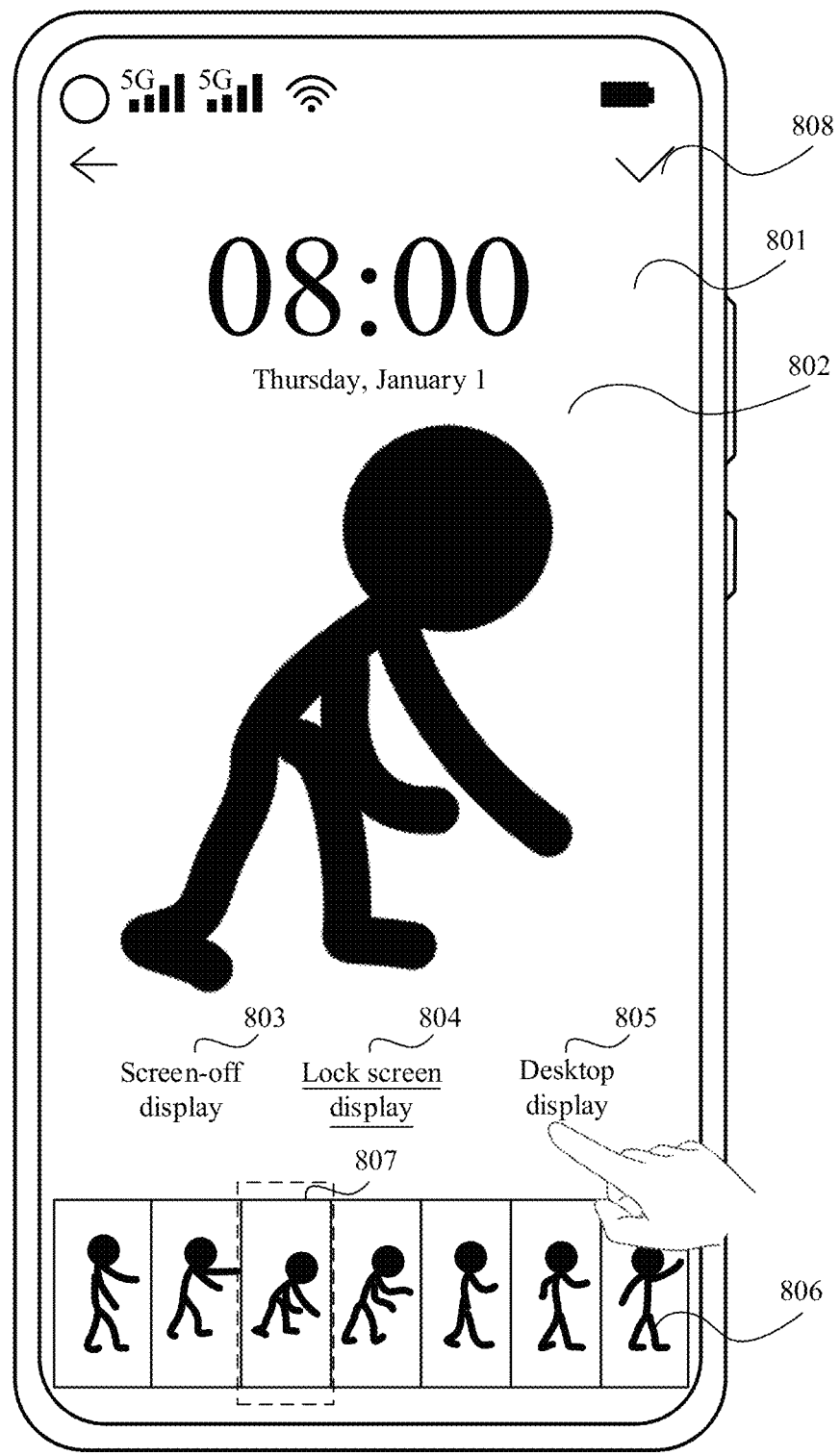

For example, similar to the preview manner in the screen-off mode, the terminal continues to play the transition animation of the lock screen mode in the transition animation preview window 802 until the key frame of the lock screen mode, as shown in FIG. 8e. For a part not described, refer to the preview process in the screen-off mode. Details are not described herein again.

It should be noted that the image frame displayed in the image frame display window 806 may move with the play selection box 807, so that the play selection box 807 keeps within a specific movement range in a process of playing the transition animation. For example, the play selection box 807 may keep in a central position of the image frame display window 806. Correspondingly, the image frame in the image frame display window 806 may sequentially move leftwards, so that the play selection box 807 sequentially locates the image frame in the video segment. The following descriptions are the same and are not repeated.

As shown in FIG. 8e, for example, the user taps the "Desktop display" option 805, and the terminal plays a transition animation of the desktop mode (which may also be understood as a transition animation from the lock screen mode to the desktop mode) in the transition animation preview window 802 in response to the received user operation.

Figure 6E:
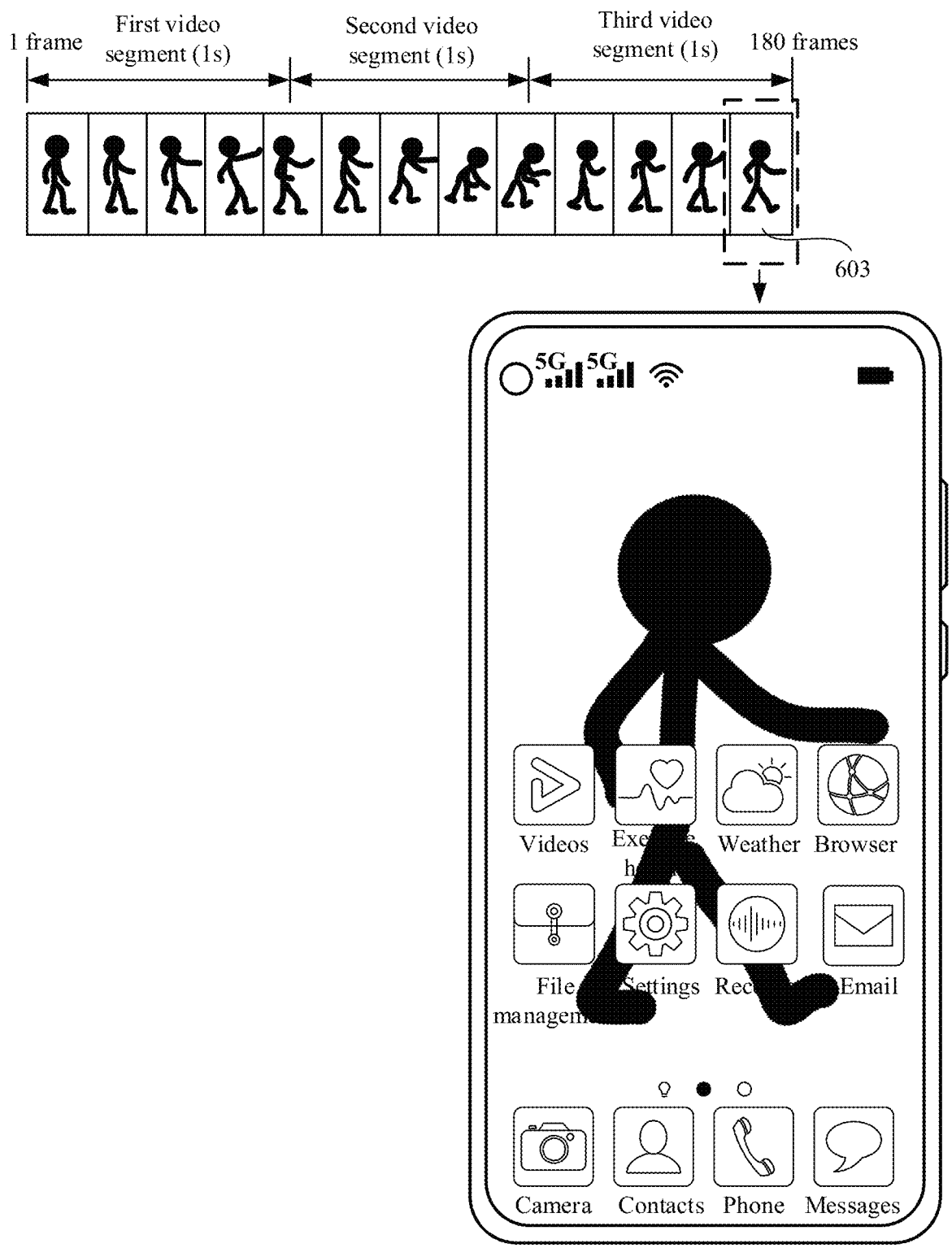
Figure 6F:
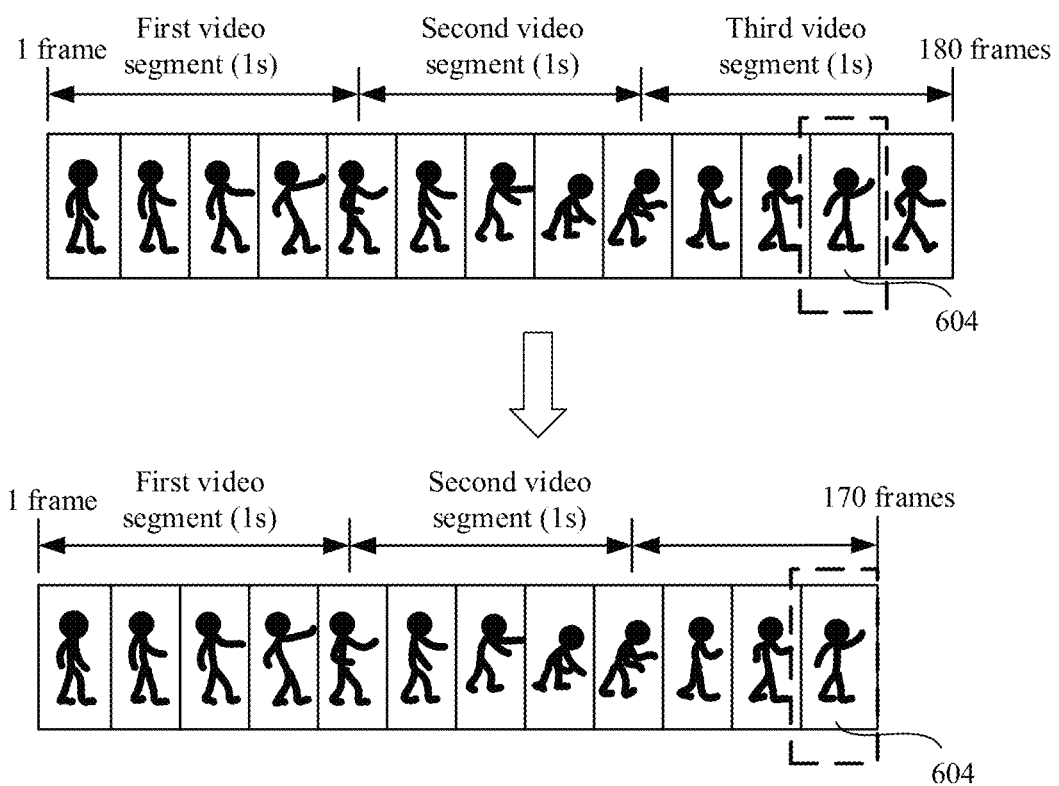
Figure 8F:
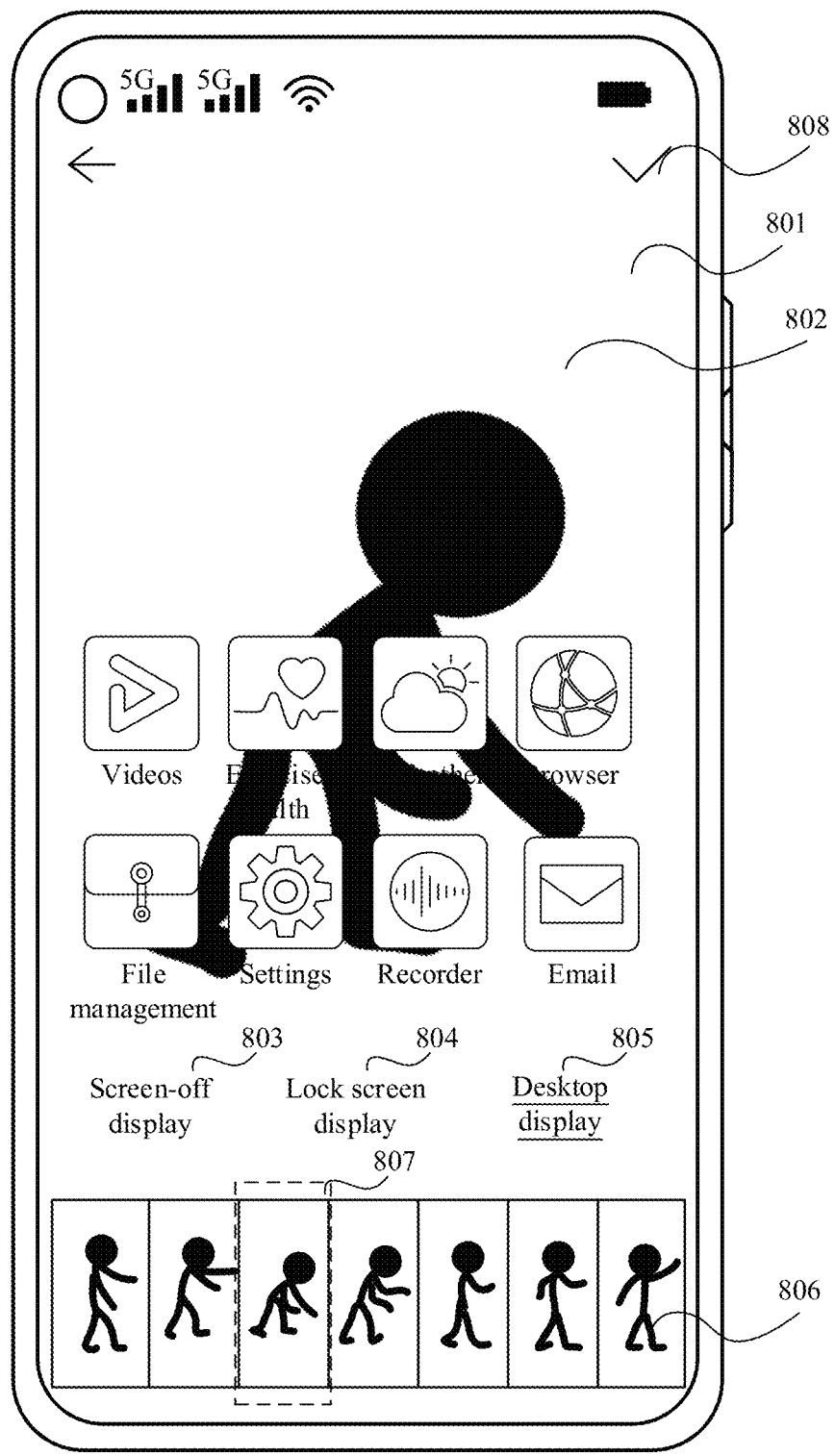

As shown in FIG. 8f, for example, a start image frame of the transition animation of the desktop mode is the key frame of the lock screen mode, and an end image frame of the transition animation of the desktop mode is a key frame of the desktop mode, for example, the image frame 603 in FIG. 6e or the image frame 604 in FIG. 6f.

Still refer to FIG. 8f. For example, the play selection box 807 is located on the start image frame of the transition animation of the desktop mode. Correspondingly, the transition animation preview window 802 displays a desktop generated based on the image frame. For example, the desktop includes but is not limited to an image of an image frame and an application icon. Optionally, the image of the image frame may be tiled in the transition animation preview window 802. In other words, when the user uses the terminal, the image of the image frame may be tiled on the desktop. Another control of the desktop such as the application icon is displayed above the image frame of the transition animation.

For example, similar to the preview manner in the screen-off mode, the terminal continues to play the transition animation of the desktop mode in the transition animation preview window 802 until the key frame of the desktop mode. For a part not described, refer to the preview process in the screen-off mode. Details are not described herein again.

(2) Manual Selection

Figure 9A:
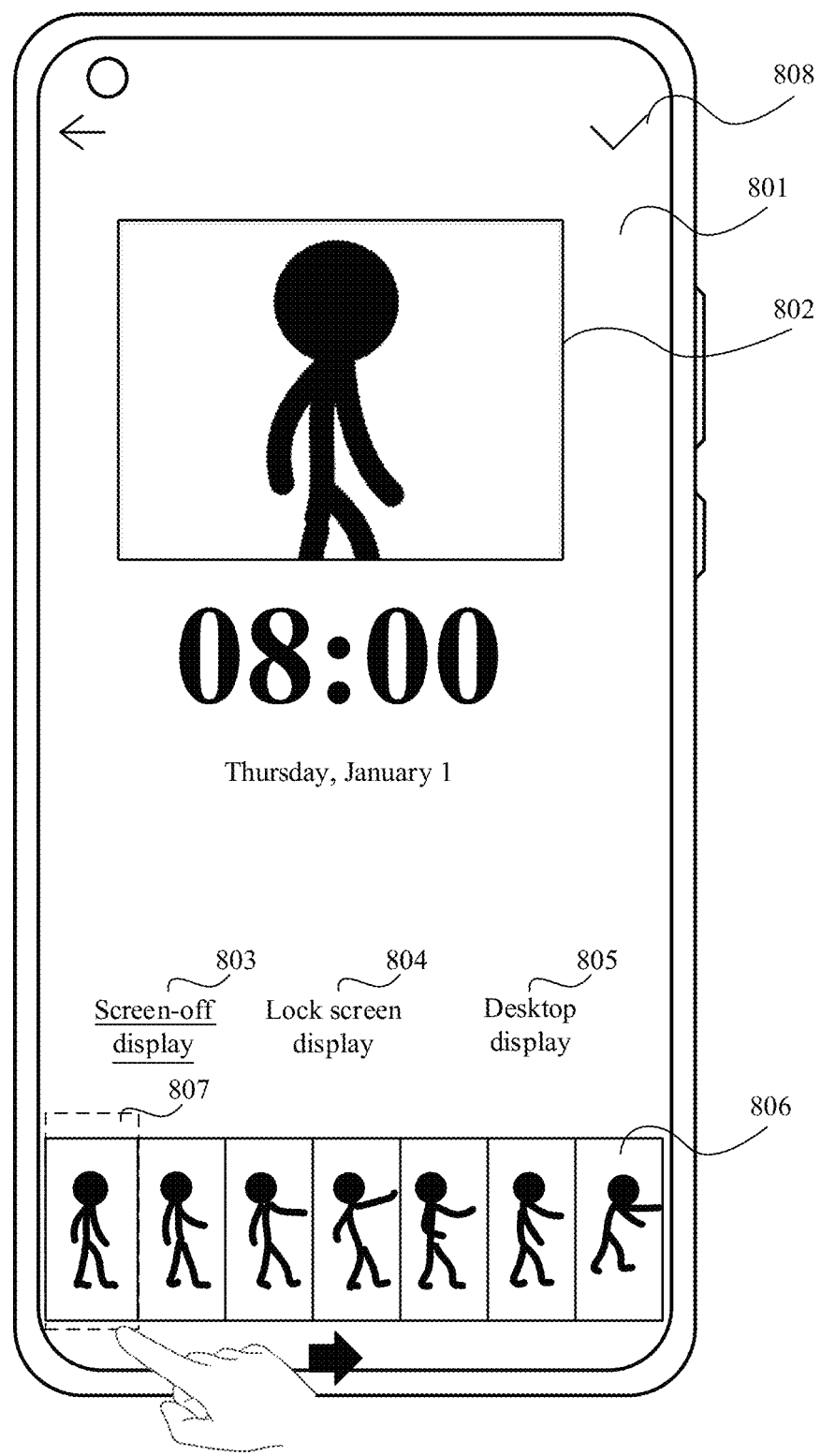

For example, an embodiment of this application further provides a manner of manually selecting a key frame. As described above, after entering the transition animation preview interface 801, the terminal may automatically select a key frame and generate a transition animation. An example of manually selecting the key frame of the screen-off mode is used. As shown in FIG. 9a, when the terminal plays the transition animation corresponding to the screen-off mode, for example, the transition animation preview window 802 of the terminal currently displays an image corresponding to an image frame that is located by the play selection box 807. The user may drag the play selection box 807 (for example, rightwards) to manually select the key frame of the screen-off mode.

Optionally, as described above, the image frame display window 806 displays folded image frames, that is, all image frames of a non-video segment (for a specific reason, refer to the foregoing descriptions). For example, when the user drags the play selection box 807, in response to the received user operation, the terminal exits a mode of automatically selecting a key frame, and enters a manual selection mode. For example, the terminal may display all image frames included in the first video segment (for concepts, refer to the related descriptions in FIG. 6b) through expanding in the image frame display window 806, for example, display 60 image frames in the first video segment.

Figure 9B:
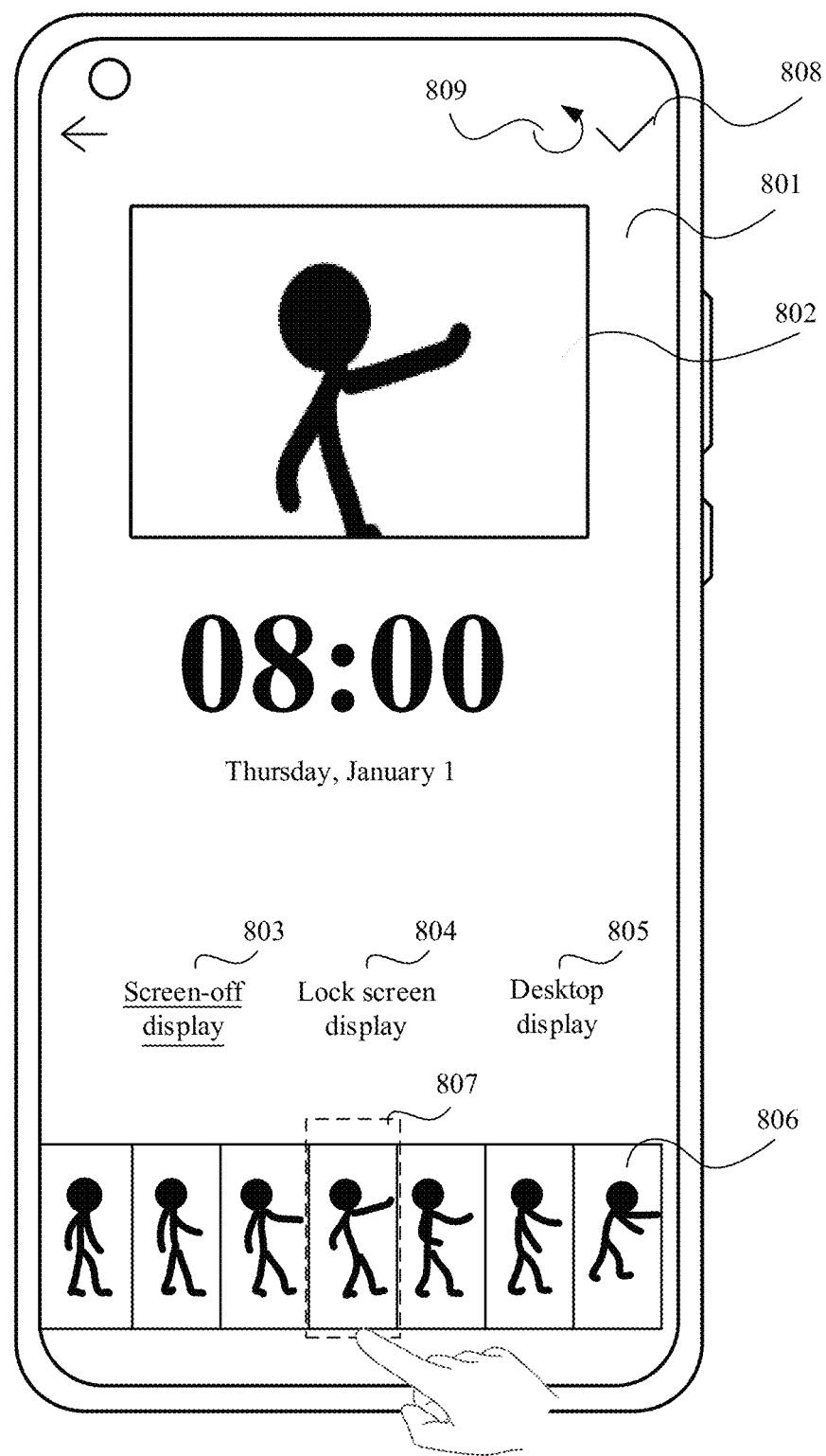

For example, when the user drags the play selection box 807, an image displayed in the transition animation preview window 802 changes with an image frame located by the play selection box 807. For example, as shown in FIG. 9b, the user drags the play selection block 807 to a position shown in FIG. 9b. Correspondingly, a screen-off interface that is played by the terminal in the transition animation preview window 802 in response to the received user operation and that is generated based on the image frame includes but is not limited to an image (obtained after tailoring and size adjustment) of the image frame, a time control, and the like.

For example, the user drags the play selection box 807 to a specified image frame and raises the hand, to select the image frame as the key frame of the screen-off mode. It should be noted that the manual selection described in this embodiment of this application is only an example. In another embodiment, the user may alternatively directly tap an image frame expected to be used as the key frame. This is not limited in this application.

For example, still refer to FIG. 9b. In response to the received user operation, the terminal determines that the image frame located by the play selection box 807 is the key frame corresponding to the screen-off mode. For example, the terminal may play the transition animation of the screen-off mode after manually selecting the key frame. The transition animation of the screen-off mode is generated based on a corresponding video segment from the first frame of image of the video segment to the manually selected key frame of the screen-off mode.

Optionally, the transition animation preview interface 801 may further include a revert option 809. For example, if the terminal receives an operation that the user taps the option, the terminal may cancel the manual selection mode, and re-enter the automatic selection mode. In other words, the terminal automatically selects a corresponding key frame for each mode. This implements switching between manual key frame selection and automatic key frame selection.

It should be noted that a key frame of another mode may also be manually selected. A specific process thereof is similar to the foregoing process of manually selecting the key frame of the screen-off mode. Details are not described herein again.

It should be further noted that the control and text information included in the user interface shown in this embodiment of this application are merely examples. In another embodiment, the user interface may be set according to an actual requirement. For example, FIG. 9c to FIG. 9e(3) are schematic diagrams of other example user interfaces, to provide a transition animation setting entry for the user. For example, after the user selects a video as a transition animation through the user interface in FIG. 3c or FIG. 4c, the mobile phone may generate a corresponding transition animation based on the video selected by the user. For a specific generation process, refer to the foregoing descriptions. Details are not described herein again. Optionally, the interface shown in FIG. 3c or FIG. 4c may display prompt information to prompt that the mobile phone is generating a transition animation, and may display generation progress.

Figure 9C:
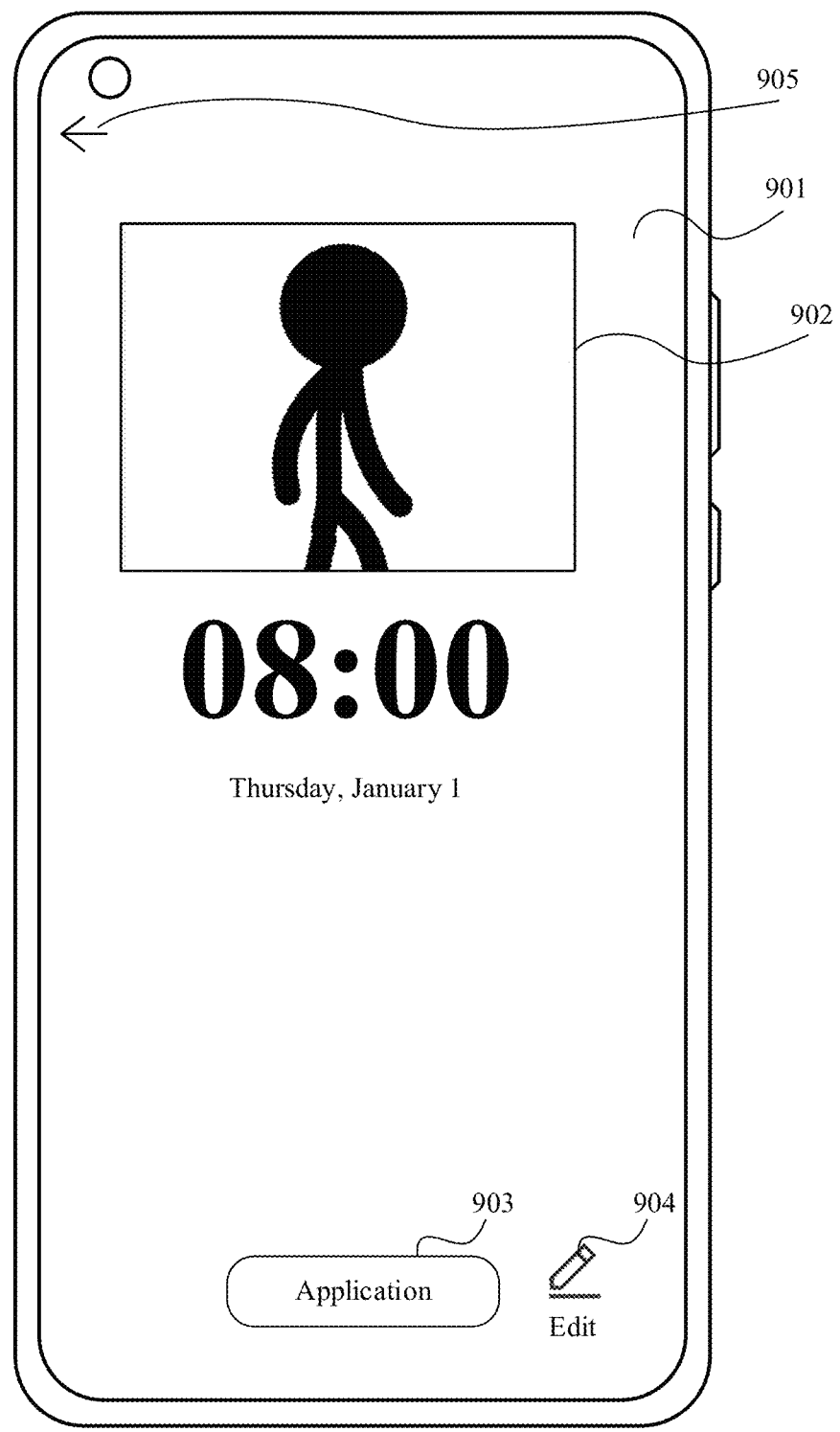

As shown in FIG. 9c, for example, after generating the transition animation, the mobile phone may automatically enter a transition animation preview interface 901. For example, the transition animation preview interface 901 includes but is not limited to a transition animation preview window 902, an "Application" option 903, an "Edit" option 904, and a back option 905.

For example, the transition animation preview window 902 may automatically play the transition animation of each mode sequentially. The user may tap the "Application" option 903. In response to the received user operation, the mobile phone may apply the generated transition animation. For example, the transition animation preview window 902 may repeatedly play the transition animation of each mode. For example, in a process of playing the transition animation of each mode in the transition animation preview window 902, if the user taps any position in the transition animation preview window 902, in response to the received user operation, the mobile phone stops playing the transition animation. Optionally, a size of the transition animation preview window 902 may be less than or equal to a size of the display of the mobile phone. This is not limited in this application. For example, if the size of the transition animation preview window 902 is equal to the size of the display of the mobile phone, correspondingly, other controls on the transition animation preview interface 901 such as the "Application" option 903 and the "Edit" option 904 may be superposed on the transition animation preview interface 901 for display.

For example, if the user taps the back option 905, in response to the received user operation, the mobile phone returns to a previous-level interface, for example, returns to the interface shown in FIG. 3c or FIG. 4c.

For example, if the user taps the "Edit" option 904, similar to the foregoing descriptions, the mobile phone switches to the manual transition animation selection mode. FIG. 9d(1) and FIG. 9d(2) are schematic diagrams of another possible example manual selection mode interface. As shown in FIG. 9d(1), for example, an edit interface 906 includes but is not limited to a video preview window 907, a withdraw option 908, a repetition option 909, an acknowledgment option 910, an image frame display window 911, a back option 912, an "Edit" option 913, a "Filter" option 914, and a "Screen-off tailor" option 915.

For example, the video preview window 907 is configured to play a video segment manually selected by the user. Similar to the foregoing descriptions, the video segment manually selected by the user is a video segment used as a transition animation. Descriptions of a specific selection manner are similar to the foregoing descriptions. The user may select a video segment from a video in a selection box as a transition animation. For details not described, refer to the foregoing descriptions. Details are not described herein again. It should be noted that all content displayed in the transition animation preview window is an effect of displaying a transition animation in a corresponding mode. For example, the transition animation of the screen-off mode displayed in the transition animation preview window means all elements displayed on the display of the mobile phone when the mobile phone is in the screen-off mode, for example, including an image frame of the transition animation and further including a text part (that is, the time control described above) on the screen-off interface. The video preview window 907 displays an image in the image frame.

For example, the withdraw option 908 may be configured to withdraw a previous user operation. The repetition option 909 may be configured to revert to a previous user operation.

For example, the image frame display window 911 is configured to display an image frame in a video segment.

The image frame may be folded for display, or may be expanded for display. Specific descriptions are similar to the foregoing descriptions. Details are not described herein again.

For example, the back option 912 is configured to exit the manual selection mode. For example, if the user taps the back option 912, a prompt box may be displayed on the edit interface 906. As shown in FIG. 9*d*(2), the prompt box 916 may include prompt information, a "Cancel" option, and a "Discard" option. For example, the prompt information is used to prompt the user whether to discard current modification. For example, if the user taps the "Cancel" option, in response to the received user operation, the mobile phone cancels the prompt box, in other words, still displays the edit interface 906. For example, if the user taps the "Discard" option, in response to the received user operation, the mobile phone exits the manual selection mode, in other words, exits the edit interface 906, and re-enters the transition animation preview interface shown in FIG. 9*c*. Re-entering the transition animation preview interface shown in FIG. 9*c* means that the preview interface displays a transition animation automatically generated by the mobile phone.

Still refer to FIG. 9*d*(1). For example, the "Edit" option 913 is configured to indicate that the mobile phone is manually selecting a corresponding transition animation currently.

For example, if the user taps on the "Filter" option 914, in response to the received user operation, the mobile phone may display at least one filter option on the edit interface 906. Each filter option represents a filter style (or referred to as a filter effect). The user may select a corresponding filter option to add a corresponding filter to the transition animation.

For example, if the user taps the acknowledgment option 910, in response to the received user operation, the mobile phone displays the transition animation preview interface 901. Correspondingly, the transition animation preview window 902 on the transition animation preview interface 901 plays the transition animation manually selected by the user.

Still refer to FIG. 9*d*(1). For example, if the user taps the "Screen-off tailor" option 915, in response to the received user operation, the mobile phone displays a mask in the video preview window 907. Based on the related descriptions in FIG. 7, the transition animation of the screen-off mode is generated by optionally performing tailoring and size adjustment on an image frame. For example, the user may modify, by using an entry provided by the "Screen-off tailor" option, a main body part and a resolution of the transition animation displayed in the screen-off mode. For example, as shown in FIG. 9*e*(1), the video preview window 907 may include a mask 917. For example, the mobile phone may superpose the mask 917 on an image frame 918 for display. A part superposed between the mask 917 and the image frame 918 is an image generated in FIG. 7. Optionally, the image frame 918 may be the first image frame of the transition animation of the screen-off mode, or may be any image frame. It should be noted that, after the mobile phone processes a currently displayed image frame based on a user operation, the mobile phone may correspondingly process each image frame of the transition animation of the screen-off mode in a same processing manner, to play a processed image frame of the transition animation when the mobile phone is in the screen-off mode. Optionally, other part of the image frame 918 other than the part on which the mask 917 is superposed is optionally displayed in a gray image. Optionally, as described above, the mask may be in any shape, such as a circle or a triangle.

As shown in FIG. 9*e*(2), for example, the user may perform double-pinch (or another operation, which is not limited in this application) to drag the image frame 918 to pinch or stretch the image frame 918. It should be noted that dimensions and a size of the mask 917 remains unchanged when the user operates the image frame 918. As described above, an image displayed in the mask 917 is a part superposed between the mask 917 and the image frame 918. Therefore, as shown in FIG. 9*e*(2), when the mobile phone pinches or stretches the image frame 918 in response to the received user operation (only an example of stretching the image frame is used in this application, and this is not limited in this application), the image displayed in the mask 917 accordingly changes.

As shown in FIG. 9*e*(3), for example, the user may alternatively move the position of the image frame 918 through single-finger sliding (or another operation, which is not limited in this application), so that the image displayed in the mask 917 changes as the image frame 918 moves. For example, if the user taps the acknowledgment option 910, the mobile phone may correspondingly process another image frame in the transition animation of the screen-off mode based on a current zoom ratio of the image frame 918 and a position in which the mask overlaps the image frame 918, and then display a processed transition animation subsequently in the screen-off mode.

(3) Display Manner

Figure 10A:
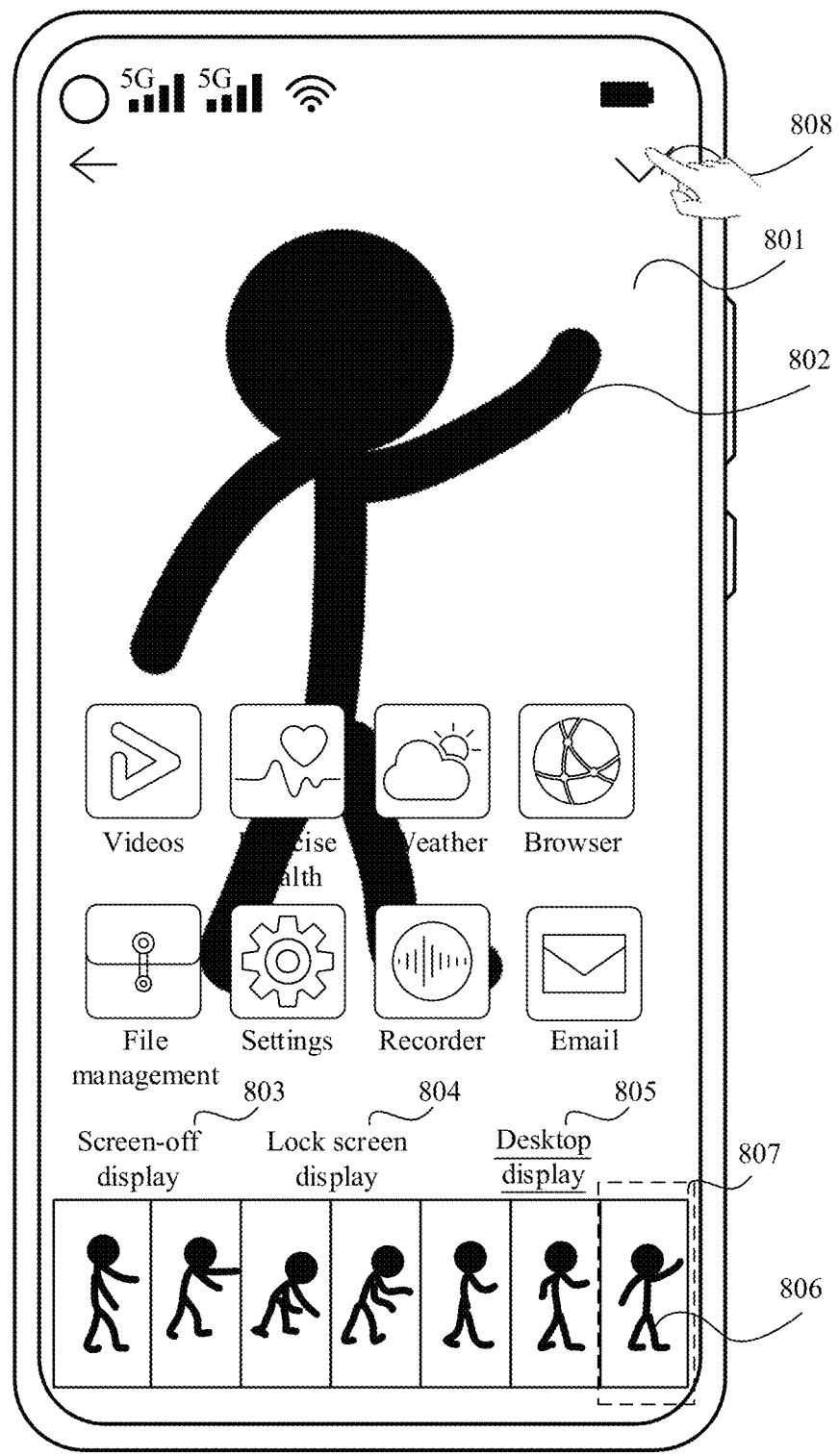
FIG. 10a to FIG. 10h are schematic diagrams of example user interfaces.

As shown in FIG. 10*a*, for example, the user may tap the acknowledgment option 808 to end the preview mode. In response to the received user operation, the terminal exits the transition animation preview interface 801, and displays a previous-level directory. For example, as shown in FIG. 10*b*, the terminal returns to the video album interface.

Figure 10B:
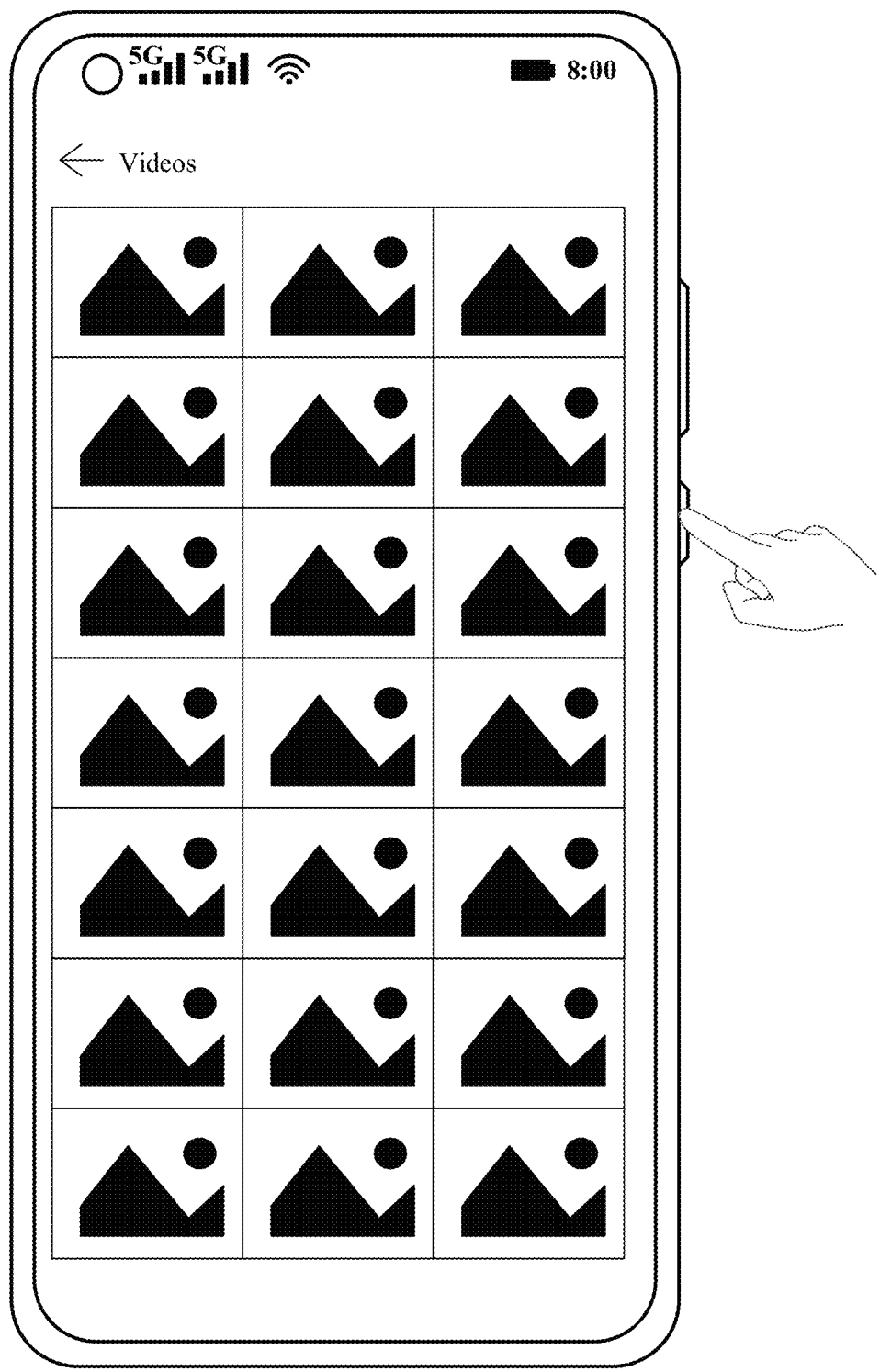
Figure 10C:
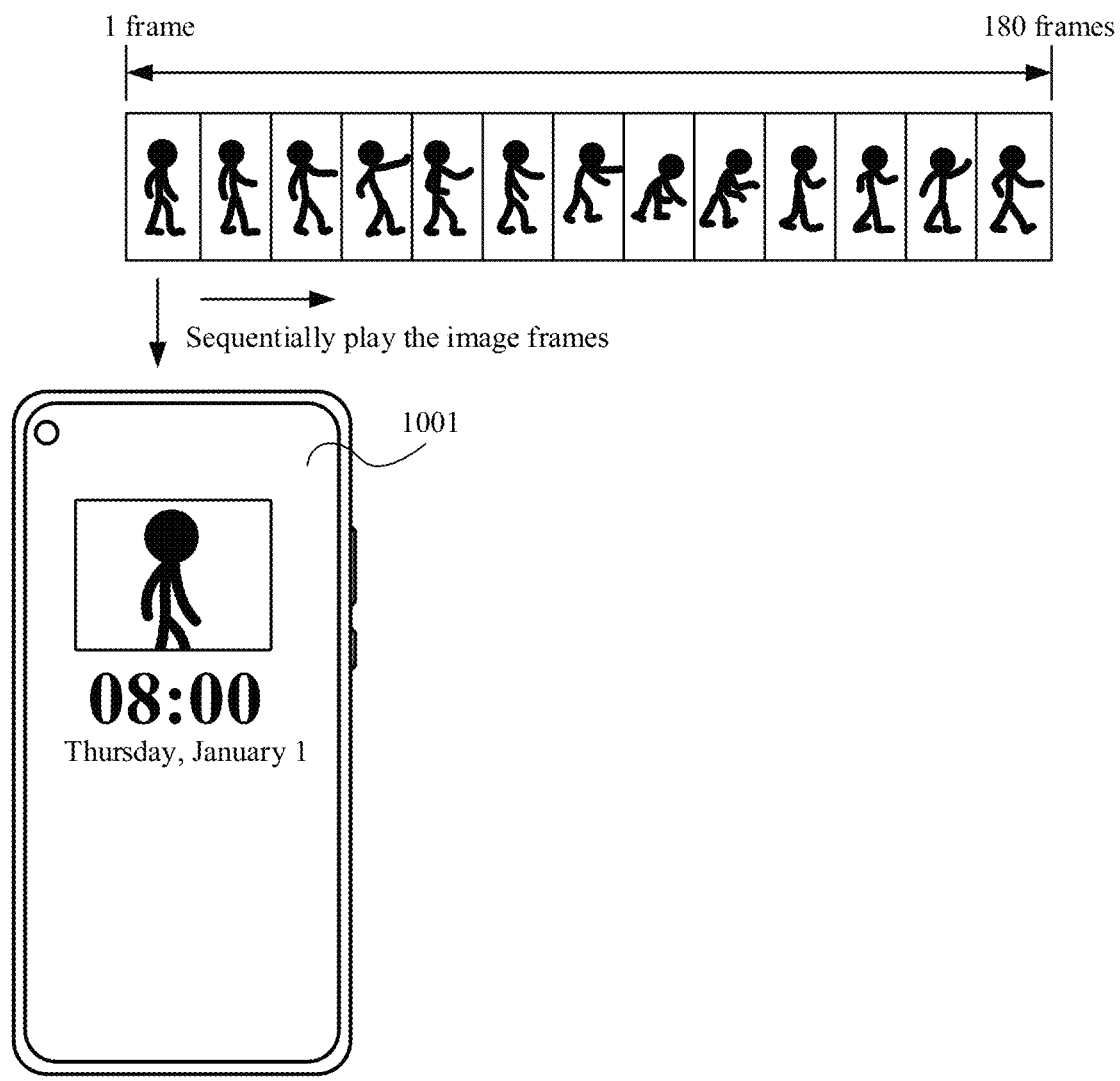

As shown in FIG. 10*b*, for example, the user may tap the power button of the terminal. In response to the received user operation, the terminal enters the screen-off mode. As shown in FIG. 10*c*, for example, after the terminal enters the screen-off mode, the transition animation corresponding to the screen-off mode is played on a screen-off interface 1001 of the terminal. In other words, the screen-off interface 1001 sequentially plays correspondingly processed image frames in the video segment from the first frame in the video segment used as the transition animation. For example, the screen-off interface 1001 further includes but is not limited to a time control.

Figure 10D:
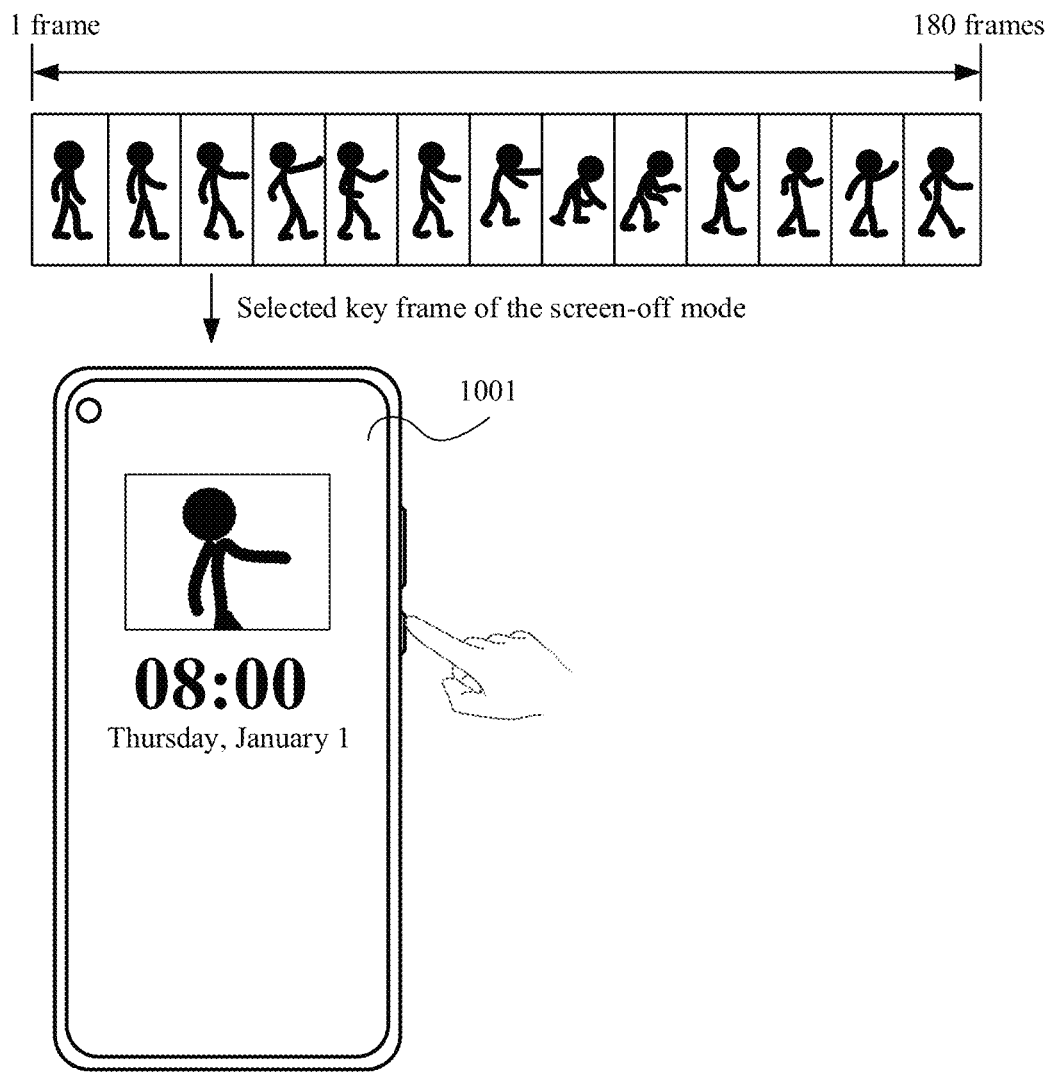

As shown in FIG. 10*d*, for example, the screen-off interface 1001 plays the transition animation until the selected key frame of the screen-off mode, and the transition animation is fixed on the image frame. In other words, the transition animation played by the screen-off interface 1001 is still on the key frame of the screen-off mode, and display of another control such as the time control is not affected by the image frame.

It should be noted that the foregoing manner of entering the screen-off mode is only an example. In another embodiment, the terminal may alternatively enter the screen-off mode from the lock screen mode, or may automatically enter the screen-off mode after being still in the desktop mode for N seconds. Certainly, in this embodiment of this application, the screen-off mode may alternatively be entered from an interface corresponding to any application. This is not limited in this application. It may be understood that, after entering the screen-off mode from another mode, the screen-off interface 1001 plays the transition animation from the first frame until the key frame of the screen-off mode.

Figure 10E:
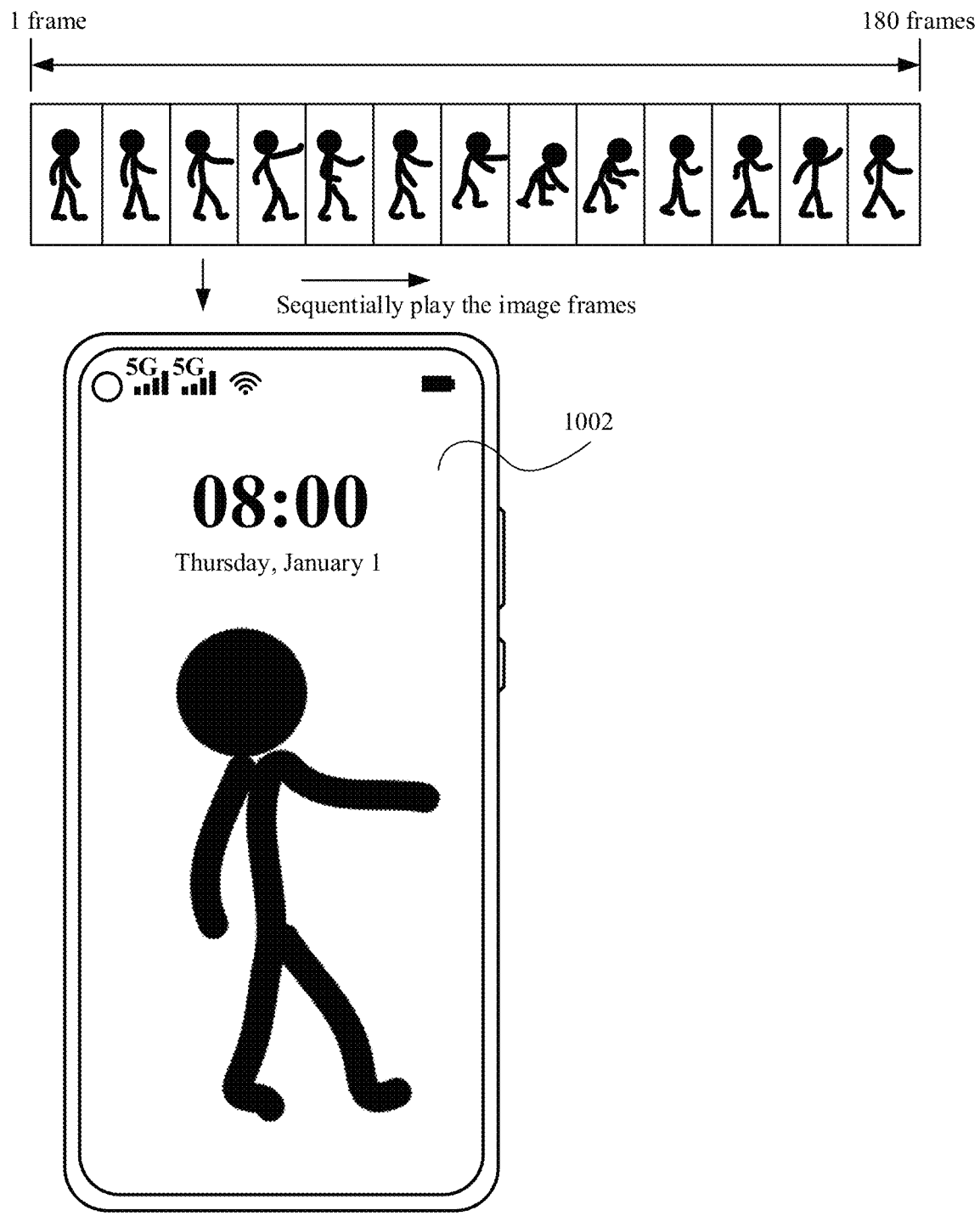

As shown in FIG. 10*e*, for example, in response to a received user operation, the terminal enters the lock screen mode. For example, a lock screen interface 1002 of the terminal starts to play the transition animation corresponding to the lock screen mode. In other words, the lock screen interface 1002 sequentially plays the image frames in the video segment from the key frame of the screen-off mode.

Figure 10F:
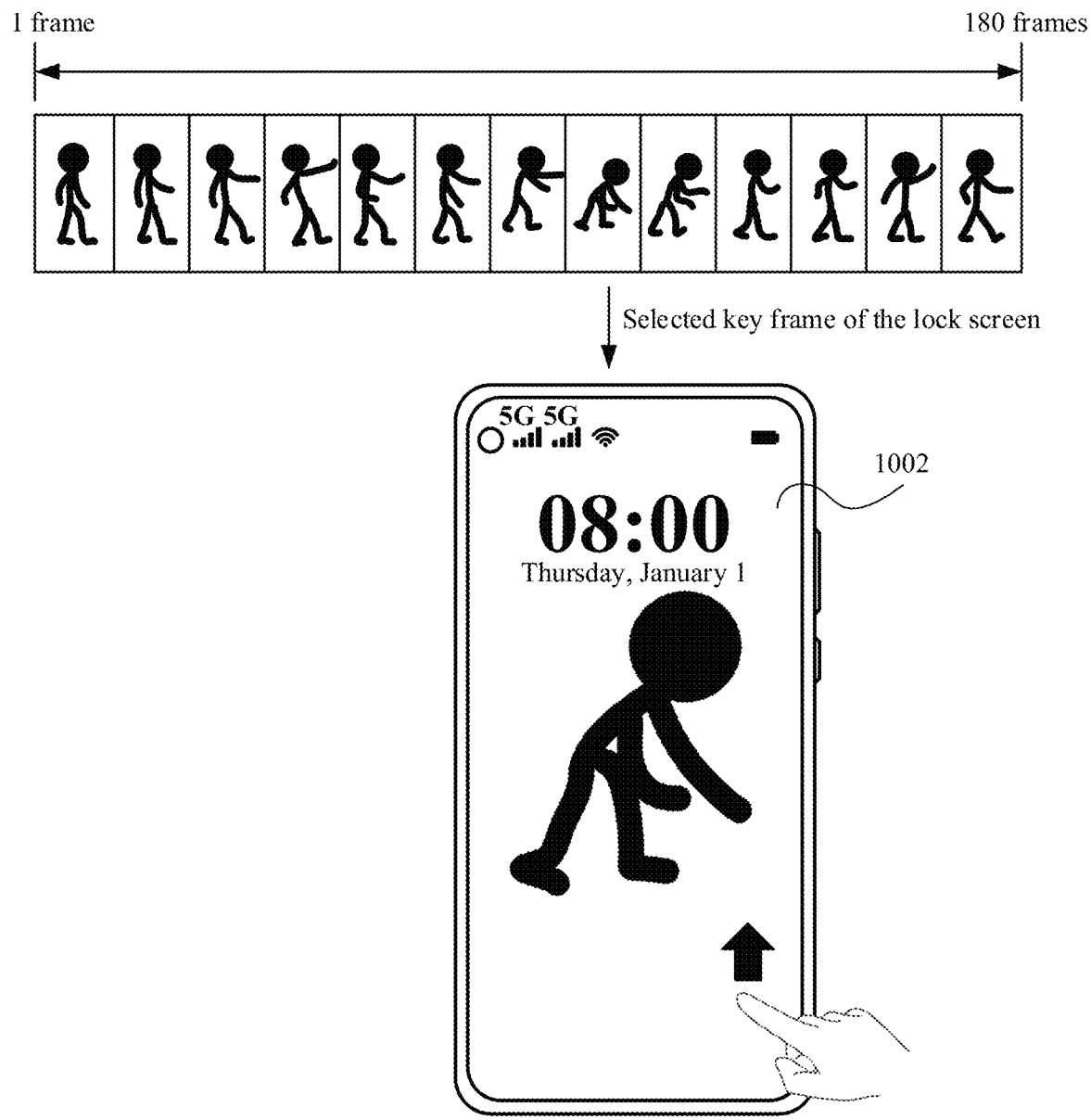

As shown in FIG. 10*f*, for example, the lock screen interface 1002 plays the transition animation until the selected key frame of the lock screen mode, and the transition animation is fixed on the image frame. In other words, the transition animation played by the lock screen interface 1002 is still on the key frame of the lock screen mode, and display of another control such as the time control is not affected by the image frame.

Still refer to FIG. 10*f*. For example, the user may slide for unlock. In response to the received user operation, the terminal enters the desktop mode. It should be noted that, in another embodiment, another unlocking manner may also be used, for example, face unlocking. This is not limited in this application.

Figure 10G:
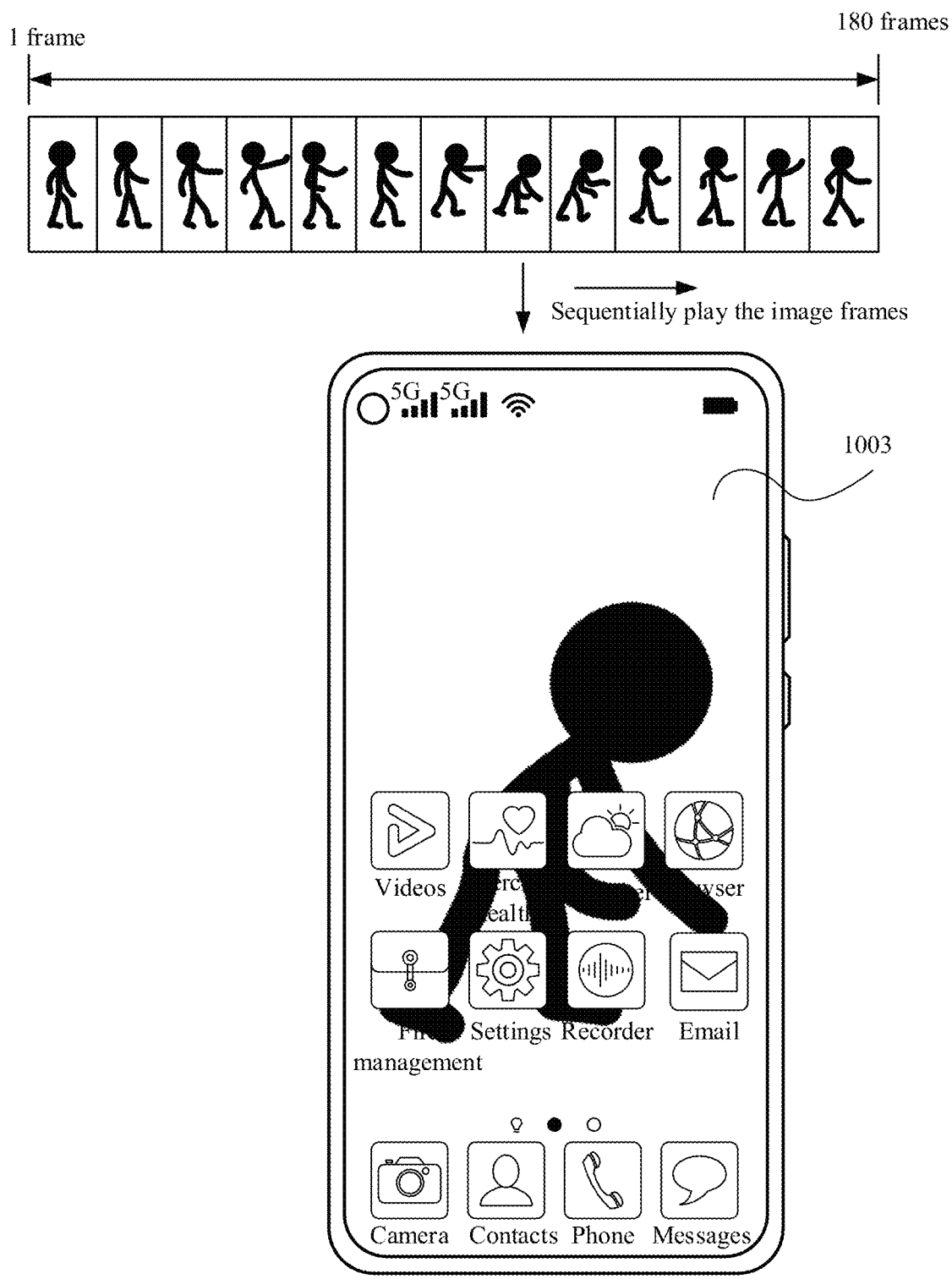

As shown in FIG. 10*g*, for example, after the terminal enters the desktop mode, a display interface 1003 of the terminal plays the transition animation corresponding to the desktop mode. In other words, the display interface 1003 sequentially plays the image frames in the video segment from the key frame of the lock screen mode. Optionally, when the display interface 1003 of the terminal plays the transition animation of the desktop mode, the display interface 1003 displays another control of the desktop, for example, a control such as an application icon, a battery level, or a network icon. Optionally, the another control of the desktop may be displayed on the desktop when the transition animation of the desktop mode starts to be played. Optionally, the another control of the desktop may be displayed on the desktop when the transition animation of the desktop mode is played to any frame. Optionally, the another control of the desktop may be gradually displayed on the desktop in a "fly-in" or "fade-in" manner when the transition animation of the desktop mode is played. A specific display manner may be set according to an actual requirement. This is not limited in this application.

Figure 10H:
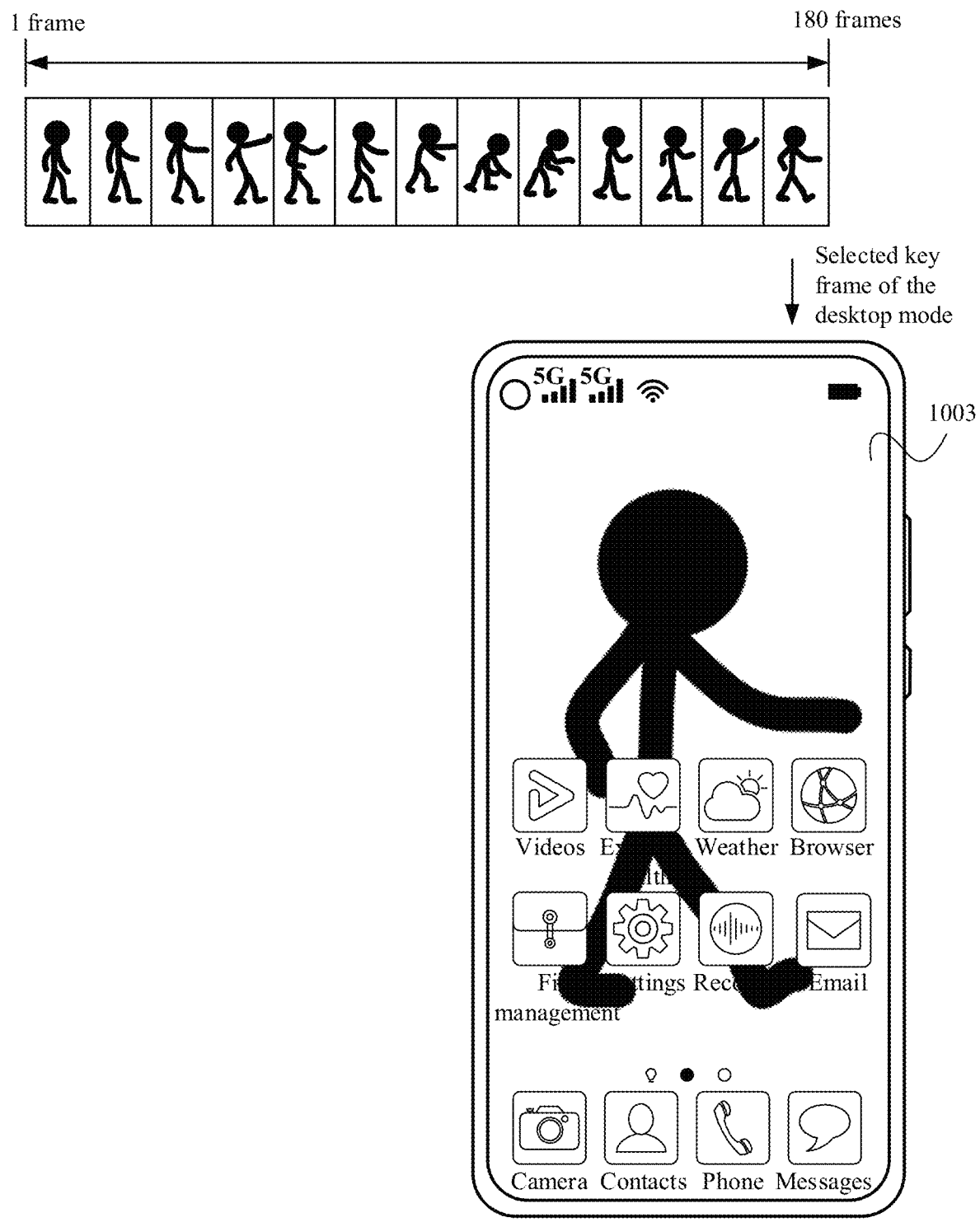

As shown in FIG. 10*h*, for example, the display interface 1003 plays the transition animation until the selected key frame of the desktop mode, and the transition animation is fixed on the image frame. In other words, the transition animation played by the display interface 1003 is still on the key frame of the desktop mode. Optionally, when the display interface 1003 plays the transition animation corresponding to the desktop mode, the interface may also display an interface displayed before the screen is closed, for example, may display the album interface in FIG. 10*b*. This is not limited in this application.

It may be understood that, to implement the foregoing functions, the electronic device includes hardware and/or software modules corresponding to the functions. With reference to the examples described in embodiments disclosed in this specification, algorithm steps may be implemented by hardware or a combination of hardware and computer software in this application. Whether functions are executed in hardware or computer software driving hardware depends on specific applications and design constraints of the technical solutions. A person skilled in the art may implement the described functions by using different methods for specific applications with reference to embodiments, but this implementation should not be considered to be beyond the scope of this application.

Figure 11:
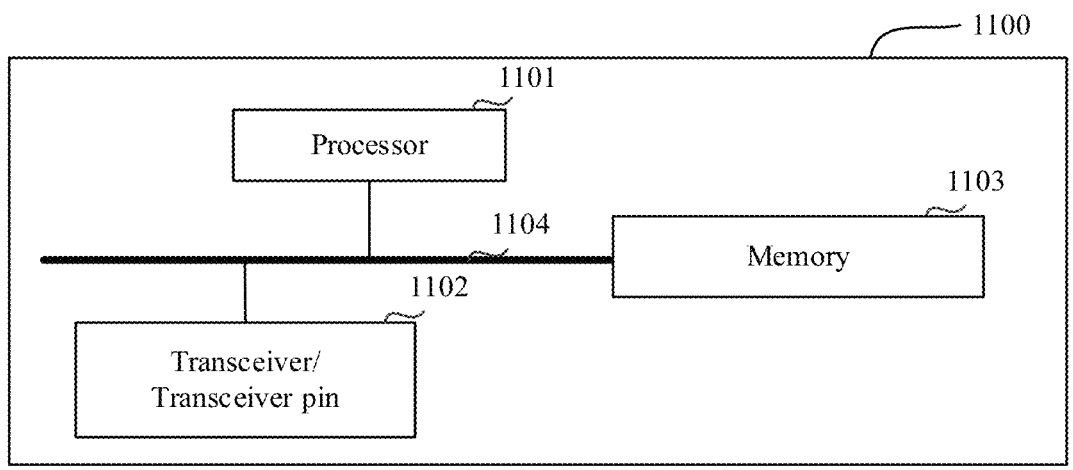
FIG. 11 is a schematic diagram of an example structure of an apparatus.

In an example, FIG. 11 is a schematic block diagram of an apparatus 1100 according to an embodiment of this application. The apparatus 1100 may include a processor 1101 and a transceiver/transceiver pin 1102. Optionally, the apparatus further includes a memory 1103.

The components in the apparatus 1100 are coupled together through a bus 1104. In addition to a data bus, the bus 1104 further includes a power bus, a control bus, and a status signal bus. However, for clarity of description, various buses are referred to as the bus 1104 in the figure.

Optionally, the memory 1103 may be configured to store the instructions in the foregoing method embodiments. The processor 1101 may be configured to: execute the instructions in the memory 1103, control a receiving pin to receive a signal, and control a sending pin to send a signal.

The apparatus 1100 may be the electronic device or a chip of the electronic device in the foregoing method embodiments.

All related content of the steps involved in the foregoing method embodiments may be cited to function descriptions of corresponding function modules. Details are not described herein again.

An embodiment further provides a computer storage medium. The computer storage medium stores computer instructions. When the computer instructions are run on an electronic device, the electronic device is enabled to perform the foregoing related method steps to implement the display method in the foregoing embodiment.

An embodiment further provides a computer program product. When the computer program product runs on a computer, the computer is enabled to perform the foregoing related steps to implement the display method in the foregoing embodiment.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, so that the chip performs the display method in the foregoing method embodiment.

The electronic device, the computer storage medium, the computer program product, or the chip provided in this embodiment is used to execute the foregoing corresponding method. Therefore, for beneficial effects that can be achieved by the electronic device, the computer storage medium, the computer program product, or the chip, refer to beneficial effects of the foregoing corresponding method. Details are not described herein again.

It may be learned by a person skilled in the art from the foregoing descriptions of the implementations that, for convenience and brevity of the descriptions, only division into the foregoing function modules is used as an example for description. During actual application, the foregoing functions may be allocated to different function modules for completion according to a requirement. In other word, an internal structure of the apparatus is divided into different function modules to complete all or some of the functions described above.

In several embodiments provided in this application, it should be understood that the disclosed apparatus and method may be implemented in another manner. For example, the described apparatus embodiment is merely an example. For example, module or unit division is merely logical function division. During actual implementation, there may be another division manner. For example, a plurality of units or components may be combined or integrated into another apparatus, or some features may be ignored or not performed. In addition, the displayed or discussed mutual coupling or direct coupling or communication connection may be implemented through some interfaces, and indirect coupling or communication connection between the apparatuses or units may be implemented in electrical, mechanical, or other forms.

The units described as separate parts may be or may not be physically separated, and parts displayed as units may be one physical unit or a plurality of physical units, in other words, may be located in one place, or may be distributed in a plurality of different places. Some or all of the units may be selected according to an actual requirement to implement the objectives of the solutions in embodiments.

In addition, function units in embodiments of this application may be integrated into one processing unit, or each unit may exist alone physically, or two or more units may be integrated into one unit. The foregoing integrated unit may be implemented in a form of hardware, or may be implemented in a form of a software function unit.

Any content in embodiments of this application and any content in same embodiments may be freely combined. Any combination of the foregoing content falls within the scope of this application.

When an integrated unit is implemented in a form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium, and includes several instructions for instructing a device (which may be a single-chip microcomputer, a chip, or the like) or a processor (processor) to perform all or some of the steps of the methods in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

Embodiments of this application are described with reference to the accompanying drawings. However, this application is not limited to the foregoing specific implementations. The foregoing specific implementations are merely examples, but are not intended for limitation. A person of ordinary skill in the art may make many forms without departing from the objective and the scope of the claims of this application, which is within the protection scope of this application.

The methods or algorithm steps described with reference to the content disclosed in embodiments of this application may be implemented in a hardware manner, or may be implemented in a manner in which the processor executes software instructions. The software instruction may include a corresponding software module. The software module may be stored in a random access memory (Random Access Memory, RAM), a flash memory, a read-only memory (Read-Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium known in the art. An example storage medium is coupled to a processor, so that the processor can read information from the storage medium and can write information into the storage medium. Certainly, the storage medium may alternatively be an integral part of the processor. The processor and the storage medium may be located in the ASIC.

A person skilled in the art may recognize that, in the foregoing one or more examples, functions described in embodiments of this application may be implemented by hardware, software, firmware, or any combination thereof. When these functions are implemented by the software, the functions may be stored in a computer-readable medium or transmitted as one or more instructions or code on the computer-readable medium. The computer-readable medium includes a computer storage medium and a communications medium. The communications medium includes any medium that facilitates computer program transmission from one place to another. The storage medium may be any available medium accessible to a general-purpose or special-purpose computer.

Embodiments of this application are described with reference to the accompanying drawings. However, this application is not limited to the foregoing specific implementations. The foregoing specific implementations are merely examples, but are not intended for limitation. A person of ordinary skill in the art may make many forms without departing from the objective and the scope of the claims of this application, which is within the protection scope of this application.

What is claimed is:

1. An electronic device, comprising:
a memory and a processor, wherein
the processor is coupled to the memory; and
the memory stores program instructions, and when the program instructions are executed by the processor, the electronic device is enabled to perform:
in response to a received first user operation, selecting a first video from a plurality of videos stored in the electronic device;
dividing the first video into a first sub-video, a second sub-video, and a third sub-video, wherein a last image frame of the first sub-video is a first image frame of the second sub-video, and a last image frame of the second sub-video is a first image frame of the third sub-video, wherein the first video comprises N image frames, and N is an integer greater than 3, and the dividing the first video comprises:
dividing the N image frames of the first video into a first image group, a second image group, and a third image group in an image frame playing sequence,
selecting a first image frame from the first image group based on a first corresponding quality parameter of each image frame in the first image group, selecting a second image frame from the second image group, and selecting a third image frame from the third image group, wherein the first sub-video is between a first image frame in the N image frames and the first image frame from the first image group, the second sub-video is between the first image frame from the first image group and the second image frame, and the third sub-video is between the second image frame and the third image frame, and
setting the first sub-video as a first transition animation, setting the second sub-video as a second transition animation, and setting the third sub-video as a third transition animation;
displaying a screen-off interface on a display of the electronic device in response to a received second user operation, and playing each image frame of the first transition animation on the screen-off interface;

switching the screen-off interface on the display of the electronic device to a lock screen interface in response to a received third user operation, and playing each image frame of the second transition animation on the lock screen interface; and switching the lock screen interface on the display of the electronic device to a desktop in response to a received fourth user operation, and playing each image frame of the third transition animation on the desktop, wherein the first transition animation, the second transition animation, and the third transition animation are generated based on the first video stored in the electronic device, the last image frame of the first transition animation is the first image frame of the second transition animation, and the last image frame of the second transition animation is the first image frame of the third transition animation.

2. The electronic device according to claim 1, wherein the selecting the first image frame, selecting the second image frame, and selecting the third image frame comprise:

obtaining a corresponding quality parameter of each image frame in the N image frames, wherein the corresponding quality parameter comprises at least one of: clarity, exposure, brightness, contrast, or saturation;

selecting the second image frame from the second image group based on a second corresponding quality parameter of each image frame in the second image group; and selecting the third image frame from the third image group based on a third corresponding quality parameter of each image frame in the third image group.

3. The electronic device according to claim 1, wherein the displaying the screen-off interface comprises:

when the last image frame of the first transition animation is played on the screen-off interface, statically displaying the last image frame of the first transition animation on the screen-off interface, wherein the last image frame of the first transition animation is the first image frame.

4. The electronic device according to claim 3, wherein the displaying the screen-off interface comprises:

tailoring each image frame in the first sub-video based on a specified first size;

adjusting, based on a specified second size, a size of each image frame obtained after the tailoring in the first sub-video; and playing, on the screen-off interface, each image frame obtained after the tailoring and the adjusting the size in the first sub-video.

5. The electronic device according to claim 4, wherein the screen-off interface further comprises one or more pieces of screen-off text information, and all parts other than the screen-off text information and the played first sub-video on the screen-off interface are black screens.

6. The electronic device according to claim 1, wherein the displaying the screen-off interface comprises:

when the last image frame of the second transition animation is played on the lock screen interface, statically displaying the last image frame of the second transition animation on the lock screen interface, wherein the last image frame of the second transition animation is the second image frame.

7. The electronic device according to claim 6, wherein in a process of playing the second transition animation on the lock screen interface, one or more pieces of lock screen text information are displayed on the lock screen interface.

8. The electronic device according to claim 6, wherein a size of each image frame of the second transition animation played on the lock screen interface is the same as a size of the lock screen interface.

9. The electronic device according to claim 1, wherein the switching the lock screen interface comprises:

when a last image frame of the third transition animation is played on the desktop, statically displaying the last image frame of the third transition animation on the desktop, wherein the last image frame of the third transition animation is the third image frame.

10. The electronic device according to claim 9, wherein in a process of playing the third transition animation on the desktop, a plurality of controls are displayed on the desktop, and the plurality of controls comprise at least one of:

an application icon control, a network control, or a power control.

11. The electronic device according to claim 9, wherein a size of each image frame of the third transition animation played on the desktop is the same as a size of the desktop.

12. The electronic device according to claim 1, wherein the selecting the first image frame from the first image group is in response to a received fifth user operation;

wherein the selecting the second image frame from the second image group is in response to a received sixth user operation; and wherein the selecting the third image frame from the third image group is in response to a received seventh user operation.

13. A method, comprising:

in response to a received first user operation, selecting, by an electronic device, a first video from a plurality of videos stored in the electronic device;

dividing, by the electronic device, the first video into a first sub-video, a second sub-video, and a third sub-video, wherein a last image frame of the first sub-video is a first image frame of the second sub-video, and a last image frame of the second sub-video is a first image frame of the third sub-video, wherein the first video comprises N image frames, and N is an integer greater than 3, and the dividing the first video comprises:

dividing, by the electronic device, the N image frames of the first video into a first image group, a second image group, and a third image group in an image frame playing sequence, selecting, by the electronic device, a first image frame from the first image group based on a first corresponding quality parameter of each image frame in the first image group, selecting a second image frame from the second image group, and selecting a third image frame from the third image group, wherein the first sub-video is between a first image frame in the N image frames and the first image frame from the first image group, the second sub-video is between the first image frame from the first image group and the second image frame, and the third sub-video is between the second image frame and the third image frame, and setting, by the electronic device, the first sub-video as a first transition animation, setting the second sub-video as a second transition animation, and setting the third sub-video as a third transition animation;

displaying, by the electronic device, a screen-off interface on a display of the electronic device in response to a received second user operation, and playing each image frame of the first transition animation on the screen-off interface;

switching, by the electronic device, the screen-off interface on the display of the electronic device to a lock screen interface in response to a received third user operation, and playing each image frame of the second transition animation on the lock screen interface; and switching, by the electronic device, the lock screen interface on the display of the electronic device to a desktop in response to a received fourth user operation, and playing each image frame of the third transition animation on the desktop, wherein the first transition animation, the second transition animation, and the third transition animation are generated based on the first video stored in the electronic device, the last image frame of the first transition animation is the first image frame of the second transition animation, and the last image frame of the second transition animation is the first image frame of the third transition animation.

14. The method according to claim 13, wherein the selecting, by the electronic device, the first image frame from the first image group, selecting the second image frame from the second image group, and selecting the third image frame from the third image group comprises comprise:

obtaining a corresponding quality parameter of each image frame in the N image frames, wherein the corresponding quality parameter comprises at least one of clarity, exposure, brightness, contrast, or saturation;

selecting the second image frame from the second image group based on a second corresponding quality parameter of each image frame in the second image group; and selecting the third image frame from the third image group based on a third corresponding quality parameter of each image frame in the third image group.

15. The method according to claim 13, wherein the selecting the first image frame from the first image group is in response to a received fifth user operation;

wherein the selecting the second image frame from the second image group is in response to a received sixth user operation; and wherein the selecting the third image frame from the third image group is in response to a received seventh user operation.

16. The method according to claim 13, wherein the displaying the screen-off interface comprises:

when the last image frame of the first transition animation is played on the screen-off interface, statically displaying the last image frame of the first transition animation on the screen-off interface, wherein the last image frame of the first transition animation is the first image frame.

17. The method according to claim 16, wherein the displaying the screen-off interface comprises:

tailoring each image frame in the first sub-video based on a specified first size;

adjusting, based on a specified second size, a size of each image frame obtained after the tailoring in the first sub-video; and playing, on the screen-off interface, each image frame obtained after the tailoring and the adjusting the size in the first sub-video.

18. A non-transitory computer-readable storage medium, comprising a computer program, wherein when the computer program runs on an electronic device, the electronic device is enabled to perform operations comprising:

in response to a received first user operation, selecting a first video from a plurality of videos stored in the electronic device;

dividing the first video into a first sub-video, a second sub-video, and a third sub-video, wherein a last image frame of the first sub-video is a first image frame of the second sub-video, and a last image frame of the second sub-video is a first image frame of the third sub-video, wherein the first video comprises N image frames, and N is an integer greater than 3, and the dividing the first video comprises:

dividing the N image frames of the first video into a first image group, a second image group, and a third image group in an image frame playing sequence, and selecting a first image frame from the first image group based on a first corresponding quality parameter of each image frame in the first image group, selecting a second image frame from the second image group, and selecting a third image frame from the third image group, wherein the first sub-video is between a first image frame in the N image frames and the first image frame from the first image group, the second sub-video is between the first image frame from the first image group and the second image frame, and the third sub-video is between the second image frame and the third image frame, and setting the first sub-video as a first transition animation, setting the second sub-video as a second transition animation, and setting the third sub-video as a third transition animation;

displaying a screen-off interface on a display of the electronic device in response to a received second user operation, and playing each image frame of the first transition animation on the screen-off interface;

switching the screen-off interface on the display of the electronic device to a lock screen interface in response to a received third user operation, and playing each image frame of the second transition animation on the lock screen interface; and switching the lock screen interface on the display of the electronic device to a desktop in response to a received fourth user operation, and playing each image frame of the third transition animation on the desktop, wherein the first transition animation, the second transition animation, and the third transition animation are generated based on the first video stored in the electronic device, the last image frame of the first transition animation is the first image frame of the second transition animation, and the last image frame of the second transition animation is the first image frame of the third transition animation.

19. The non-transitory computer-readable storage medium according to claim 18, wherein the selecting the first image frame from the first image group is in response to a received fifth user operation;

wherein the selecting the second image frame from the second image group is in response to a received sixth user operation; and wherein the selecting the third image frame from the third image group is in response to a received seventh user operation.

20. The non-transitory computer-readable storage medium according to claim 18, wherein the displaying the screen-off interface comprises:
    when the last image frame of the first transition animation is played on the screen-off interface, statically displaying the last image frame of the first transition animation on the screen-off interface, wherein the last image frame of the first transition animation is the first image frame.

\* \* \* \* \*